United States Patent
Tian et al.

(10) Patent No.: US 11,888,405 B2
(45) Date of Patent: Jan. 30, 2024

(54) MODE OPERATION DETECTION FOR CONTROL OF A POWER CONVERTER WITH AN ACTIVE CLAMP SWITCH

(71) Applicant: POWER INTEGRATIONS, INC., San Jose, CA (US)

(72) Inventors: Jinyuan Tian, San Jose, CA (US); Munadir Aziz Ahmed, San Mateo, CA (US); Arthur B. Odell, Morgan Hill, CA (US); Rajko Duvnjak, Victoria (CA)

(73) Assignee: POWER INTEGRATIONS, INC.

( * ) Notice: Subject to any disclaimer, the term of this patent is extended or adjusted under 35 U.S.C. 154(b) by 0 days.

(21) Appl. No.: 18/108,545

(22) Filed: Feb. 10, 2023

(65) Prior Publication Data

US 2023/0275523 A1 Aug. 31, 2023

Related U.S. Application Data

(63) Continuation of application No. 17/193,402, filed on Mar. 5, 2021, now Pat. No. 11,632,054, which is a
(Continued)

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 1/0012* (2021.05)

(58) Field of Classification Search
CPC ......... H02M 3/33576; H02M 3/33592; H02M 1/083; H02M 1/0012; H02M 3/335;
(Continued)

(56) References Cited

U.S. PATENT DOCUMENTS

| 4,974,063 A | 11/1990 | Kurihara et al. |
| 5,402,329 A | 3/1995 | Wittenbreder |

(Continued)

FOREIGN PATENT DOCUMENTS

| CN | 103795260 B | 1/2016 |
| CN | 107181410 A | 9/2017 |

(Continued)

OTHER PUBLICATIONS

Dalal, "Design Considerations for Active Clamp and Reset Technique," Unitrode Seminar Paper, 24 pages.
(Continued)

*Primary Examiner* — Adolf D Berhane
(74) *Attorney, Agent, or Firm* — Power Integrations, Inc.; Karina Martha G. Li

(57) ABSTRACT

A primary controller comprising a control circuit coupled to determine a mode of operation and to generate a first mode of operation signal and a second mode of operation signal. The control circuit coupled to generate a control signal in response to the first mode of operation signal or the second mode of operation signal, the control signal causes a delay time to enable a turn ON of a power switch after a turn OFF of a clamp switch. The control circuit coupled to output a clamp drive signal to control the clamp switch and comprises a delay circuit coupled to receive the first mode of operation signal and the second mode of operation signal, wherein the delay circuit is coupled to apply a first delay time or a second delay time to the control signal, the second delay time being longer than the first delay time.

18 Claims, 23 Drawing Sheets

Related U.S. Application Data continuation-in-part of application No. PCT/US2019/065912, filed on Dec. 12, 2019.

(60) Provisional application No. 62/838,227, filed on Apr. 24, 2019, provisional application No. 62/989,048, filed on Mar. 13, 2020.

(58) Field of Classification Search
CPC .. H02M 1/0058; H02M 1/34; H02M 3/33507; H02M 3/33523; H02M 1/00
See application file for complete search history.

(56) References Cited

U.S. PATENT DOCUMENTS

| | | |
|---|---|---|
| 5,430,633 A | 7/1995 | Smith |
| 5,602,724 A | 2/1997 | Balakrishnan |
| 5,818,707 A | 10/1998 | Seong et al. |
| 5,841,641 A | 11/1998 | Faulk |
| 5,991,172 A | 11/1999 | Jovanovic et al. |
| 6,061,257 A | 5/2000 | Spampinato et al. |
| 6,069,807 A | 5/2000 | Boylan et al. |
| 6,144,564 A | 11/2000 | Fraidlin et al. |
| 6,496,392 B2 | 12/2002 | Odell |
| 7,116,090 B1 | 10/2006 | Yang et al. |
| 7,471,530 B2 | 12/2008 | Balakrishnan et al. |
| 7,518,885 B2 | 4/2009 | Baurle et al. |
| 7,719,248 B1 | 5/2010 | Melanson |
| 7,995,360 B2 | 8/2011 | Mayell |
| 8,077,483 B2 | 12/2011 | Djenguerian et al. |
| 8,125,805 B1 | 2/2012 | Melanson |
| 8,154,889 B1 | 4/2012 | Hong |
| 8,169,207 B2 | 5/2012 | Omi |
| 8,179,110 B2 | 5/2012 | Melanson |
| 8,299,730 B2 | 10/2012 | Gaknoki et al. |
| 8,400,789 B2 | 3/2013 | Joshi |
| 8,427,848 B2 | 4/2013 | Lund |
| 8,451,630 B2 | 5/2013 | Nania et al. |
| 8,598,921 B2 | 12/2013 | Thalheim et al. |
| 8,693,217 B2 | 4/2014 | Mao |
| 8,742,744 B2 | 6/2014 | Abu Qahouq |
| 9,019,728 B2 | 4/2015 | Matthews et al. |
| 9,276,477 B2 | 3/2016 | Thomas et al. |
| 9,391,528 B2 | 7/2016 | Yang |
| 9,444,357 B1 | 9/2016 | Matthews et al. |
| 9,584,017 B1 | 2/2017 | Sundararaj et al. |
| 9,673,718 B2 | 6/2017 | Fahlenkamp et al. |
| 9,680,382 B2 | 6/2017 | Vaughan et al. |
| 9,742,288 B2 | 8/2017 | Balakrishnan et al. |
| 9,743,468 B2 | 8/2017 | Strijker et al. |
| 9,871,510 B1 | 1/2018 | Horwitz et al. |
| 9,973,098 B2 | 5/2018 | Phadke et al. |
| 10,186,976 B2 | 1/2019 | Duvnjak |
| 10,291,134 B2 | 5/2019 | Radic |
| 10,291,136 B2 | 5/2019 | Song et al. |
| 10,554,134 B2 | 2/2020 | Werner et al. |
| 10,554,136 B1 | 2/2020 | Miletic |
| 10,587,186 B2 | 3/2020 | Espino |
| 10,651,746 B2 | 5/2020 | Song et al. |
| 10,651,754 B1 | 5/2020 | Murugesan et al. |
| 10,826,398 B2 | 11/2020 | Wang et al. |
| 10,868,473 B2 | 12/2020 | Chang et al. |
| 10,965,218 B1 | 3/2021 | Odell |
| 10,971,990 B1 | 4/2021 | Rajesh et al. |
| 11,088,628 B2 | 8/2021 | Hyugaji et al. |
| 11,152,867 B2 | 10/2021 | Chopra et al. |
| 11,251,704 B2 | 2/2022 | Wu et al. |
| 11,588,411 B1* | 2/2023 | Nayaknur ............ H02M 1/0012 |
| 11,611,279 B2* | 3/2023 | Odell ...................... H02M 1/083 |
| 11,632,054 B2* | 4/2023 | Tian ....................... H02M 1/083 |
| | | 363/21.03 |
| 2003/0231011 A1 | 12/2003 | Umemoto et al. |
| 2005/0046404 A1 | 3/2005 | Uusitalo |
| 2005/0201128 A1 | 9/2005 | Jin et al. |
| 2006/0215424 A1 | 9/2006 | Aso et al. |
| 2006/0256588 A1 | 11/2006 | Chen |
| 2007/0007938 A1 | 1/2007 | Djenguerian et al. |
| 2008/0284398 A1 | 11/2008 | Qiu et al. |
| 2010/0067259 A1 | 3/2010 | Liu |
| 2010/0194445 A1 | 8/2010 | Balakrishnan et al. |
| 2010/0284204 A1 | 11/2010 | Mayell |
| 2011/0063882 A1 | 3/2011 | Hawkes |
| 2011/0148379 A1 | 6/2011 | Gu et al. |
| 2011/0193494 A1 | 8/2011 | Gaknoki et al. |
| 2011/0194312 A1 | 8/2011 | Gaknoki et al. |
| 2011/0254537 A1 | 10/2011 | Yang et al. |
| 2011/0305048 A1 | 12/2011 | Yang et al. |
| 2012/0032657 A1 | 2/2012 | Dequina |
| 2012/0049823 A1 | 3/2012 | Chen |
| 2012/0212204 A1 | 8/2012 | Philbrick et al. |
| 2012/0299561 A1 | 11/2012 | Chen et al. |
| 2013/0010502 A1 | 1/2013 | Chen |
| 2013/0027990 A1 | 1/2013 | Baeurle et al. |
| 2013/0057323 A1 | 3/2013 | Spini et al. |
| 2014/0078787 A1 | 3/2014 | Sonobe |
| 2014/0204625 A1 | 7/2014 | Liu et al. |
| 2014/0307484 A1 | 10/2014 | Yang |
| 2015/0003121 A1 | 1/2015 | Yang et al. |
| 2015/0137776 A1 | 5/2015 | Thomas et al. |
| 2016/0181929 A1 | 6/2016 | Chen et al. |
| 2016/0268909 A1 | 9/2016 | Liu et al. |
| 2016/0301314 A1 | 10/2016 | Polivka |
| 2016/0365801 A1 | 12/2016 | Phadke |
| 2017/0012529 A1 | 1/2017 | Yamada et al. |
| 2017/0070152 A1 | 3/2017 | Liu |
| 2017/0222569 A1 | 8/2017 | Choi et al. |
| 2017/0264206 A1 | 9/2017 | Rana et al. |
| 2017/0373604 A1 | 12/2017 | Chen |
| 2018/0006015 A1 | 1/2018 | Rutter et al. |
| 2018/0013352 A1 | 1/2018 | Cao et al. |
| 2018/0131286 A1 | 5/2018 | Song et al. |
| 2018/0294731 A1 | 10/2018 | Song et al. |
| 2018/0294734 A1 | 10/2018 | Song et al. |
| 2018/0294735 A1 | 10/2018 | Song et al. |
| 2018/0309442 A1 | 10/2018 | Siebler |
| 2018/0358902 A1 | 12/2018 | Duvnjak |
| 2019/0044448 A1 | 2/2019 | Balakrishnan et al. |
| 2019/0334431 A1 | 10/2019 | Spohn et al. |
| 2019/0341859 A1 | 11/2019 | Cohen |
| 2020/0021284 A1 | 1/2020 | Thalheim |
| 2020/0036293 A1 | 1/2020 | Kannan et al. |
| 2020/0195124 A1 | 6/2020 | Mayell et al. |
| 2020/0395857 A1 | 12/2020 | Hwang |
| 2021/0021199 A1 | 1/2021 | Liu et al. |
| 2021/0058002 A1 | 2/2021 | Wong et al. |
| 2021/0167680 A1 | 6/2021 | Odell |
| 2021/0184556 A1 | 6/2021 | Deng et al. |
| 2021/0194378 A1 | 6/2021 | Tian et al. |
| 2021/0257923 A1 | 8/2021 | Odell |
| 2021/0281184 A1 | 9/2021 | Radic |
| 2022/0006393 A1 | 1/2022 | Wong et al. |
| 2022/0069718 A1 | 3/2022 | Xu et al. |

FOREIGN PATENT DOCUMENTS

| | | |
|---|---|---|
| CN | 105978344 B | 5/2018 |
| EP | 1750137 A2 | 2/2007 |
| EP | 3107199 A1 | 12/2016 |
| EP | 3210293 A1 | 8/2017 |
| EP | 3849082 A1 | 7/2021 |
| JP | 5174390 B2 | 4/2013 |
| TW | 201145778 A | 12/2011 |
| TW | 201427257 A | 7/2014 |
| TW | 201524104 A | 6/2015 |
| TW | I625035 B | 5/2018 |
| TW | 201826682 A | 7/2018 |
| WO | 2007072075 A2 | 6/2007 |

(56) References Cited

FOREIGN PATENT DOCUMENTS

| WO | 2017095408 A1 | 6/2017 |
|----|---------------|--------|
| WO | 2021194838 A1 | 9/2021 |

OTHER PUBLICATIONS

Jailyn et al., "Analysis of Active Clamp Fly Back Converter," Modern Applied Science, vol. 9 No. 1. 2015, pp. 12-24, Canadian Center of Science and Education.

King et al., "Incorporating Active-Clamp Technology to MAximuze Efficiency in Flyback and Forward Designs," 2010 Texas Instruments Power Supply Design Seminar, SEM1900 Topic 2, SLUP262, 2010, 26 pages.

Park, Jeongpyo et al: A CCM/DCM Dual-Mode Synchronous Rectification Controller for a High-Efficiency Flyback Converter, IEEE Transactions on Power Electronics, Institute of Electrical and Electronics Engineers, vol. 29, No. 2, 7 pages.

PCT Application No. PCT/US2019/065912; "Notification of Transmittal of the International Search Report and The Written Opinion of the International Searching Authority, or the Declaration"; dated Apr. 9, 2020; 18 pages.

PCT Application No. PCT/US2021/022100; International Search Report and Written Opinion of the International Searching Authority: dated Oct. 5, 2021; 30 pages.

Texas Instruments: UCC28780 High Frequency Active Clamp Flyback Controller, Retrieved from the Internet: URL: https://www.ti.com/lit/ds/symlink/ucc2 8780.pdf?ts=1632382380511&ref_url=https%25 3A%252, Feb. 28, 2018, 68 pages.

U.S. Appl. No. 17/193,402, "Non-Final Office Action dated Mar. 25, 2022," Mar. 25, 2022, 27 pages.

U.S. Appl. No. 17/168,431, Final Office Action dated Jun. 16, 2022, 12 pages.

U.S. Appl. No. 17/168,431, Notice of Allowance dated Oct. 26, 2022, 16 pages.

U.S. Appl. No. 17/181,347, Notice of Allowance dated Jun. 29, 2022, 8 pages.

Song, et al., "Comparison between Control Methods of Active Clamp Flyback for Adaptor Application," 2018 IEEE International Power Electronics and Application Conference and Exposition (PEAC), Shenzhen, China, 2018, pp. 1-6, 2018.

Watson et al., "Characterization of an Active Clamp Flyback Topology for Power Factor Correction Applications," IEEE Transactions on Power Electronics, vol. 11 No. 1, Jan. 1996, pp. 191-198.

Alou et al., "Flyback with Active Clamp: a suitable topology for Low Power and Very Wide Input Voltage Range applications," 2002, IEEE, pp. 242-248.

Zhang et al., "A High Efficiency Flyback Converter with New Active Clamp Technique," IEEE Transactions on Power Electronics, vol. 25 No. 7, Jul. 2010, pp. 1775-1785.

Taiwan Patent Application No. 109112958; "Notification Letter of Review Opinion from the Intellectual Property Bureau of the Ministry of Economy with Machine Translation"; dated Oct. 4, 2023; 8 pages.

Chen et al., "Research on Active Clamp ZVS-SEPIC Converter", Journal of Shanghai Electric Power University, vol. 26, No. 6, Dec. 31, 2010, 7 pages.

Chinese Patent Application No. 201980095717.X; "First Office Action, Search Report, and Machine Translation;" dated Sep. 30, 2023; 22 pages.

\* cited by examiner

MODE OPERATION DETECTION FOR CONTROL OF A POWER CONVERTER WITH AN ACTIVE CLAMP SWITCH

CROSS-REFERENCE TO RELATED APPLICATIONS

This application is a continuation of U.S. Non-Provisional application Ser. No. 17/193,402, filed on Mar. 5, 2021, currently pending, which is a continuation-in-part of International Patent Application No. PCT/US19/65912, filed Dec. 12, 2019, which claims the benefit of U.S. Provisional Application No. 62/838,227 filed on Apr. 24, 2019. U.S. Non-Provisional application Ser. No. 17/193,402, International Patent Application No. PCT/US19/65912, and U.S. Provisional Application No. 62/838,227 are hereby incorporated by reference in their entirety.

This application is a continuation of U.S. Non-Provisional application Ser. No. 17/193,402, filed on Mar. 5, 2021, currently pending, which claims the benefit of U.S. Provisional Application No. 62/989,048, filed Mar. 13, 2020. U.S. Non-Provisional application Ser. No. 17/193,402 and U.S. Provisional Application No. 62/989,048 are hereby incorporated by reference in their entirety.

BACKGROUND INFORMATION

Field of the Disclosure

The present invention relates generally to power converters, and more specifically zero voltage switching (ZVS) for variable frequency flyback power converters.

Background

Electronic devices (such as cell phones, tablets, laptops, etc.) use power to operate. Switched mode power supplies are commonly used due to their high efficiency, small size, and low weight to power many of today's electronics. Conventional wall sockets provide a high voltage alternating current. In a switching power supply, a high voltage alternating current (ac) input is converted with switched mode power converters to provide a well-regulated direct current (dc) output through an energy transfer element to a load. In operation, a switch is turned ON and OFF to provide the desired output by varying the duty cycle (typically the ratio of the on time of the switch to the total switching period), varying the switching frequency, or varying the number of on/off pulses per unit time of the switch in a switched mode power converter.

In a power converter such as a flyback converters when a primary power switch is turned off, the path for the current on the primary side is interrupted abruptly. The energy stored in the magnetizing energy of an energy transfer element can be transferred to the output but the energy in the leakage inductance cannot be transferred to the output. The stored energy is transferred to the drain to source capacitance of the main power switch. This can have catastrophic effects on the device as the voltage developed across the drain to source can exceed the device rating. Traditional flyback converters use passive clamps, e.g. RCD clamp where the leakage energy is captured in a clamp capacitor and the energy is burned in a resistor. This wasted energy reduces the overall efficiency of the system.

Active clamp strategies have been proposed that recycles the leakage energy to achieve zero voltage switching on the primary switch. This increases the efficiency of the overall system. The ZVS technique most commonly used today uses an active clamp on the primary side and a resonant LC secondary output winding structure. While this method has excellent efficiency and reliable ZVS operation, at times the controller may be operated in burst mode. Burst mode is a complex control strategy which requires careful optimization of the loop speed and stability of the system. This can be particularly challenging for adapters where the output voltage can vary over a wide range, e.g. USB Power Delivery (USBPD) applications.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
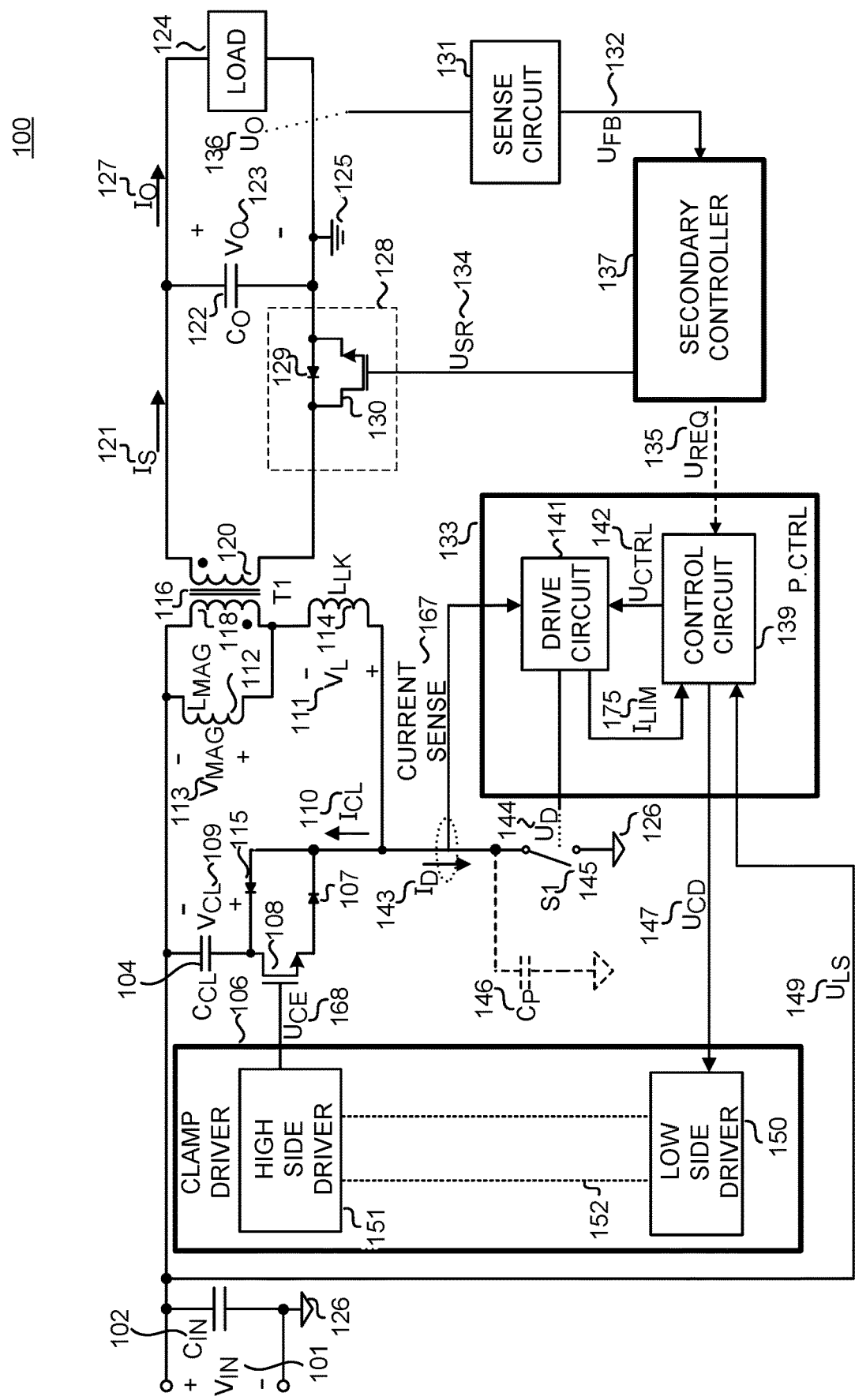
FIG. 1 illustrates one example of a power converter with a primary controller, a secondary controller, and a clamp driver, in accordance with embodiments of the present disclosure

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a power converter that can transition from a discontinuous conduction mode of operation to a continuous conduction mode of operation in response to a line input voltage are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A power converter such as a flyback converter can provide low output currents at low component cost and is relatively simple in comparison to other converter topologies. The flyback converter may also utilize an active clamp circuit to prevent excess voltage from damaging components within the flyback converter.

Conduction losses and switching losses occur due to the electrical resistance in the circuit and the parasitic capacitance that is switched by the power converter, particularly when the power switch is a transistor. When the power switch conducts current, the resistance of the circuit along with the current passing in the circuit generates conduction loss. Switching losses are generally associated with the losses, which occur while the power switch of the power converter is transitioning between an ON state and an OFF state or vice versa. In one example, a switch that is ON (or closed) may conduct current while a switch that is OFF (or open) cannot conduct current. When the power switch is open, voltage across the switch stores energy in the parasitic capacitance. The parasitic capacitance discharges when the power switch closes, dissipating the energy stored in the parasitic capacitance in the resistance of the power switch to produce switching loss. Further, switching losses may result from having a non-zero voltage across the power switch at the moment the power switch turns ON or from having a non-zero current through the power switch when the power switch turns OFF. The active clamp circuit may be used to reduce the switching losses through the use of zero voltage switching techniques.

For a power converter to maintain high efficiency in light load or no load conditions, a power converter controller may implement a burst mode operation by turning on and turning off the power switch for an interval of time (also referred to as a burst interval) followed by an interval of no switching. For flyback converters with an active clamp, it can be difficult to optimize loop speed, stability and ripple for wide output voltage ranges or designs that require stable constant current (CC) operation. To avoid the complexity of burst mode, the disclosure shows a power converter controller that controls an active clamp and a flyback converter that provides a continuous variable frequency for zero voltage switch (ZVS) without the necessity of burst mode or the complexity of a LC output winding network. The variable frequency can easily be controlled for optimal loop response for output response and line rejection. In addition, the power converter controller can determine whether to operate in a discontinuous conduction mode (DCM) and continuous conduction mode (CCM) in response to a line sense input voltage representative of the input line voltage. In one example, when operating in CCM at lower input voltages, the root mean square (RMS) currents of the power switch is reduced which improves the efficiency of the power converter.

To illustrate, FIG. 1 shows a block diagram of an example power converter 100 including a clamp driver 106, a primary controller 133, and a secondary controller 137 in accordance with the teachings of the present disclosure. The illustrated example of the power converter 100 includes an input capacitor $C_{IN}$ 102, an energy transfer element 116, a primary winding 118 of the energy transfer element 116, a secondary winding 120 of the energy transfer element 116, a power switch S1 145, a clamp capacitor $C_{CL}$ 104, diodes 107 and 115, a clamp switch 108, an output capacitor $C_O$ 122, an input return 126, an output return 125, a synchronous rectifier 128, and a sense circuit 131.

The clamp driver 106 is shown including a low side driver 150 and a high side driver 151. The low side driver 150 is configured to control the high side driver through the communication link 152. The high side driver is configured to generate a clamp enable signal $U_{CE}$ 168 to control the clamp switch 108.

The secondary controller 137 is configured to generate a secondary drive signal 134 to control the synchronous rectifier 128, and a request signal $U_{REQ}$ 135. The request signal $U_{REQ}$ 135 is communicated to the primary controller to enable the power switch S1 145. Furthermore, the secondary controller 137 is coupled to receive a feedback signal $U_{FB}$ 132 representative of an output of the power converter 100.

The primary controller 133 is shown comprising a control circuit 139 and a drive circuit 141. The control circuit 139 is coupled to receive the request signal $U_{REQ}$ 135 from the secondary controller 137 and a current sense signal representative of the switch current $I_D$ 143 of the power switch. The control circuit 139 is configured to generate a control signal $U_{CTRL}$ 142 in response to the input line voltage sense signal $U_{LS}$ 149. The control signal $U_{CTRL}$ 142 represents a delay time to turn on the power switch S1 145 after a turn off of the clamp switch 108. The input line voltage sense signal $U_{LS}$ 149 is representative of an input voltage $V_{IN}$ 101 of the power converter 100. As will be further explained, the delay time of the control signal $U_{CTRL}$ 142 is selected in response to the input line voltage sense signal $U_{LS}$ 149. The drive circuit 141 is coupled to receive the control signal $U_{CTRL}$ 142 and generate a drive signal $U_D$ 144 to control the power switch 145. The drive circuit 141 is further coupled to receive a current sense signal representative of a switch current $I_D$ 143 of the power switch 145. The drive circuit 141 is coupled to turn on the power switch S1 145, and coupled to turn off the power switch S1 145 in response to the switch current $I_D$ 143 reaching the current limit (not shown).

Further illustrated is a magnetizing inductance $L_{MAG}$ 112, a leakage inductance LLK 114, which may represent the magnetizing and leakage inductance associated with the energy transfer element 116 or a discrete inductor. In dashed lines, a parasitic capacitance Cr 146 is shown to represent all the capacitance that couples to the power switch S1 145 and may include natural capacitance internal to the energy transfer element 116, the natural internal capacitance of power switch S1 145 and/or discrete capacitors. Also shown in FIG. 1 are a secondary current $I_S$ 121, an output voltage VO 123, an output current $I_O$ 127, an output quantity $U_O$ 136, a feedback signal $U_{FB}$ 132, a clamp voltage $V_{CL}$ 109, clamp current $I_{CL}$ 110, and a leakage voltage $V_L$ 111. In the illustrated example, the power converter 100 is shown as having a flyback topology. It is appreciated that other known topologies and configurations of power converters may also benefit from the teachings of the present disclosure.

The power converter 100 provides output power to a load 124 from an unregulated input voltage $V_{IN}$ 101. In one embodiment, the input voltage $V_{IN}$ 101 is a rectified and filtered ac line voltage. In another embodiment, the input voltage $V_{IN}$ 101 is a dc input voltage. The energy transfer element 116 is coupled to receive the input voltage $V_{IN}$ 101. In some embodiments, the energy transfer element 116 may be a coupled inductor, transformer, or an inductor. The example energy transfer element 116 is shown as including two windings, a primary winding 118 (with $N_P$ number of turns) and secondary winding 120 (with $N_S$ number of turns). However, the energy transfer element 116 may have more than two windings. The voltage across the primary winding 118 is illustrated as the primary voltage with the positive polarity at the dot end of the primary winding 118. When the power switch S1 145 is ON, the primary voltage is substantially equal to the negative sum of the input voltage $V_{IN}$ 101 and the leakage voltage $V_L$ 111, or mathematically: $V_P=-(V_{IN}+V_L)$. When the power switch S1 145 is OFF, the primary voltage is substantially equal to the reflected output voltage of the secondary winding 120. The primary winding 118 of the energy transfer element is further coupled to the power switch S1 145 and the power switch S1 145 is further coupled to input return 126.

In operation, the primary controller 133 determines a first mode of operation in response to the input line voltage sense signal $U_{LS}$ 149. The first mode of operation occurs when the input line voltage sense signal $U_{LS}$ 149 is less than a CCM threshold. In one example, the CCM threshold can be in the range of 130 volts. When the power switch S1 145 is turned off, after being turned on, the drain-source voltage rises at a rate that is determined by the peak current at turn-off of the power switch and the capacitance CP 146. The drain to source voltage will continue to rise until clamped to the clamp voltage $V_{CL}$ 109 of the clamp capacitor $C_{CL}$ 104 through diode 115. Prior to the turn on of the power switch S1 145, the clamp switch 108 is turned on by the clamp driver 106. The leakage inductance $L_{LK}$ 114 and the primary winding 118 is charged by the clamp capacitor voltage across $C_{CL}$ 104 through the clamp switch 108 in the on state. When the clamp switch 108 is turned on, voltage is applied to the leakage inductance $L_{LK}$ 114 which causes current to rise through in the opposite direction of when the power switch S1 145 was on. After a specified time, clamp switch 108 is turned off. The turn off of the clamp switch 108 causes the fdrain to source voltage of the power switch S1 145 to fall substantially to zero. During that time, the leakage and energy that had been charged by the clamp switch 108 being on is discharged. After the drain voltage has reach substantially to zero volts the power switch S1 145 can be turned on.

Furthermore, the primary controller 133 can determine a second mode of operation in response to the input line voltage sense signal $U_{LS}$ 149. The second mode of operation occurs when the input line voltage sense signal $U_{LS}$ 149 is greater than a DCM threshold. In one example the DCM threshold is in the range of 150 volts.

When the power switch S1 145 is turned off, after being turned on, the drain-source voltage rises at a rate that is determined by the peak current at turn-off of power switch S1 145 and the capacitance Cr 146. The drain to source voltage will continue to rise until clamped to the clamp voltage Vu 109 through diode 115. Prior to the turn on of the power switch S1 145, the clamp switch 108 is turned on by the clamp driver 106. When the clamp switch 108 is turned on, voltage is applied to the leakage inductance $L_{LK}$ 114 and the magnetizing inductance $L_{MAG}$ 112 which causes current to rise through in the opposite direction as compared to when the power switch S1 145 was on. After a specified time, clamp switch 108 is turned off. The turn off clamp switch causes the drain to source voltage of power switch S1 145 to fall substantially to zero. During that time the leakage and magnetizing energy that had been charged by the clamp switch 108 being on is discharged. This causes the voltage across drain to source of the power switch S1 145 to decrease and eventually reach zero. This mode typically takes longer to reach zero volts on the drain of the power switch S1 145 which is accommodated by second mode of operation by increasing the delay between clamp switch 108 turning off and the power switch S1 145 turning on. After the drain voltage has reach substantially to zero volts the main switch is turned on.

As shown, the leakage inductance $L_{LK}$ 114 may be coupled between the power switch S1 145 and the primary winding 118. The leakage inductance $L_{LK}$ 114 which may represent the leakage inductance associated with the energy transfer element 116 or a discrete inductor. The voltage across the uncoupled leakage inductance $L_{LK}$ 114 may be denoted as the leakage voltage $V_L$ 111.

Coupled across the primary winding 118 and the leakage inductance $L_{LK}$ 114 is the clamp switch 108. The clamp driver 106 is coupled to the clamp capacitance $C_{CL}$ 104 through the clamp switch 108. The voltage across the clamp capacitance $C_{CL}$ 104 is denoted as the clamp voltage $V_{CL}$ 109 while the current in the clamp circuit is denoted as clamp current $I_{CL}$ 110. The clamp switch 108 limits the maximum voltage on the power switch S1 145 and control of the clamp switch 108 (generated by the clamp driver 106) facilitates zero voltage switching of the power switch S1 145. In addition, the clamp driver 106 in conjunction with the clamp switch 108 may reduce RMS current in the power converter 100. Specifically, the clamp drive signal $U_{CD}$ 147 is received at a high side driver 151 which drives the clamp switch 108 (illustrated as a transistor). The clamp switch 108 is controlled to turn ON to inject current into the primary winding 118. The clamp switch 108 is turned ON for a first duration prior to the power switch S1 145 turning ON. In other words, the clamp switch 108 is not turned ON for the entire duration that the power switch S1 145 is turned off. At or near the beginning of the OFF time of the power switch S1 145, the charge associated with the leakage inductance $L_{LK}$ 114 of the power converter 100 is transferred to the clamp capacitance $C_{CL}$ 104 through the diode 115 and is stored. The diode 115 stops conducting substantially after the net charge associated with leakage inductance $L_{LK}$ 114 of the power converter 100 has been transferred. The clamp switch 108 remains OFF until near the end of the OFF time of the power switch S1 145. Once it is determined that the power switch should turn ON, the clamp switch 108 is turned on for a first duration of time. The transistor of the clamp switch 108 is turned on such that the net charge previously transferred to the clamp capacitance $C_{CL}$ 104 associated with the leakage inductance $L_{LK}$ 114 is transferred to the primary winding 118. As such, the energy associated with the leakage inductance $L_{LK}$ 114 is returned to the system rather than being dissipated. In one example, the leakage inductance $L_{LK}$ 114 represents the leakage inductance of the energy transfer element 116. The clamp switch 108 is controlled such that the leakage energy is reset and returned to the power converter rather than being dissipated.

Secondary winding 120 is coupled to the synchronous rectifier 128. The current outputted from the secondary winding 120 is illustrated as secondary current $I_S$ 121. Output capacitor $C_O$ 122 is shown as being coupled to the synchronous rectifier 128 and the output return 125. The power converter 100 further includes circuitry to regulate the output, which is exemplified as output quantity $U_O$ 136. In general, the output quantity $U_O$ 136 can be an output voltage $V_O$ 123, and output current $I_O$ 127, or a combination of the two. A sense circuit 131 is coupled to sense the output quantity $U_O$ 136 and to provide the feedback signal $U_{FB}$ 132, which is representative of the output quantity $U_O$ 136.

As shown, the secondary controller 137 is coupled to receive the feedback signal $U_{FB}$ 132 and generate a request signal $U_{REQ}$ 135 when the feedback signal $U_{FB}$ 132 is below a regulation threshold. The request signal $U_{REQ}$ 135 is transmitted to the primary controller 133 through a communication link to enable the power switch S1 145. In one example, the primary controller 133 and the secondary controller 137 are galvanically isolated from each other. The communication link can be a magnetic coupling or an optical coupling.

The primary controller 133 is coupled to receive the current sense signal 167 and generates the drive signal $U_D$ 144 and the clamp enable signal $U_{CE}$ 168. The current sense signal 167 may be representative of the switch current $I_D$ 143 which is received by the power switch S1 145 and may be a voltage signal or a current signal. In addition, the primary controller 133 provides a drive signal $U_D$ 144 to the power switch S1 145 to control various switching parameters to control the transfer of energy from the input of power converter 100 through the energy transfer element 116 to the output of power converter 100. Examples of such parameters may include switching frequency (or period), duty cycle, ON and OFF times of the power switch S1 145, or varying the number of pulses per unit time of the power switch S1 145. In addition, the power switch S1 145 may be controlled such that it has a fixed switching frequency or a variable switching frequency. In one example of variable switching frequency control, the switching frequency may be reduced for light-load or no-load conditions. Previously, it was difficult to achieve zero voltage switching (ZVS) for flyback converters at lower switching frequencies with conventional active clamp techniques where the clamp circuit is turned on for the entire off-time of the power switch.

Power switch S1 145 is opened and closed in response to the drive signal $U_D$ 144. In operation, the switching of the power switch S1 145 produces a pulsating secondary current $I_S$ 121 which is filtered by the output capacitor $C_O$ 122 to produce a substantially constant output voltage VO 123, output current $I_O$ 127, or a combination of the two. In one example, the power switch S1 145 may be a transistor such as a metal-oxide-semiconductor field-effect transistor (MOSFET). In another example, the power switch S1 145 may comprise a cascode configuration such that a low voltage transistor is coupled to a high voltage junction field effect transistor (JFET). In one example, the JFET may comprise of gallium nitride (GaN) or silicon carbide (SiC) material. The primary controller 133, secondary controller 137, and power switch 145 may be implemented as a monolithic integrated circuit or may be implemented with discrete electrical components or a combination of discrete and integrated components.

Figure 2:
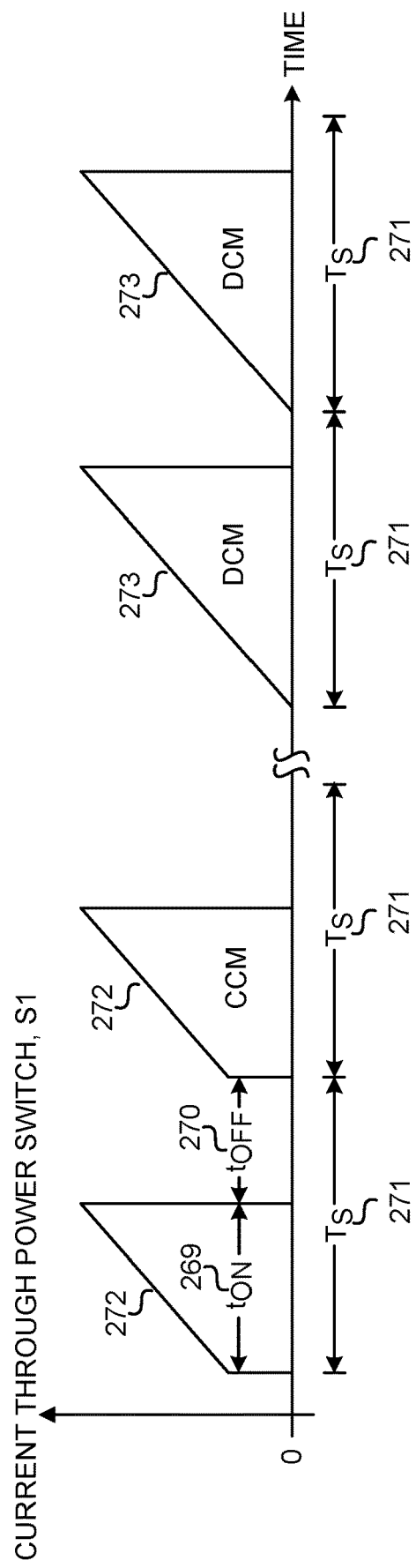
FIG. 2 illustrates one example of a timing diagram that illustrates a current of a power switch used in the power converter of FIG. 1, in accordance with embodiments of the present disclosure.

FIG. 2 illustrates a diagram of current through the power switch S1 145 of FIG. 1 for various modes of control including a switch on-time $t_{ON}$ 269, switch off-time torr 270, a switching period $T_S$ 271, a trapezoidal shape 272, and triangular shape 273. FIG. 2 illustrates the general waveforms of the current through the power switch S1 145 over time in both continuous conduction mode (CCM) and discontinuous conduction mode (DCM).

During any switching period $T_S$ 271, power switch S1 145 may conduct in response to the drive signal $U_D$ 144 from the primary controller 133 to regulate the output quantity $U_O$ 136. The switching period $T_S$ 271 may be separated into two sections of time: switch on-time $t_{ON}$ 269 and switch off-time $t_{OFF}$ 270. Switch on-time $t_{ON}$ 269 denotes the portion of the switching period $T_S$ 271 which the power switch S1 145 is conducting. Switch off-time torr 270 denotes the remaining portion of the switching period $T_S$ 271 when the power switch S1 145 is not conducting. The current waveform of FIG. 2 shows two fundamental modes of operation. The trapezoidal shape 272 is characteristic of CCM, whereas the triangular shape 273 is characteristic of DCM. During CCM, the current through the power switch S1 145 is substantially non-zero immediately after the start of the switch on-time $t_{ON}$ 269 and steadily increases throughout the switch on-time $t_{ON}$ 269. During DCM, the current through the power switch S1 145 is substantially zero at the beginning of the switch on-time $t_{ON}$ 269, and steadily increases from zero throughout the switch on-time $t_{ON}$ 269.

Figure 3:
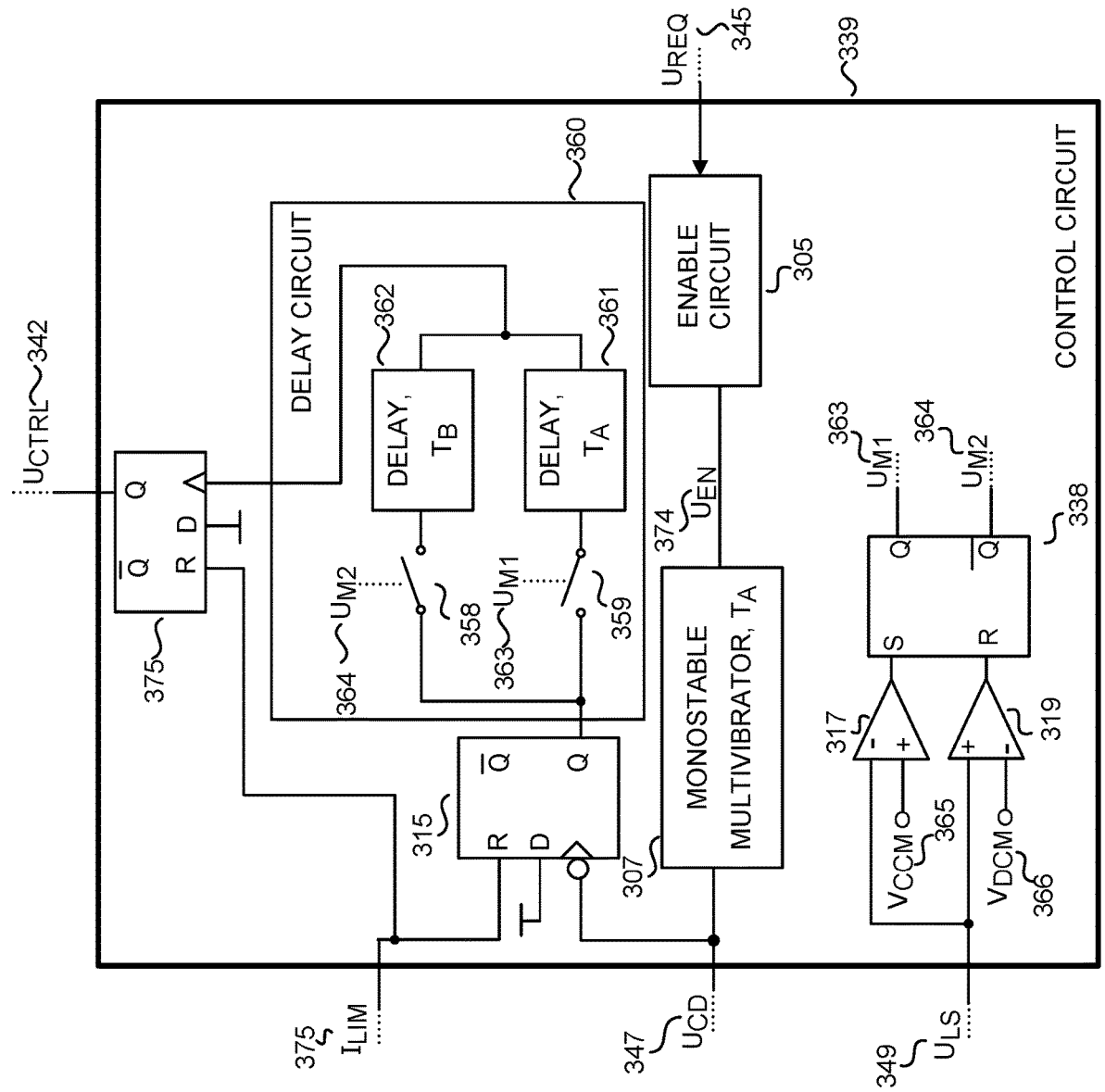
FIG. 3 illustrates one example of a control circuit used in FIG. 1, in accordance with embodiments of the present disclosure.

FIG. 3 illustrates one example of a control circuit used in FIG. 1, in accordance with embodiments of the present disclosure. It is appreciated that control circuit 339 of FIG. 3 may be one example of control circuit 139 of FIG. 1, and that similarly named and numbered elements referenced below are coupled and function similar to as described above.

The control circuit 339 includes an enable circuit 305, flip flops 315, 375, a set-reset (SR) latch 338, comparators 317, 319, a delay circuit 360, and a monostable multivibrator 307. The delay circuit 360 comprises a first switch 358, a second switch 359, a first delay circuit 361, and a second delay circuit 362.

The control circuit 339 can select the control signal $U_{CTRL}$ 342, which is representative of the delay time to turn on the power switch. The delay time depends on the mode of operation of the power converter, which is in response to the input line voltage sense signal $U_{LS}$ 349, the input line voltage sense signal is representative of the line input voltage. The comparator 317 is coupled to receive the input line voltage sense signal $U_{LS}$ 349 at the inverting input and a CCM threshold $V_{CCM}$ 365 at the non-inverting input. Comparator 317 is configured to generate an output with a first state when the input line voltage sense signal $U_{LS}$ 349 is less than the CCM threshold $V_{CCM}$ 365, and further generates the output with a second state when the input line voltage sense signal $U_{LS}$ 349 is not less than the CCM threshold $V_{CCM}$ 365. The output of comparator 317 is coupled to the set input of the SR latch 338. The SR latch 338 is configured to output a first state of a first mode of operation signal $U_{M1}$ 363 in response to the set input. In the example of FIG. 3, the first state of the first mode of operation signal $U_{M1}$ 363 can be a logic high. The first mode of operation represents a CCM operation of the power converter. The SR latch 338 is further configured to output a second mode of operation signal $U_{M2}$ 364 at the inverted output of the SR latch 338. In the example of FIG. 3, the first state of the second mode of operation signal $U_{M2}$ 364 can be a logic low.

Comparator 319 is coupled to receive the input line voltage sense signal $U_{LS}$ 349 at the non-inverting input and a DCM threshold $V_{DCM}$ 366 at the inverting input. Comparator 319 is configured to generate an output with a first state when the input line voltage sense signal $U_{LS}$ 349 is greater than the DCM threshold $V_{DCM}$ 366, and further generates the output with a second state when the input line voltage sense signal $U_{LS}$ 349 is not greater than the DCM threshold $V_{DCM}$ 366. The output of comparator 319 is coupled to the reset input of the SR latch 338. The SR latch 338 is configured to output the second state of the first mode of operation signal $U_{M1}$ 364 in response to the reset input. In the example of FIG. 3, the second state of the first mode of operation signal $U_{M1}$ 363 can be a logic low. The SR latch 338 is further configured to output the second mode of operation signal $U_{M2}$ 364 at the inverted output of the SR latch 338. In the example of FIG. 3, the second state of the second mode of operation signal $U_{M2}$ 364 can be a logic high. The second mode of operation represents a DCM operation of the power converter.

Prior to the turn on of the power switch, control circuit 339 turns on the clamp switch to discharge the clamp capacitor. The enable circuit 305 is coupled to receive the request signal $U_{REQ}$ 135 and configured to generate the enable signal $U_{EN}$ 374. The request signal $U_{REQ}$ 337 is representative of a determination to turn on the power switch. The monostable multivibrator 307 is coupled to the enable circuit 305. The monostable multivibrator 307 is configured to output a pulse for a first duration, wherein the first duration begins near an end of an off time of the power switch in response to a determination to turn on the power switch through the request signal $U_{REQ}$ 337. The pulse is represented by a clamp drive signal $U_{CD}$ 347. After the duration of the pulse ends, the flip flop 315 is configured to generate a first logic state in response to the clamp drive signal $U_{CD}$ 347. The output of flip flop 315 is coupled to switches 358 and 359. The switch 359 is closed by the first mode of operation signal $U_{M1}$ 359, and the flip flop 375 is clocked by the output of the first delay circuit 361. The first delay circuit 361 outputs a first delay, which is the control signal $U_{CTRL}$ 342. The switch 358 is closed by the second mode of operation signal $U_{M2}$ 364, and the flip flop 375 is clocked by the output of the second delay circuit 362. The second delay circuit 362 outputs a second delay, which is the control signal $U_{CTRL}$ 342. The second delay time is greater than the first delay. In one example, the first delay time can be in the range of 50 ns and the second delay time can be in the range from 200 ns. In the first mode of operation, the first delay time accounts for the time of the leakage inductance to bring the drain to source voltage of the power switch to substantially zero. In the second mode of operation, the second delay time accounts for the time of the leakage inductance and the magnetizing inductance to bring the drain to source voltage of the power switch to substantially zero.

Figure 4A:
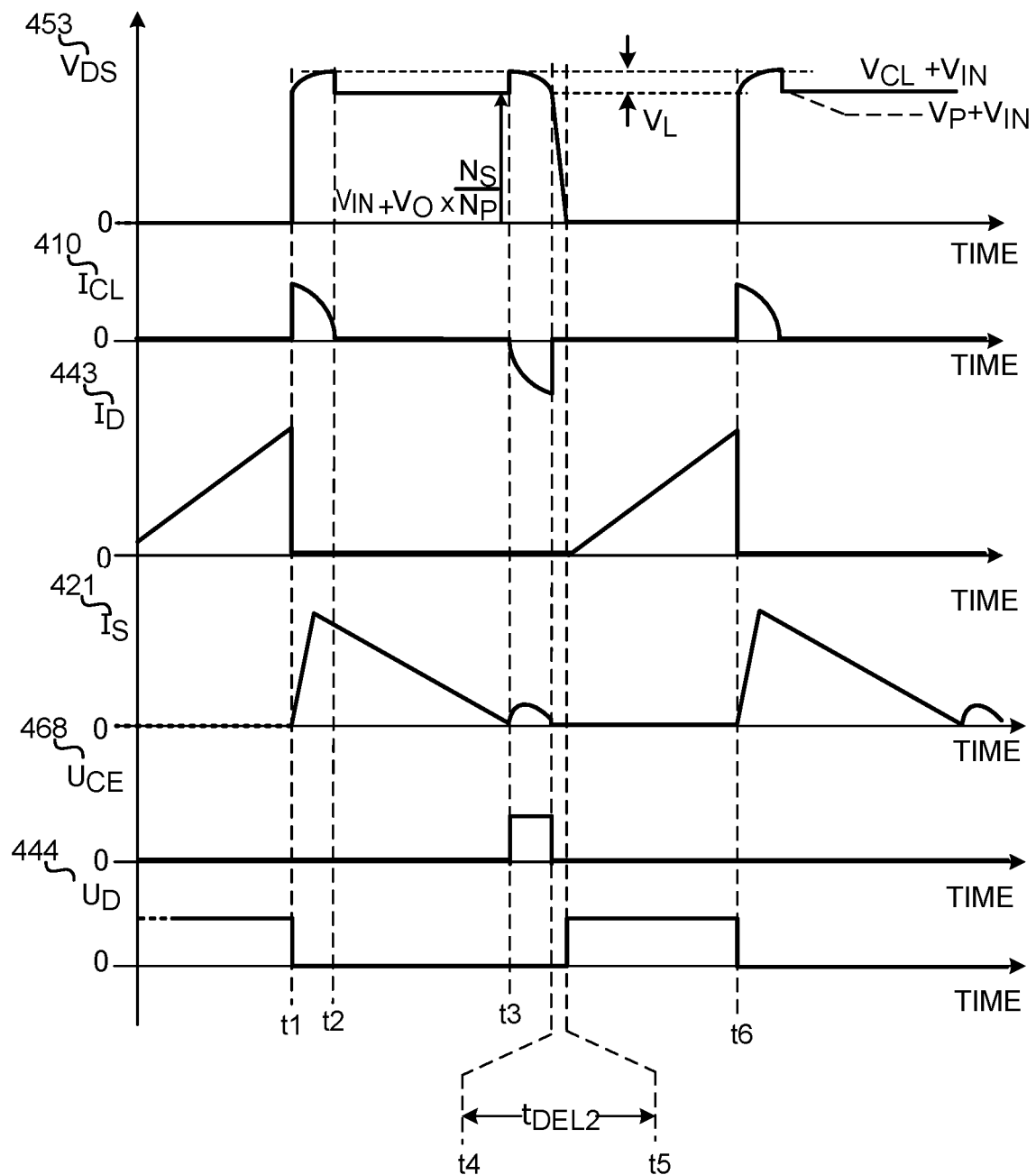
FIG. 4A illustrates another example of a timing diagram that illustrates signals of a power converter such as a drain voltage, a clamp current, a drain current, a secondary current, an enable signal, and a drive signal, in accordance with embodiments of the present disclosure.

FIG. 4A illustrates a timing diagram illustrating a drain-source voltage, a clamp current, a switch current of the power switch, a secondary current, an enable signal, and a drive signal. It is appreciated that the signals mentioned of FIG. 4A may be one example of signals of FIG. 1, and that similarly named and numbered elements referenced below are coupled and function similar to as described above.

The first timing diagram illustrates a drain to source voltage $V_{DS}$ 453. The second timing diagram illustrates a clamp current $I_{CL}$ 410. The third timing diagram illustrates a switch current $I_D$ 443. The fourth timing diagram illustrates a secondary current $I_S$ 421. The fifth timing diagram illustrates clamp enable signal $U_{CE}$ 468. The sixth timing diagram illustrates a drive signal $U_D$ 444.

In the example of FIG. 4A, the mode of operation for the power converter is critical conduction mode (CRM), signified by the triangular shape of the switch current $I_D$ 443. CRM can occur when the line sense input voltage is above the CCM threshold, but below the DCM threshold. In some designs, CRM is capable of using the control signal generated by either the first delay circuit or the second delay circuit as discussed in FIG. 3. At time before t1, the power switch is turned on, such that the drain to source voltage VDS 453 is zero. The clamp current $I_{CL}$ 410 is zero. The switch current $I_D$ 443 is rising. The secondary current $I_S$ 421 is zero. The clamp enable signal $U_{CE}$ 468 is zero. The drive signal $U_D$ 444 is a logic high.

At time t1, the power switch is turned off, as denoted by the drive signal $U_D$ 444 is a logic low. As a result, the drain to source voltage VDS 453 rises to the input voltage plus the clamp voltage. The clamp capacitor is being charged as denoted by the clamp current $I_{CL}$ 410. Energy stored in the energy transfer element is transferred from the primary winding to the secondary winding as shown by the linearly decreasing waveform of the secondary current $I_S$ 421. After t1 and before t2, the drain to source voltage $V_{DS}$ 453 rises and is equal to the input voltage plus the clamp voltage. The clamp capacitor continues charging as denoted by the clamp current $I_{CL}$ 410 decaying to zero. The drive signal $U_D$ 444 is logic low, therefore the switch current $I_D$ 443 is also zero.

At time t2, drain to source voltage $V_{DS}$ 453 reduces to the input voltage plus the reflected output voltage of the secondary winding. The clamp current $I_{CL}$ 410 is zero, signifying the clamp capacitor is no longer being charged. The switch current $I_D$ 443 is zero as energy was transferred by the primary winding to the secondary winding. The secondary current $I_S$ 421 is a non-zero value and reducing in a linear fashion. The clamp enable signal $U_{CE}$ 468 is logic low. The drive signal $U_D$ 444 is logic low. At time between t2 to t3, the drain to source voltage $V_{DS}$ 453 is a non-zero value and with a slope of zero representing that the synchronous rectifier is conducting. The clamp current $I_{CL}$ 410 is zero. The secondary current $I_S$ 421 is decreasing linearly. The clamp enable signal $U_{CE}$ 468 is logic low. The drive signal $U_D$ 444 is logic low.

At time t3, the clamp driver generates a clamp enable signal $U_{CE}$ 468 to turn on the clamp switch prior to the turn of the power switch. The drain to source voltage $V_{DS}$ 453 rises to the clamp voltage plus the input voltage. The clamp capacitor discharges as denoted by the negative polarity of the clamp current $I_{CL}$ 410 due to energy being transferred to the secondary winding of the energy transfer element. The switch current $I_D$ 443 is zero. The secondary current $I_S$ 421 begins to increase due to the turn of the clamp switch. The drive signal $U_D$ 444 is logic low as the power switch is off.

At time t4, the clamp enable signal $U_{CE}$ 468 transitions to logic low. The clamp current $I_{CL}$ 410 drops to zero. The switch current $I_D$ 443 is zero. The drain to source voltage $V_{DS}$ 453 reduces toward the input voltage. The drive signal $U_D$ 444 is logic low.

The time between t4 and time t5 represents the second delay time as discussed in FIG. 3, shown as by $t_{DEL2}$. With respect to FIG. 3, the second delay time is represented as $T_B$ of second delay circuit 362. The magnetizing inductance and the leakage inductance reduces the drain to source voltage $V_{DS}$ 453 to zero to provide zero voltage switching. In other examples for CRM, the leakage inductance can reduce the drain to source voltage $V_{DS}$ 453 to zero to provide ZVS of the power switch. The clamp current $I_{CL}$ 410 is zero. The switch current $I_D$ 443 is zero. The secondary current $I_S$ 421 is zero. The clamp enable signal $U_{CE}$ 468 is logic low. The drive signal $U_D$ 444 is logic low.

At time t5, is the end of the delay time $t_{DEL2}$. The drain to source voltage $V_{DS}$ 453 is zero, and the power switch is turned on as denoted by the drive signal $U_D$ 444 transitioning to logic high. The clamp current $I_{CL}$ 410 is zero. The switch current $I_D$ 443 begins to increase linearly. The secondary current $I_S$ 421 is zero. The clamp enable signal $U_{CE}$ 468 is logic low.

At time after t5 and before t6, the power switch is on as denoted by the logic high of the drive signal $U_D$ 444. The drain to source voltage $V_{DS}$ 453 is zero. The switch current $I_D$ 443 rises linearly. In one example, the switch current $I_D$ 443 continues to rise until it hits the current limit (not shown). The secondary current $I_S$ 421 is zero. The clamp enable signal $U_{CE}$ 468 is zero.

At time t6, the power switch is turned off, as denoted by the drive signal $U_D$ 444 is a logic low. As a result, the drain to source voltage $V_{DS}$ 453 rises to the input voltage plus the clamp voltage. The clamp capacitor is being charged as denoted by the clamp current $I_{CL}$ 410. Energy stored in the energy transfer element is transferred from the primary winding to the secondary winding as shown by the linearly increasing waveform of the secondary current $I_S$ 421. After t1 and before t2, the drain to source voltage is equal to the input voltage plus the clamp voltage. The clamp capacitor is still charging as denoted by the clamp current $I_{CL}$ 410 decaying to zero. The drive signal $U_D$ 444 is logic low, therefore the switch current $I_D$ 443 is also zero.

Figure 4B:
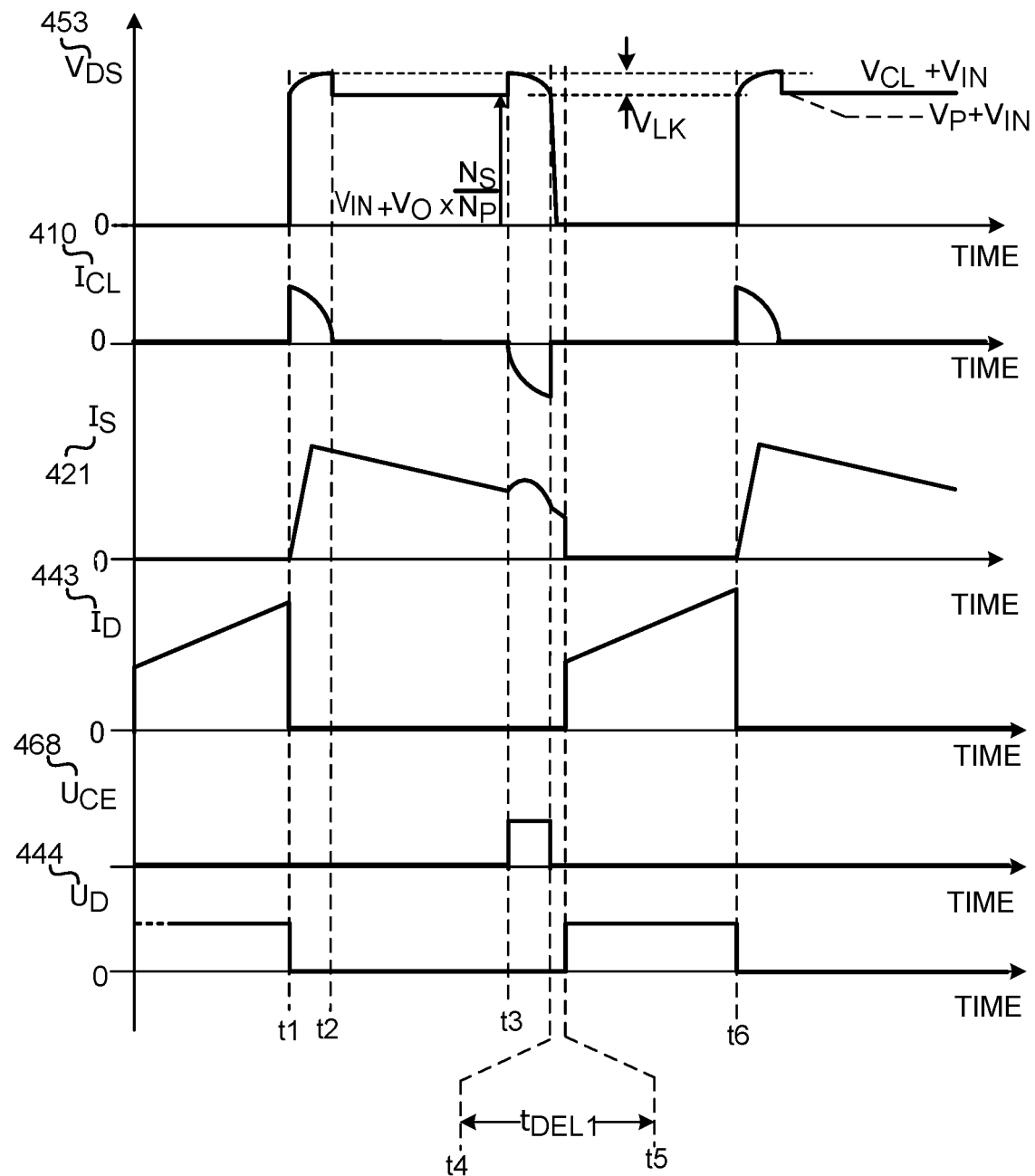
FIG. 4B illustrates another example of a timing diagram that illustrates signals of a power converter such as a drain-source voltage, a clamp current, a drain current, a secondary current, an enable signal, and a drive signal, in accordance with embodiments of the present disclosure.

FIG. 4B illustrates a timing diagram illustrating a drain-source voltage, a clamp current, a switch current of the power switch, a secondary current, a clamp enable signal, and a drive signal. It is appreciated that the signals mentioned of FIG. 4B may be one example of signals of FIG. 1, and that similarly named and numbered elements referenced below are coupled and function similar to as described above.

The first timing diagram illustrates a drain to source voltage $V_{DS}$ 453. The second timing diagram illustrates a clamp current $I_{CL}$ 410. The third timing diagram illustrates a switch current $I_D$ 443. The fourth timing diagram illustrates a secondary current $I_S$ 421. The fifth timing diagram illustrates clamp enable signal $U_{CE}$ 468. The sixth timing diagram illustrates a drive signal $U_D$ 444.

In the example of FIG. 4B, the mode of operation for the power converter is CCM, signified by the trapezoidal shape of the switch current $I_D$ 443. At time before t1, the power switch is turned on, such that the drain to source voltage $V_{DS}$ 453 is zero. The clamp current $I_{CL}$ 410 is zero. The switch current $I_D$ 443 is rising. The secondary current $I_S$ 421 is zero. The clamp enable signal $U_{CE}$ 468 is zero. The drive signal $U_D$ 444 is a logic high.

At time t1, the power switch is turned off, as denoted by the drive signal $U_D$ 444 transitioning to a logic low. As a result, the drain to source voltage $V_{DS}$ 453 rises to the input voltage plus the clamp voltage. The clamp capacitor is being charged as denoted by the clamp current $I_{CL}$ 410. Energy stored in the energy transfer element is transferred from the primary winding to the secondary winding as shown by the increase in secondary current $I_S$ 421. After t1 and before t2, the drain to source voltage $V_{DS}$ 453 is equal to the input voltage plus the clamp voltage. The clamp capacitor continues charging as denoted by the clamp current $I_{CL}$ 410 decaying to zero. The secondary current $I_S$ 421 rises as energy is transferred from the primary winding to the secondary winding. The drive signal $U_D$ 444 is logic low, therefore the switch current $I_D$ 443 is also zero.

At time t2, the drain to source voltage $V_{DS}$ 453 reduces to the input voltage plus the reflected output voltage of the secondary winding. The clamp current $I_{CL}$ 410 is zero, indicating the clamp capacitor is no longer being charged. The switch current $I_D$ 443 is zero as energy was transferred by the primary winding to the secondary winding. The secondary current $I_S$ 421 is a non-zero value and reducing in a linear fashion. The clamp enable signal $U_{CE}$ 468 is logic low. The drive signal $U_D$ 444 is logic low. At time between t2 to t3, the drain to source voltage $V_{DS}$ 453 is a non-zero value and with slope of zero representing that the synchronous rectifier is conducting. The clamp current $I_{CL}$ 410 is zero. The secondary current $I_S$ 421 is decreasing linearly. The clamp enable signal $U_{CE}$ 468 is logic low. The drive signal $U_D$ 444 is logic low.

At time t3, the clamp driver generates a clamp enable signal $U_{CE}$ 468 to turn on the clamp switch prior to the turn of the power switch. The drain to source voltage $V_{DS}$ 453 rises to the clamp voltage plus the input voltage. The clamp capacitor discharges as denoted by the negative polarity of the clamp current $I_{CL}$ 410 due to energy being transferred from the primary winding to the secondary winding of the energy transfer element. The secondary current $I_S$ 421 is non zero and rises slightly due to energy stored in the clamp capacitor being transferred to the secondary. The switch current $I_D$ 443 is zero. The drive signal $U_D$ 444 is logic low as the power switch is off.

At time t4, the clamp enable signal $U_{CE}$ 468 transitions to logic low. The drain to source voltage $V_{DS}$ 453 is decaying quickly to zero. The clamp current $I_{CL}$ 410 is zero. The switch current $I_D$ 443 is zero. The drive signal $U_D$ 444 is logic low.

The time between t4 and time t5 represents the first delay time as discussed in FIG. 3 shown as time $T_A$ of first delay circuit 361, and illustrated as $T_{DEL1}$ in FIG. 4B. The discharging of the leakage inductance reduces to the drain to source voltage $V_{DS}$ 453 to zero to provide ZVS of the power switch. The clamp current $I_{CL}$ 410 is zero. The switch current $I_D$ 443 is zero. The secondary current $I_S$ 421 is decreasing toward zero. The clamp enable signal $U_{CE}$ 468 is logic low. The drive signal $U_D$ 444 is logic low.

At time t5, the drain to source voltage $V_{DS}$ 453 is zero, and the power switch is turned on as denoted by the drive signal $U_D$ 444 transitioning to logic high. The clamp current $I_{CL}$ 410 is zero. The switch current $I_D$ 443 begins to increase linearly. The secondary current $I_S$ 421 is zero. The clamp enable signal $U_{CE}$ 468 is logic low.

At time after t5 and before t6, the power switch is on as denoted by the logic high of the drive signal $U_D$ 444. The drain to source voltage $V_{DS}$ 453 is zero. The switch current $I_D$ 443 continues to rise linearly. In one example, the switch current $I_D$ 443 continues to rise until it hits the current limit (not shown). The secondary current $I_S$ 421 is zero. The clamp enable signal $U_{CE}$ 468 is zero.

At time t6, the power switch is turned off, as denoted by the drive signal $U_D$ 444 transitioning to a logic low. As a result, the drain to source voltage $V_{DS}$ 453 rises to the input voltage. The clamp capacitor is being charged as denoted by the clamp current $I_{CL}$ 410. Energy stored in the energy transfer element is transferred from the primary winding to the secondary winding as shown by the increase in secondary current $I_S$ 421. After t6, the drain to source voltage $V_{DS}$ 453 rises to the input voltage plus the clamp voltage. The clamp capacitor continues charging as denoted by the clamp current $I_{CL}$ 410 decaying to zero. The drive signal $U_D$ 444 is logic low, therefore the switch current $I_D$ 443 is also zero.

Figure 4C:
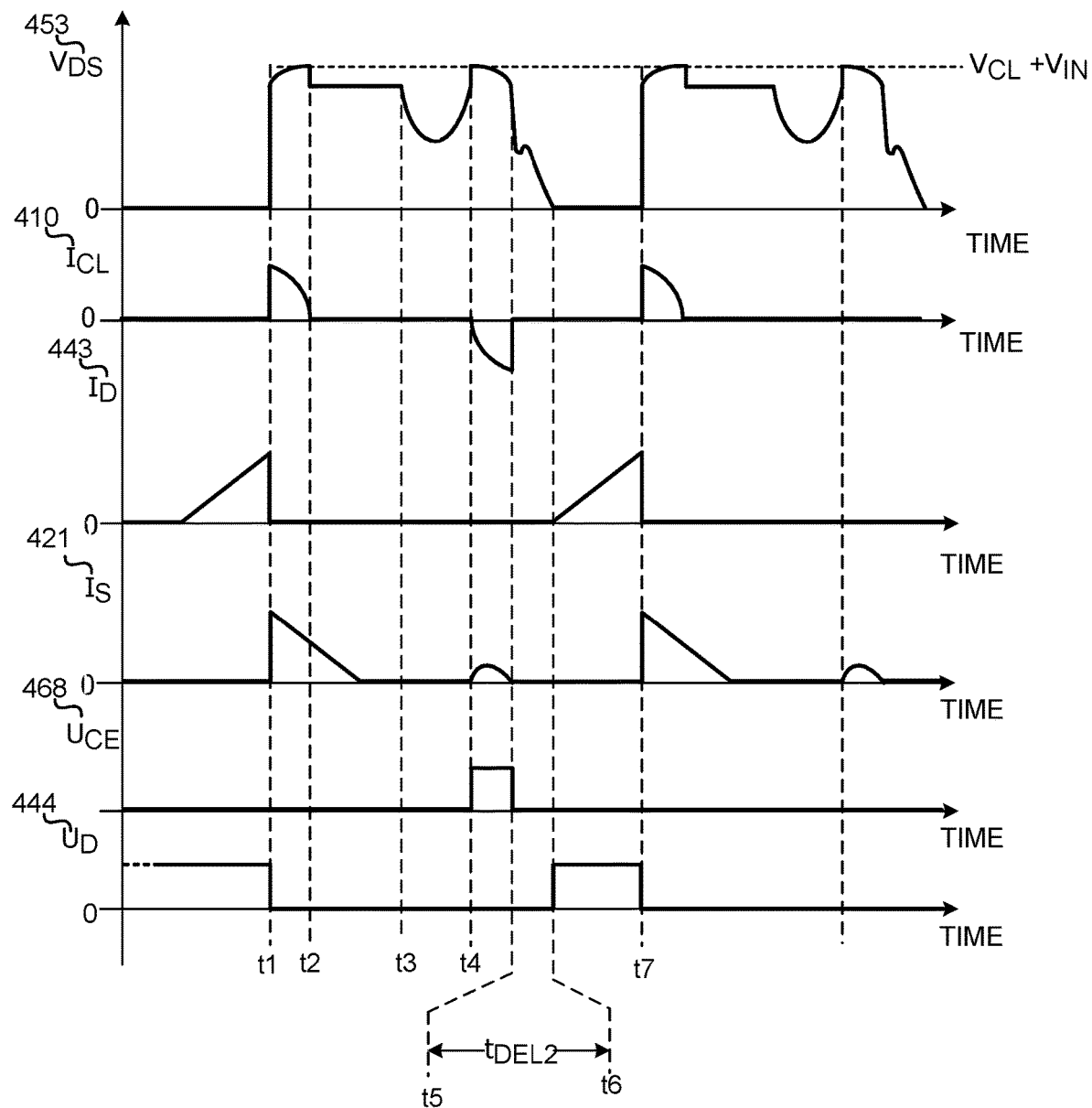
FIG. 4C illustrates a timing diagram illustrating a drain-source voltage, a clamp current, a switch current of the power switch, a secondary current, a clamp enable signal, and a drive signal, in accordance with embodiments of the present disclosure.

FIG. 4C illustrates a timing diagram illustrating a drain-source voltage, a clamp current, a switch current of the power switch, a secondary current, a clamp enable signal, and a drive signal. It is appreciated that the signals mentioned of FIG. 4C may be one example of signals of FIG. 1, and that similarly named and numbered elements referenced below are coupled and function similar to as described above.

The first timing diagram illustrates a drain to source voltage $V_{DS}$ 453. The second timing diagram illustrates a clamp current $I_{CL}$ 410. The third timing diagram illustrates a switch current $I_D$ 443. The fourth timing diagram illustrates a secondary current $I_S$ 421. The fifth timing diagram illustrates a clamp enable signal $U_{CE}$ 468. The sixth timing diagram illustrates a drive signal $U_D$ 444.

In the example of FIG. 4C, the mode of operation for the power converter is DCM, signified by the triangular shape of the switch current $I_D$ 443. At time before t1, the power switch is turned on, such that the drain to source voltage $V_{DS}$ 453 is zero. The clamp current $I_{CL}$ 410 is zero. The switch current $I_D$ 443 is rising. The secondary current $I_S$ 421 is zero. The clamp enable signal $U_{CE}$ 468 is zero. The drive signal $U_D$ 444 is a logic high.

At time t1, the power switch is turned off, as denoted by the drive signal $U_D$ 444 is a logic low. As a result, the drain to source voltage $V_{DS}$ 453 rises to the input voltage. The clamp capacitor charges as denoted by the clamp current $I_{CL}$ 410. Energy stored in the energy transfer element is transferred from the primary winding to the secondary winding as shown by the sharp increase of the secondary current $I_S$ 421. After t1 and before t2, the drain to source voltage $V_{DS}$ 453 rises to the input voltage plus the clamp voltage. The clamp capacitor continues charging as denoted by the clamp current $I_{CL}$ 410 decaying to zero. The drive signal $U_D$ 444 is logic low, therefore the switch current $I_D$ 443 is also zero.

At time t2, the drain to source voltage $V_{DS}$ 453 reduces to the input voltage plus the reflected output voltage of the secondary winding. The clamp current $I_{CL}$ 410 is zero, signifying the clamp capacitor is no longer being charged. The switch current $I_D$ 443 is zero as energy was transferred from the primary winding to the secondary winding. The secondary current $I_S$ 421 is a non-zero value and reducing in a linear fashion. The clamp enable signal $U_{CE}$ 468 is logic low. The drive signal $U_D$ 444 is logic low. At time between t2 to t3, the drain to source voltage $V_{DS}$ 453 is a non-zero value and with slope of zero representing that the synchronous rectifier is conducting. The clamp current $I_{CL}$ 410 is zero. The secondary current $I_S$ 421 decreases linearly. The clamp enable signal $U_{CE}$ 468 is logic low. The drive signal $U_D$ 444 is logic low.

At time t3, the drain to source voltage $V_{DS}$ 343 begins to oscillate caused by completion of energy transfer from the primary winding and the secondary winding, such that the secondary current $I_S$ 421 is zero. The oscillation is caused by the resonant tank formed by the leakage and magnetizing inductances and the resonant capacitance of the power switch. At time t4, the drain to source voltage $V_{DS}$ 453 is at peak value and the clamp driver generates a clamp enable signal $U_{CE}$ 468 to turn on the clamp switch prior to the turn of the power switch which causes the drain to source voltage $V_{DS}$ 453 to rise to the input voltage plus the clamp voltage again. The clamp capacitor discharges as denoted by the negative polarity of the clamp current $I_{CL}$ 410 due to energy being transferred from the clamp capacitor through the primary winding to the secondary winding of the energy transfer element. The switch current $I_D$ 443 is zero. The secondary current $I_S$ 421 begins to increase due to the turn on of the clamp switch, signifying energy stored from the clamp capacitor is transferred to the secondary winding through the primary winding. The drive signal $U_D$ 444 is logic low as the power switch is off.

At time t5, the clamp enable signal $U_{CE}$ 468 transitions to logic low. The clamp current $I_{CL}$ 410 drops to zero. The switch current $I_D$ 443 is zero. The drain to source voltage $V_{DS}$ 453 reduces towards zero. The drive signal $U_D$ 444 is logic low.

The time between t5 and before time t6 represents the delay time as discussed in FIG. 3 as delay $T_B$ of second delay circuit 362, as shown by $t_{DEL2}$. Although the drain to source voltage $V_{DS}$ 453 is decreasing towards zero, the leakage inductance causes a slight increase momentarily. For DCM operation, the leakage inductance and the magnetizing inductance can reduce the drain to source voltage $V_{DS}$ 453 to zero to provide zero voltage switching. The clamp current $I_{CL}$ 410 is zero. The switch current $I_D$ 443 is zero. The secondary current $I_S$ 421 is zero. The clamp enable signal $U_{CE}$ 468 is logic low. The drive signal $U_D$ 444 is logic low.

At time t6, the drain to source voltage $V_{DS}$ 453 is zero, and the power switch is turned on as denoted by the drive signal $U_D$ 444 transitioning to logic high. The clamp current $I_{CL}$ 410 is zero. The switch current $I_D$ 443 begins to increase linearly. The secondary current $I_S$ 421 is zero. The clamp enable signal $U_{CE}$ 468 is logic low.

At time after t6 and before t7, the power switch is on as denoted by the logic high of the drive signal $U_D$ 444. The drain to source voltage $V_{DS}$ 453 is zero. The switch current $I_D$ 443 rises linearly. In one example, the switch current continues to rise until it hits the current limit (not shown). The secondary current $I_S$ 421 is zero. The clamp enable signal $U_{CE}$ 468 is zero.

At time t7, the power switch is turned off and the behavior is the same as after time t1, described before.

Figure 5A:
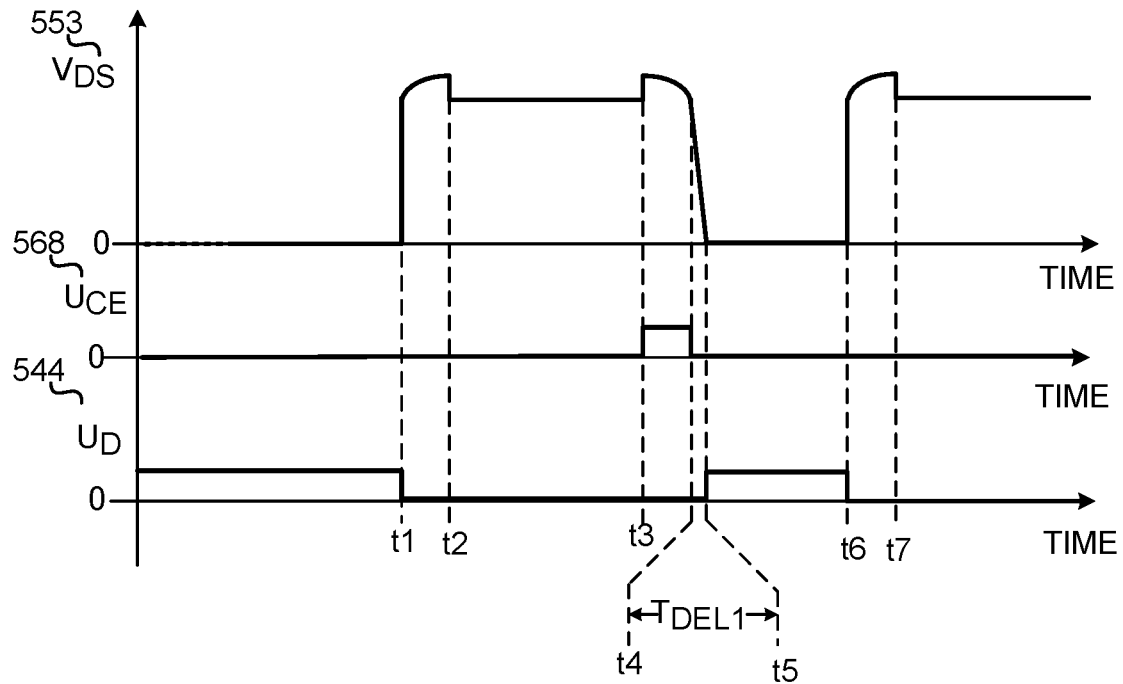
FIG. 5A illustrates an example of a timing diagram that illustrates signals of a power converter such as a drain voltage, an enable signal, and a drive signal, in accordance with embodiments of the present disclosure.

FIG. 5A illustrates an example of a timing diagram that illustrates signals of a power converter such as a drain voltage, an enable signal, and a drive signal, in accordance with embodiments of the present disclosure. It is appreciated that the signals mentioned in FIG. 5A may be one example of signals from previous figures and that similarly named and numbered elements referenced below are coupled and function similar to as described above. It should also be appreciated that the signals mentioned in FIG. 5A may be one example of signals in upcoming figures and that similarly named and numbered elements referenced couple and function similar to as described above and below.

The first timing diagram is a drain to source voltage $V_{DS}$ 553. The second timing diagram is a clamp enable signal $U_{CE}$ 568. The third timing diagram is a drive signal $U_D$ 544. The operation of the power converter is CRM, but could also be CCM. As mentioned previously, CRM can occur when the line sense input voltage is above the CCM threshold, but below the DCM threshold. In some designs, CRM is capable of using the control signal generated by either the first delay circuit or the second delay circuit.

At time before t1, the drive signal $U_D$ 544 is logic high, which signifies the power switch is turned on. The drain to source voltage $V_{DS}$ 553 is zero. The clamp enable signal $U_{CE}$ 568 is logic low. At time t1, the drive signal $U_D$ 544 transitions to logic low, which signifies the power switch is turned off. The drain to source voltage $V_{DS}$ 553 rises to the input voltage. At after time t1 and before t2, the drain to source voltage $V_{DS}$ 553 rises to the clamp voltage plus the input voltage. At time t2, the drain to source voltage $V_{DS}$ 553 reduces to the input voltage plus the reflected output voltage of the secondary winding. At time t3, the clamp enable signal $U_{CE}$ 568 transitions to a logic high. The drain to source voltage $V_{DS}$ 553 rises to the clamp voltage because the clamp switch is turned on. At time after t3 and before t4, the drain to source voltage $V_{DS}$ 553 begins to decrease. The clamp enable signal $U_{CE}$ 568 is logic high. The drive signal $U_D$ 544 is logic low.

At time t4, the clamp enable signal $U_{CE}$ 568 transitions to a logic low. The drain to source voltage $V_{DS}$ 553 reduces towards zero. After time t4 and before t5 represents the first delay time $t_{DEL1}$ generated as the control signal prior to the turn on of the power switch. It should be appreciated that in one example the first delay time $T_{DEL1}$ is also referred to as delay $T_A$ of first delay circuit 361 in FIG. 3. At time t5, the drain to source voltage $V_{DS}$ 553 is at zero. The drive signal $U_D$ 544 transitions to a logic high. At time after t5 and before t6, the drain to source voltage $V_{DS}$ 553 is zero. The clamp enable signal $U_{CE}$ 568 is zero. The drive signal $U_D$ 544 is logic high. At time t6, the drive signal $U_D$ 544 transitions to logic low, which signifies the power switch is turned off. The drain to source voltage $V_{DS}$ 553 rises to the input voltage. At after time t6 and before t7, the drain to source voltage $V_{DS}$ 553 rises to the clamp voltage plus the input voltage. At time t7, the drain to source voltage $V_{DS}$ 553 reduces to the input voltage plus the reflected output voltage of the secondary winding.

Figure 5B:
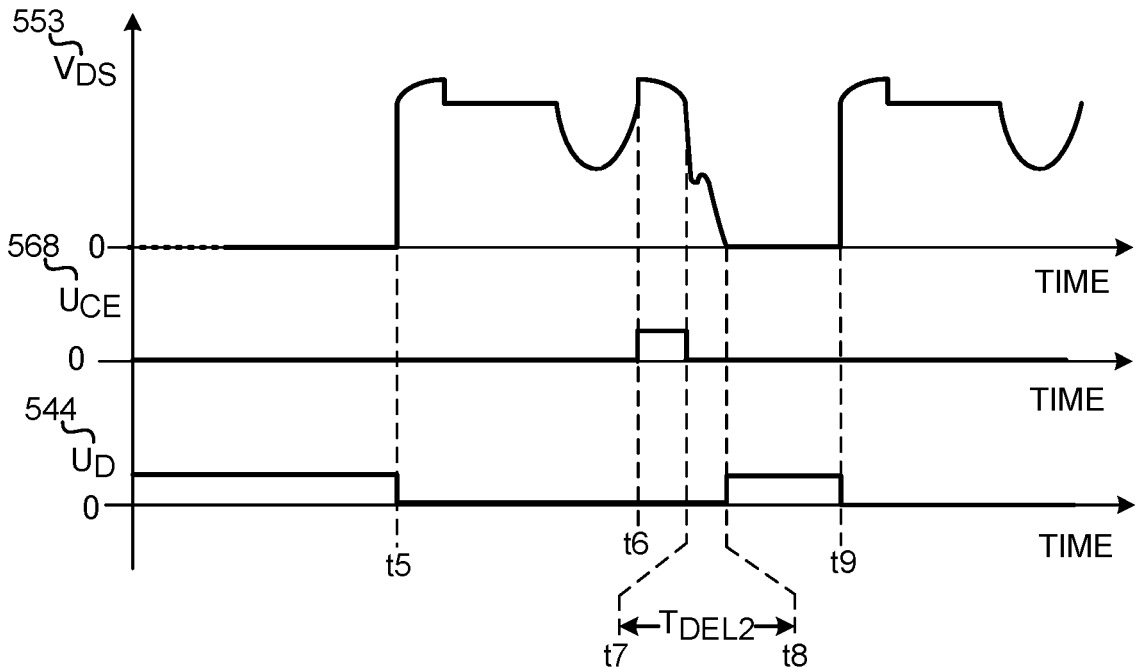
FIG. 5B illustrates an example of a timing diagram that illustrates signals of a power converter such as a drain voltage, an enable signal, and a drive signal, in accordance with embodiments of the present disclosure.

FIG. 5B illustrates an example of a timing diagram that illustrates signals of a power converter such as a drain voltage, an enable signal, and a drive signal, in accordance with embodiments of the present disclosure. It is appreciated that the signals mentioned of FIG. 5B may be one example of signals from previous figures, and that similarly named and numbered elements referenced below are coupled and function similar to as described above. It should also be appreciated that the signals mentioned in FIG. 5B may be one example of signals in upcoming figures and that similarly named and numbered elements referenced couple and function similar to as described above and below.

The power converter is operating in DCM. The first timing diagram is a drain to source voltage $V_{DS}$ 553. The second timing diagram is a clamp enable signal $U_{CE}$ 568. The third timing diagram is a drive signal $U_D$ 544.

At time before t5, the power switch is turned on, such that the drain to source voltage $V_{DS}$ 553 is zero. The drive signal $U_D$ 544 is logic high. The clamp enable signal $U_{CE}$ 568 is logic low.

At time t5, the power switch is turned off, as denoted by the drive signal $U_D$ 544 is a logic low. As a result, the drain to source voltage $V_{DS}$ 553 rises to the input voltage. The clamp enable signal $U_{CE}$ 568 is logic low. After t5 and before t6, the drain to source voltage VDs 553 rises to the input voltage plus the clamp voltage. Afterwards, the drain to source voltage begins to oscillate that is caused by completion of energy transfer from the primary winding to the secondary winding. The oscillation is caused by the resonant tank formed by the leakage and magnetizing inductances and the resonant capacitance of the power switch. The drive signal $U_D$ 444 is logic low. The clamp enable signal $U_{CE}$ 568 is logic low.

At time t6, the clamp enable signal $U_{CE}$ 568 becomes logic high. The drain to source voltage $V_{DS}$ 553 is clamped by the clamp capacitor and the input voltage. At time t7, the clamp enable signal $U_{CE}$ 568 becomes logic low. The drain to source voltage $V_{DS}$ 553 reduces towards zero. After time t7 and before t8 represents the delay $t_{DEL2}$ generated as the control signal prior to the turn on of the power switch. It should be appreciated that in one example the second delay time $T_{DEL2}$ is also referred to as delay $T_B$ of second delay circuit 362 in FIG. 3. At time t8, the drain to source voltage $V_{DS}$ 553 is at zero. The drive signal $U_D$ 544 transitions to a logic high. At time t8, the power switch is turned on, such that the drain to source voltage $V_{DS}$ 553 is zero. The drive signal $U_D$ 544 is logic high until time t9. The clamp enable signal $U_{CE}$ 568 is logic low until time t9. At time t9, the drive signal $U_D$ 544 becomes logic low and power switch is turned off, and the drain to source voltage $V_{DS}$ 553 starts to rise.

Figure 6A:
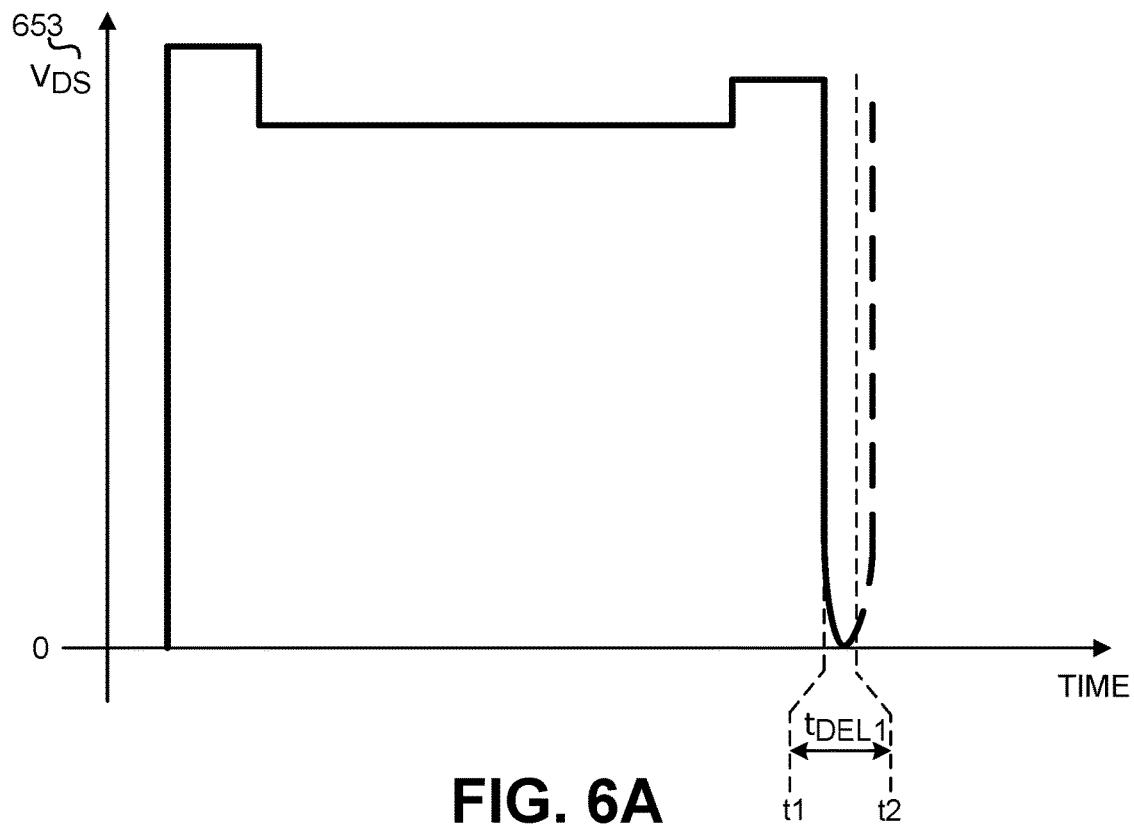
FIG. 6A illustrates an example timing diagram of a drain voltage of a power switch, in accordance with embodiments of the present disclosure.

FIG. 6A illustrates an example timing diagram of a drain voltage of a power switch, in accordance with embodiments of the present disclosure. It is appreciated that the signals mentioned of FIG. 6A may be one example of signals of previous figures, and that similarly named and numbered elements referenced below are coupled and function similar to as described above. It should also be appreciated that the signals mentioned in FIG. 6A may be one example of signals in upcoming figures and that similarly named and numbered elements referenced couple and function similar to as described above and below.

In FIG. 6A, the drain to source voltage Vis 653 is representative of a power converter operating in CCM. The delay time $t_{DEL1}$ represented by time t1 to time t2, is the delay between the clamp switch turning off and the power switch turning on. It should be appreciated that in one example the first delay time $T_{DEL1}$ is also referred to as delay $T_A$ of first delay circuit 361 in FIG. 3. As mentioned previously, only the energy from the leakage inductance can be used to bring the drain to source voltage $V_{DS}$ 653 to zero. After time t2, the dashed line of the drain-source voltage $V_{DS}$ will increase sharply if the power switch does not turn on caused by the resonant tank of the leakage inductance and the resonant capacitance of the power switch.

Figure 6B:
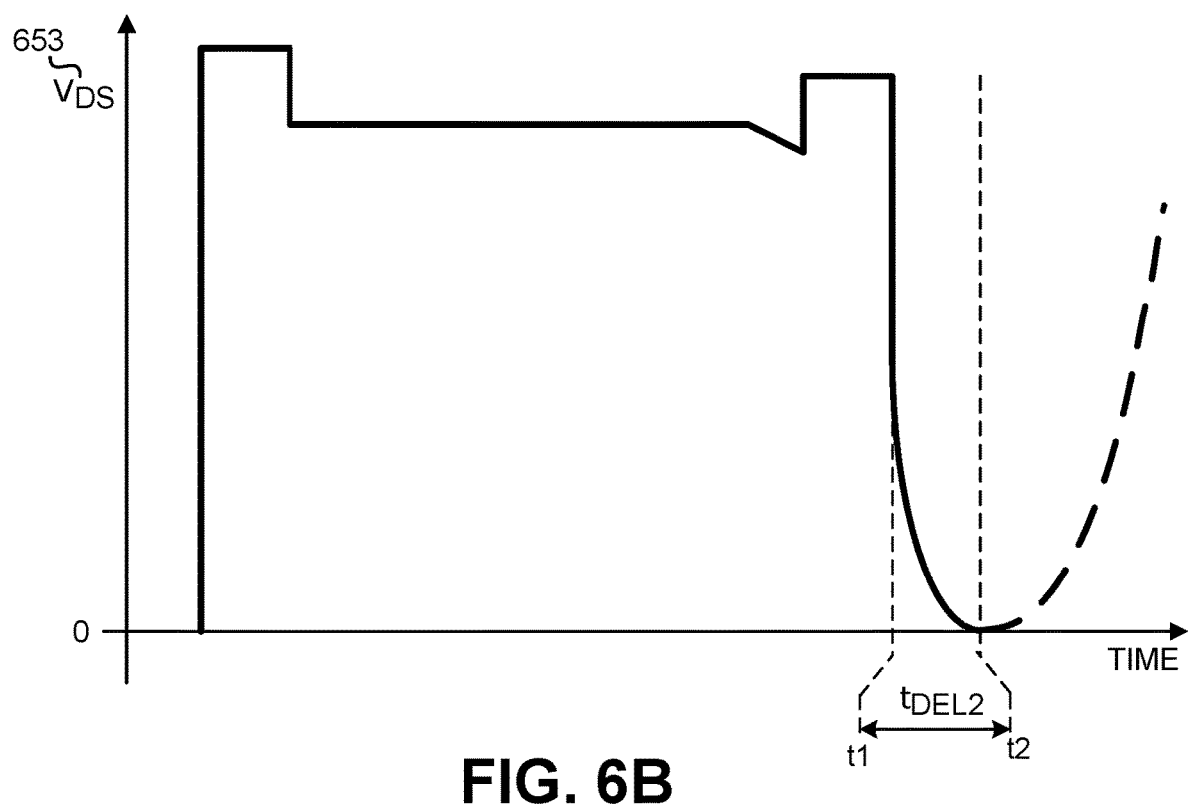
FIG. 6B illustrates another example timing of a drain voltage of a power switch, in accordance with embodiments of the present disclosure.

FIG. 6B illustrates another example timing of a drain voltage of a power switch, in accordance with embodiments of the present disclosure. It is appreciated that the signals mentioned of FIG. 6B may be one example of signals of previous figures, and that similarly named and numbered elements referenced below are coupled and function similar to as described above. It should also be appreciated that the signals mentioned in FIG. 6B may be one example of signals in upcoming figures and that similarly named and numbered elements referenced couple and function similar to as described above and below.

The drain to source voltage $V_{DS}$ 653 is representative of a power converter operating in DCM. The delay time $t_{DEL2}$ represented by time t1 to time t2, represents the delay between the clamp switch turning off and the power switch turning on. It should be appreciated that in one example the second delay time $T_{DEL2}$ is also referred to as delay $T_B$ of second delay circuit 362 in FIG. 3. The second delay time $t_{DEL2}$ is longer than the first delay time in $t_{DEL1}$ in FIG. 6A. The energy from the leakage inductance and the magnetizing inductance can be used to bring the drain to source voltage $V_{DS}$ 653 to zero. After time t2, the dashed line of the drain-source voltage increases sharply if the power switch does not turn on is caused by the resonant tanking comprising of the leakage and the magnetizing inductances and the resonant capacitance of the power switch.

Figure 6C:
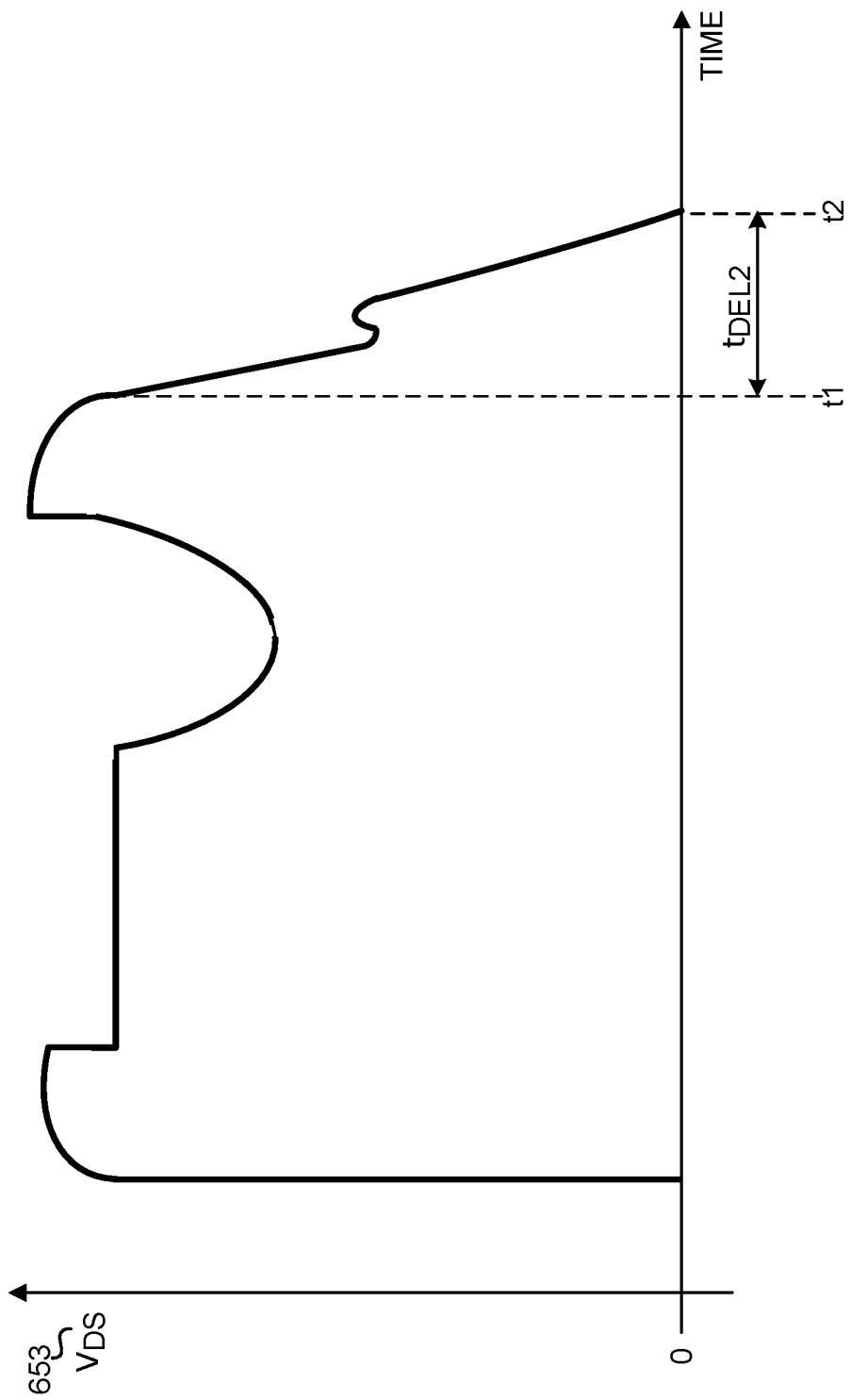
FIG. 6C illustrates another example of a timing diagram drain voltage of a power switch, in accordance with embodiments of the present disclosure.

FIG. 6C illustrates another example of a timing diagram drain voltage of a power switch, in accordance with embodiments of the present disclosure. It is appreciated that the signals mentioned of FIG. 6C may be one example of signals of previous figures, and that similarly named and numbered elements referenced below are coupled and function similar to as described above. It should also be appreciated that the signals mentioned in FIG. 6C may be one example of signals in upcoming figures and that similarly named and numbered elements referenced couple and function similar to as described above and below.

The drain to source voltage $V_{DS}$ 653 is representative of a power converter operating in DCM. The delay time $t_{DEL2}$ represented by time t1 to time t2, represents the delay between the clamp switch turning off and the power switch turning on. It should be appreciated that in one example the second delay time $T_{DEL2}$ is also referred to as delay $T_B$ of second delay circuit 362 in FIG. 3. Prior to time t1, the oscillation of the drain to source $V_{DS}$ 653 represents the end of secondary of conduction caused by the resonant tank of the leakage inductance and the output capacitance. The time $t_{DEL2}$ represents the time before turning on the power switch. The energy from the leakage inductance and the magnetizing inductance can be used to bring the drain to source voltage $V_{DS}$ 653 to zero. The benefit of using the magnetizing inductance to reduce the drain to source voltage $V_{DS}$ 653 allows for minimal overshoot of a drain to source voltage of a synchronous rectifier.

Figure 7:
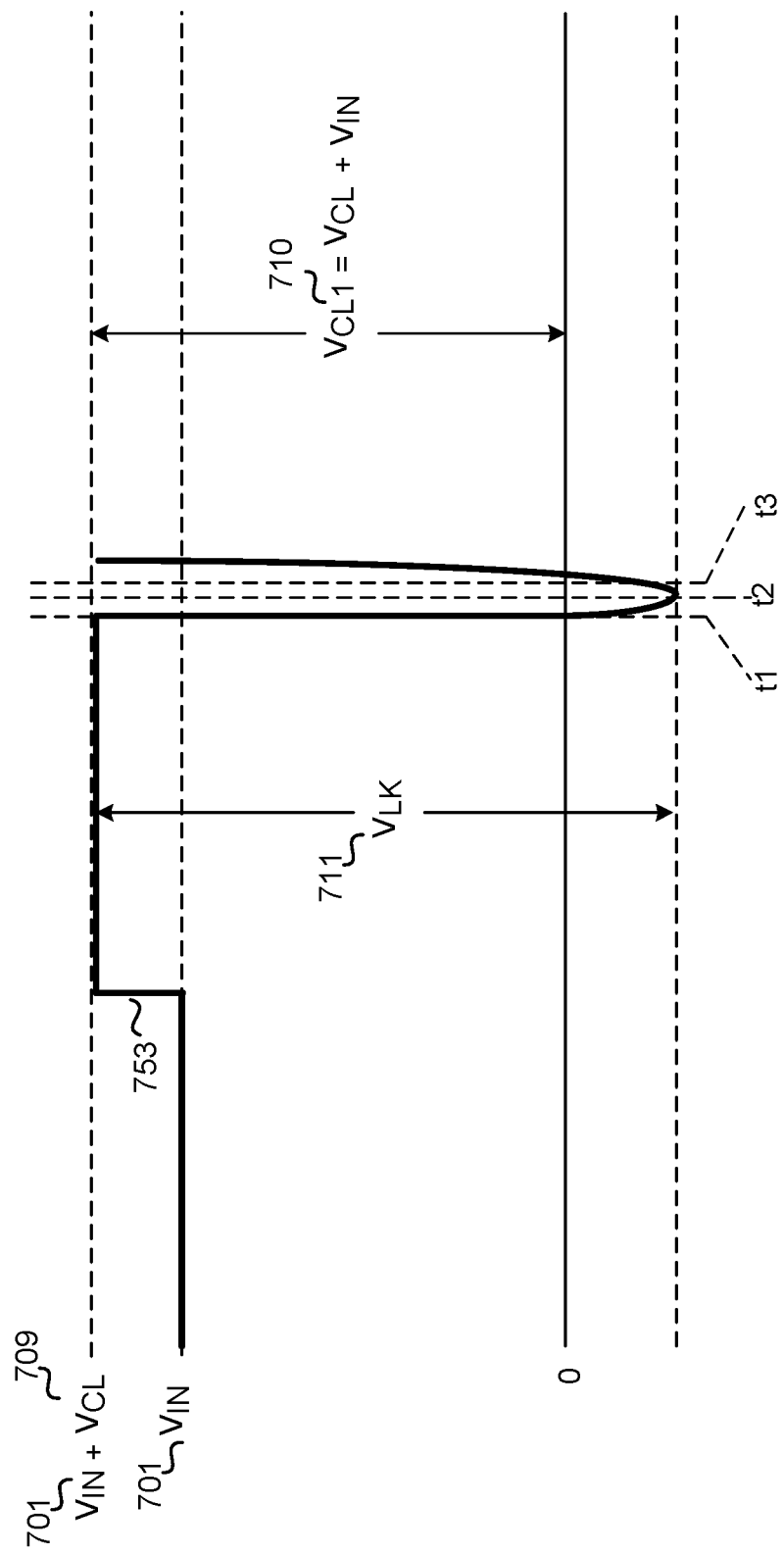
FIG. 7 illustrates a timing diagram of a drain voltage of a power switch, in accordance with embodiments of the present disclosure.

FIG. 7 illustrates a timing diagram of a drain voltage of a power switch, in accordance with embodiments of the present disclosure. It is appreciated that the signals mentioned of FIG. 7 may be one example of signals of previous figures, and that similarly named and numbered elements referenced below are coupled and function similar to as described above. It should also be appreciated that the signals mentioned in FIG. 7 may be one example of signals in upcoming figures and that similarly named and numbered elements referenced couple and function similar to as described above and below.

The timing diagram illustrates a drain to source voltage $V_{DS}$ 753 that rises to the voltage $V_{CL1}$ 710 which is equal to the clamp voltage $V_{CL}$ 709 plus the input voltage $V_{IN}$ 701 when the power switch is turned off, and reaches zero at t2. At time t1, when the clamp switch turns off, the energy stored in the leakage inductance is $L_{LK}I^2$ with respect to $V_{CL}$. The turn off the clamp switch causes current into the resonant capacitor and begins to charge negatively with respect to the clamp voltage. Depending on the application, the peak current of the power switch is defined. When the peak current of the power switch has been defined, and the amount of energy that will charge the clamp capacitor can be determined, and the leakage inductance to achieve ZVS can be defined by $L_{LK} = (C_{RES} * VC_{L1}^2)/0.65 * I_{LIMPK})^2$. The capacitor Cis is the capacitance of the power switch, and $I_{LIMPK}$ is the peak current of the switch. The time from t1 to t2 represents the time for ZVS to occur is a function of the resonant period formed by the leakage inductance and the resonant capacitance and the theoretical unclamped voltage amplitude of the ring $V_{TOTAL}$ can be defined by $$t_{ZVS} = \frac{\pi\sqrt{L_{LK} \times C_{RES}}}{2 \times \sin^{-1}\frac{V_{CL1}}{V_{LK}}} \qquad (1)$$

At time t3, if the power switch is not turned on the resonant tank formed by the leakage inductance and the output capacitance of the power switch can cause the drain to source voltage to rise rapidly.

Figure 8:
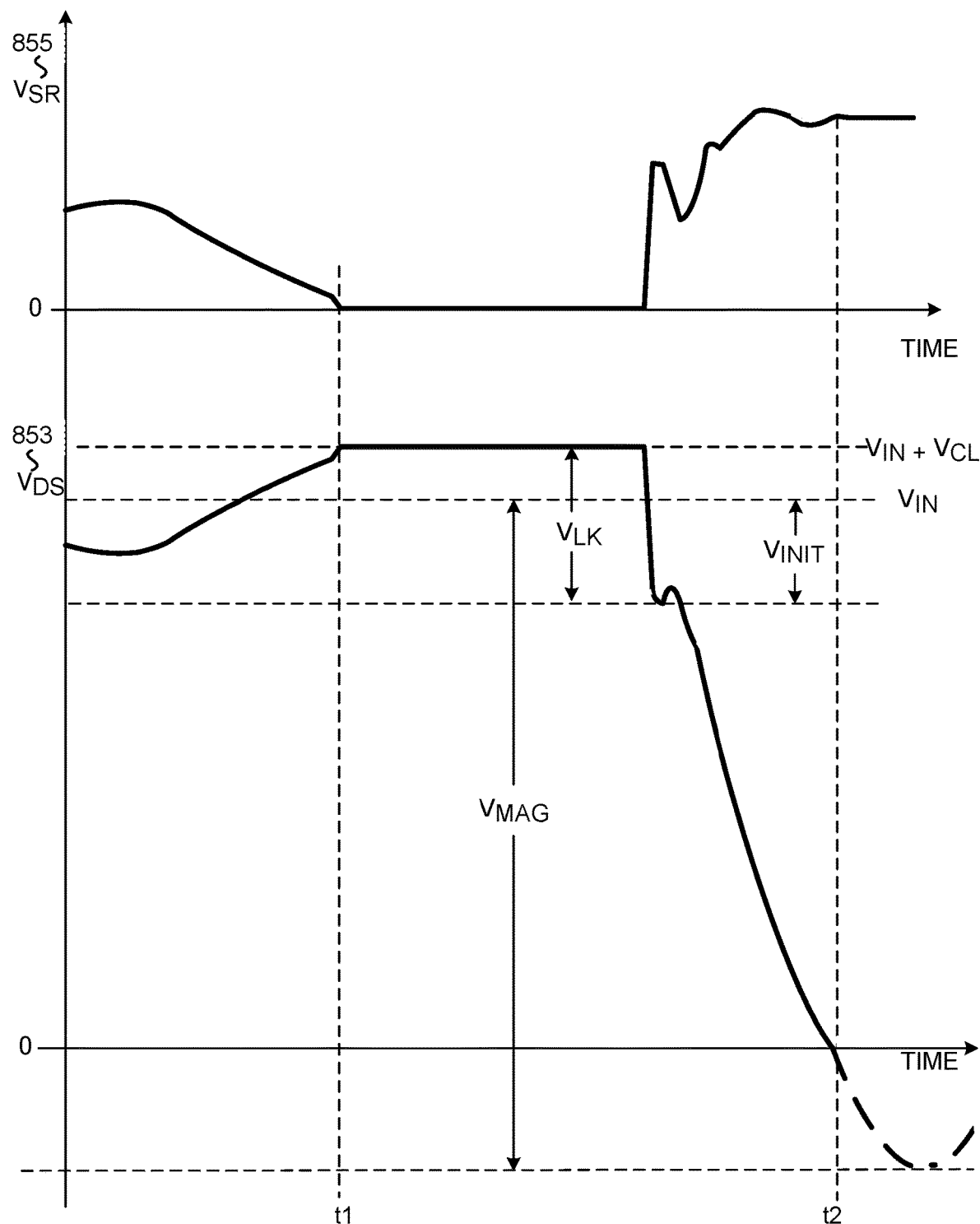
FIG. 8 illustrates a timing diagram of a drain voltage of a synchronous rectifier switch, and a drain voltage of a power switch, in accordance with embodiments of the present disclosure.

FIG. 8 illustrates a timing diagram of a drain voltage of a synchronous rectifier switch, and a drain voltage of a power switch, in accordance with embodiments of the present disclosure. It is appreciated that the signals mentioned of FIG. 8 may be one example of signals mentioned in previous figures, and that similarly named and numbered elements referenced below are coupled and function similar to as described above. It should also be appreciated that the signals mentioned in FIG. 8 may be one example of signals in upcoming figures and that similarly named and numbered elements referenced couple and function similar to as described above and below.

The first timing diagram illustrates a drain to source voltage $V_{SR}$ 855 of the synchronous rectifier. The second timing diagram illustrates a drain to source voltage $V_{DS}$ 853 of the power switch. The drain to source voltage $V_{SR}$ 855 of the synchronous rectifier and the drain to source voltage $V_{DS}$ 853 of the power switch can be reflections of each other. In other words, when the drain to source voltage $V_{DS}$ 853 of the power switch is zero, the drain to source voltage $V_{SR}$ 855 of the synchronous rectifier is positive. When the drain to source voltage $V_{DS}$ 853 of the power switch is positive, the drain to source voltage $V_{SR}$ 855 of the synchronous rectifier is zero.

In FIG. 8, the operation of the power converter is DCM. At time t1, the drain to source voltage $V_{SR}$ 855 of the synchronous rectifier is zero as the synchronous rectifier switch is switched on, while the drain to source voltage $V_{DS}$ 853 of the power switch is at the input voltage plus the clamp voltage when the power switch is off. Prior to the turn of the power switch, the clamp switch is enabled to bring the drain to source voltage $V_{DS}$ 853 of the power switch to zero. As such the energy is stored in the leakage and magnetizing inductance. When the clamp switch is turned off, the leakage inductance reduces the drain to source voltage $V_{DS}$ 853 from the input voltage plus the clamp voltage to a lower value that is clamped by the magnetizing inductance which is represented by the small oscillation in voltage. The discharging of the magnetizing inductance continues to reduce the drain to source voltage $V_{DS}$ 853 of the power switch all the way to zero. The dashed line of the drain to source voltage $V_{DS}$ 853 of the power switch represents the resonant tank that would cause the drain to source voltage $V_{DS}$ 853 to oscillate if the power switch was not turned on.

At time t2, the power switch is turned on when the drain to source voltage $V_{DS}$ 953 of the power switch is zero, which provides a minimal overshoot of the synchronous rectifier.

Figure 9:
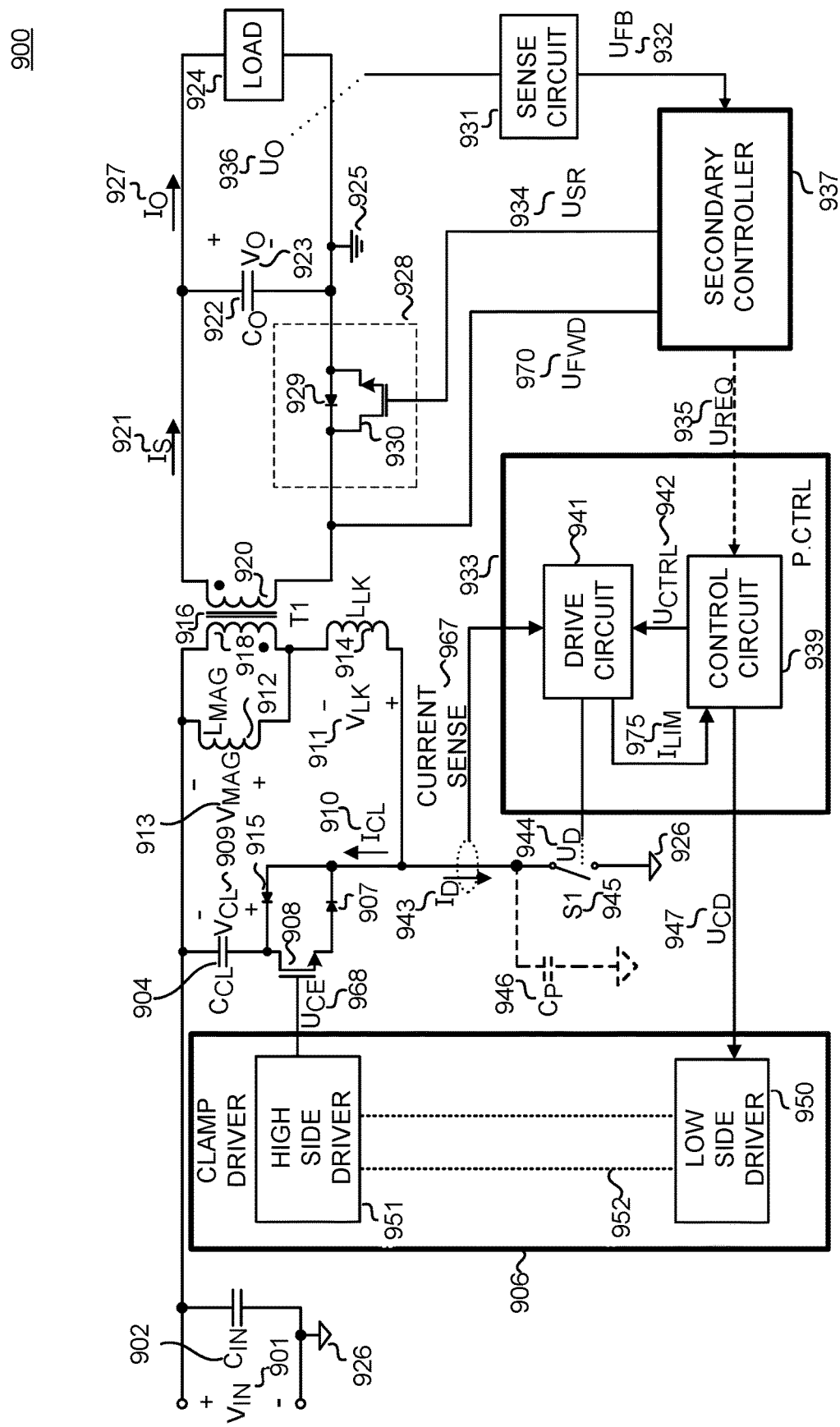
FIG. 9 illustrates one example of a power converter with a primary controller, a secondary controller, and a clamp driver, in accordance with embodiments of the present disclosure.

Referring now to FIG. 9, an example power converter 900 is illustrated including a clamp driver 906, a primary controller 933, and a secondary controller 937 in accordance with the teachings of the present disclosure. The illustrated example of the power converter 900 includes an input capacitor $C_{IN}$ 902, an energy transfer element 916, a primary winding 918 of the energy transfer element 916, a secondary winding 920 of the energy transfer element 916, a power switch S1 945, a clamp capacitor $C_{CL}$ 904, diodes 907 and 915, a clamp switch 908, an output capacitor $C_O$ 922, an input return 926, an output return 925, a synchronous rectifier 928, and a sense circuit 931. It should be appreciated that the similarly named and numbered elements couple and function as described above and below. In particular, the power converter 900 shares many similarities with power converter 100 shown in FIG. 1, at least one difference however, is the secondary controller 937 is shown as coupled to the secondary winding 920 and configured to receive forward signal UFWD 970 representative of a voltage of the secondary winding 920. The forward signal UFWD 970 is also representative of a voltage of the synchronous rectifier 928. It should be further appreciated that although a synchronous rectifier 928 is exemplified as the output rectifier of the power converter 100, a diode may also be used as the output rectifier.

The clamp driver 906 is shown including a low side driver 950 and a high side driver 951. The low side driver 950 is configured to control the high side driver through the communication link 952. The high side driver 951 is configured to generate a clamp enable signal $U_{CE}$ 968 to control the switching of clamp switch 908.

The secondary controller 937 is configured to generate a secondary drive signal $U_{SR}$ 934 to control the synchronous rectifier 928, and a request signal $U_{REQ}$ 935. As shown, the secondary controller 937 is coupled to receive a feedback signal $U_{FB}$ 932 representative of an output quantity $U_O$ 936 of the power converter 900. The output quantity $U_O$ 936 may be representative of the output voltage VO 923, output current IO 927, or a combination of the two. The request signal $U_{REQ}$ 935 is communicated to the primary controller 933 to enable the turn on of the power switch S1 945. In addition, the secondary controller 937 is shown as coupled to the secondary winding 920 and configured to receive the forward signal UFWD 970 representative of a voltage of the secondary winding 920. In response to the forward signal UFWD 970 representative of a voltage of the secondary winding 920, the secondary controller 937 may determine if the power converter 100 is operating in CCM or DCM and relays the CCM or DCM operation to the primary controller 933 via the request signal.

The primary controller 933 is shown comprising a control circuit 939 and a drive circuit 941. The control circuit 939 is coupled to receive the request signal $U_{REQ}$ 935 from the secondary controller 937 and a current sense signal representative of the switch current $I_D$ 943 of the power switch. The control circuit 939 is configured to generate the clamp drive signal $U_{CD}$ 947 and a control signal $U_{CTRL}$ 942 and in response to the request signal $U_{REQ}$ 935. In one example, the control circuit 939 outputs the clamp drive signal $U_CD$ 947 to control the turn on of the clamp switch 908 in response to the request signal $U_{REQ}$ 935. The control signal $U_{CTRL}$ 942 represents a delay time to turn on the power switch S1 945 after a turn on and then turn off of the clamp switch 908. As will be further explained, the delay time of the control signal $U_{CTRL}$ 942 is selected in response to the received request signal $U_{REQ}$ 935, which also provides information regarding CCM or DCM operation. The duration of the delay time is determined by the sensed CCM or DCM operation. The drive circuit 941 is coupled to receive the control signal $U_{CTRL}$ 942 and generate a drive signal $U_D$ 944 to control the power switch 945. The drive circuit 941 is further coupled to receive a current sense signal representative of a switch current $I_D$ 943 of the power switch 945. The drive circuit 941 is coupled to turn on the power switch S1 945 a delay time after the turn off of the clamp switch 908 in response to the control signal $U_{CTRL}$ 942, and coupled to turn off the power switch S1 945 in response to the switch current $I_D$ 143 reaching the current limit (not shown).

Further illustrated is a magnetizing inductance $L_{MAG}$ 112, a leakage inductance LLK 914, which may represent the magnetizing and leakage inductance associated with the energy transfer element 916 or a discrete inductor. In dashed lines, a parasitic capacitance $C_P$ 946 is shown to represent all the capacitance that couples to the power switch S1 945 and may include natural capacitance internal to the energy transfer element 916, the natural internal capacitance of power switch S1 945 and/or discrete capacitors. Also shown in FIG. 1 are a secondary current $I_S$ 921, an output voltage VO 923, an output current $I_O$ 927, an output quantity $U_O$ 936, a feedback signal $U_{FB}$ 932, a clamp voltage $V_{CL}$ 909, clamp current $I_{CL}$ 910, and a leakage voltage $V_{LK}$ 911. In the illustrated example, the power converter 900 is shown as having a flyback topology. It is appreciated that other known topologies and configurations of power converters may also benefit from the teachings of the present disclosure.

The power converter 900 provides output power to a load 924 from an unregulated input voltage $V_{IN}$ 901. In one embodiment, the input voltage $V_{IN}$ 901 is a rectified ac line voltage. In another embodiment, the input voltage $V_{IN}$ 101 is a dc input voltage. Input capacitor $C_{IN}$ 902 is coupled to receive the input voltage $V_{IN}$ 901 and, in one example, filters the input voltage $V_{IN}$ 901. The energy transfer element 916 is coupled to receive the input voltage $V_{IN}$ 901. In some embodiments, the energy transfer element 916 may be a coupled inductor, transformer, or an inductor. The example energy transfer element 916 is shown as including two windings, a primary winding 918 and secondary winding 920. However, the energy transfer element 916 may have more than two windings. The voltage across the primary winding 918 is illustrated as the primary voltage with the positive polarity at the dot end of the primary winding 918. When the power switch S1 945 is ON, the primary voltage is substantially equal to the negative sum of the input voltage $V_{IN}$ 901 and the voltage across the inductance $L_{LK}$ 914 (e.g. leakage voltage $V_{LK}$ 911), or mathematically: $V_P=-(V_{IN}+V_L)$. When the power switch S1 945 is OFF, the primary voltage is substantially equal to the reflected output voltage of the secondary winding 920. The primary winding 918 of the energy transfer element is further coupled to the power switch S1 945 and the power switch S1 945 is further coupled to input return 926.

Coupled across the primary winding 918 and the uncoupled inductance $L_{LK}$ 914 is the active clamp circuit. The active clamp circuit is shown as including clamp capacitance $C_{CL}$ 904 which is coupled in series with the clamp switch 90 and steering diodes 915 and 907. Steering diode DI 915 is coupled across the clamp switch 908 and steering diode 907. The clamp switch 908 is exemplified as a transistor, in particular a metal-oxide field effect transistor (MOSFET) but it should be appreciated that other transistors may be used. The clamp switch 908 is coupled such that the drain of the transistor is coupled to the clamp capacitance $C_{CL}$ 904 while the source of the transistor is coupled to the steering diode 907. Further the anode of steering diode 915 is coupled to the cathode of steering diode 907. The cathode of steering diode 915 is coupled to the clamp capacitance $C_{CL}$ 904. The anode of steering diode 907 is coupled to the clamp switch 908. The voltage across the clamp capacitance $C_{CL}$ 904 is denoted as the clamp capacitance voltage $V_{CL}$ 909, and the current in the clamp circuit is denoted as clamp current $I_{CL}$ 910.

The active clamp circuit limits the maximum voltage on the power switch S1 945. Further, control of the clamp switch 908 of the active clamp circuit facilitates zero voltage switching of the power switch S1 945. Steering diodes 915, 907 may be utilized to control the clamp current $I_{CL}$ 910 flow to the clamp capacitance $C_{CL}$ 904, in particular when an associated anti-parallel diode (not shown) of the clamp switch 908 is slow.

The clamp driver 906 is configured to receive the clamp drive signal $U_{CD}$ 947 from the primary controller 933 and outputs the clamp enable signal $U_{CE}$ 968 to control the turn-on and turn-off the clamp switch 908. The clamp switch 908 is controlled to turn-on to inject current into the primary winding 918. The clamp switch 908 is turned on for a first duration prior to the power switch S1 945 turning on. In other words, the clamp switch 908 is not turned on for the entire duration that the power switch S1 945 is turned off. At or near the beginning of the off-time of the power switch S1 945, the steering diode 915 conducts the charge associated with the uncoupled inductance $L_{LK}$ 914 of the power converter 100. In one example, the steering diode 915 turns on when the drain voltage VD of the power switch S1 945 increases to a high enough voltage to forward biases the steering diode 915. The drain voltage VD increases at or near the beginning of the off-time of the power switch S1 945. Steering diode 907 blocks the charge associated with the uncoupled inductance $L_{LK}$ 914 from conducting through the anti-parallel diode (not shown) of the clamp switch 908. The charge from the uncoupled inductance $L_{LK}$ 914 is transferred to the clamp capacitance $C_{CL}$ 904 through the steering diode 915 and is stored. The steering diode 915 stops conducting substantially after the net charge associated with uncoupled inductance $L_{LK}$ 914 of the power converter 100 has been transferred to the clamp capacitance $C_{CL}$ 904.

The clamp switch 908 remains OFF until near the end of the OFF time of the power switch S1 945. Once it is determined that the power switch should turn ON, the clamp switch 908 is turned ON for a first duration of time. The turn on of the clamp switch 908 occurs prior to the turn on of the power switch S1 945, near the end of the off-time of the power switch S1 945. The transistor of the clamp switch 908 is turned on such that the net charge previously transferred to the clamp capacitance $C_{CL}$ 904 is transferred to the primary winding 918. As such, the energy associated with the uncoupled inductance $L_{LK}$ 914 is returned to the system rather than being dissipated. In one example, the uncoupled inductance $L_{LK}$ 914 represents the leakage inductance of the energy transfer element 916. The clamp switch 908 is controlled such that the leakage energy is reset and returned to the power converter rather than being dissipated.

Secondary winding 920 is coupled to the output rectifier 928, which is exemplified as a transistor 930 with anti-parallel diode 929 used as a synchronous rectifier. However, the output rectifier 928 may be a diode. Output capacitor CO 922 is shown as being coupled to the output rectifier 928 and the output return 925. The power converter 900 further includes circuitry to regulate the output quantity $U_O$ 936, which in one example may be the output voltage $V_O$ 923, output current $I_O$ 927, or a combination of the two. A sense circuit 931 is shown as configured to sense the output quantity $U_O$ 936 and provide a feedback signal $U_{FB}$ 932 representative of the output of the power converter 900 (e.g. the output quantity $U_O$ 936).

As shown, the secondary controller 937 is coupled to receive the feedback signal $U_{FB}$ 932 and outputs the secondary drive signal $U_{SR}$ 934 and request signal $U_{REQ}$ 935. The secondary drive signal $U_{SR}$ 934 is received by the output rectifier 928 (e.g. synchronous rectifier 928) and controls the turn on and turn off of the output rectifier 928. The request signal REQ is representative of a request to turn on the primary switch S1 945. Further, the request signal REQ is also representative of a request to turn on the clamp switch 908. The request signal $U_{REQ}$ 935 may include request events which are generated in response to the feedback signal $U_{FB}$ 932. In one example, the request signal $U_{REQ}$ 935 may include request events which are generated in response to a comparison of the feedback signal $U_{FB}$ 932 to a target value. The request signal $U_{REQ}$ 935 may be a rectangular pulse waveform which pulses to a logic high value and quickly returns to a logic low value. The logic high pulses may be referred to as request events.

In addition, the secondary controller 937 is shown as coupled to the secondary winding 920 and configured to receive the forward signal UFWD 970 representative of a voltage of the secondary winding 920. As will be further discussed, in response to the forward signal UFWD 970 representative of a voltage of the secondary winding 920, the secondary controller 937 may determine if the power converter 900 is operating in CCM or DCM. In one example, a change in slope of the forward signal UFWD 970 could indicate DCM operation. In another example, conduction or non-conduction of the output rectifier 928 could indicate CCM or DCM operation. As previously discussed, the mode of operation (e.g. CCM or DCM) can determine the duration of time between the turning off of the clamp switch 908 and the turning on of the power switch S1 945.

The mode of operation is then provided to the primary controller 933 via the request signal $U_{REQ}$ 935. For example, the secondary controller 937 may provide a single pulse as a request event to turn on the primary switch S1 945 and the clamp switch 908. Provision of a single pulse request event may also be indicative of CCM operation of the power converter 900. The secondary controller 937 may provide a double pulse as the request event to turn on the primary switch S1 945 and the clamp switch 908 and to indicate DCM operation of the power converter 900. While a single or double pulse example is discussed, it should be appreciated that any number of pulses may be utilized.

The request signal $U_{REQ}$ 935 is transmitted to the primary controller 933 through a communication link, shown as a dashed line, to enable the power switch S1 945 and the clamp switch 908. In embodiments, the primary controller 933 and the secondary controller 937 are galvanically isolated from one another and the communication link provides galvanic isolation using an inductive coupling, such as a transformer or a coupled inductor, an optocoupler, capacitive coupling, or other device that maintains the isolation. However, it should be appreciated that in some embodiments, the secondary controller 937 is not galvanically isolated from the primary controller 933.

In one example, the primary controller 933 and secondary controller 937 may be formed as part of an integrated circuit that is manufactured as either a hybrid or monolithic integrated circuit. In one example, the power switch S1 945 may also be integrated in a single integrated circuit package with the primary controller 933 and the secondary controller 937. In addition, in one example, primary controller 933 and secondary controller 937 may be formed as separate integrated circuits. The power switch S1 945 may also be integrated in the same integrated circuit as the primary controller 933 or could be formed on its own integrated circuit. Further, it should be appreciated that both the primary controller 933, the secondary controller 937 and power switch S1 945 need not be included in a single package and may be implemented in separate controller packages or a combination of combined/separate packages.

It is generally understood that a switch that is closed may conduct current and is considered on, while a switch that is open cannot conduct current and is considered off. In one example, the power switch S1 112 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT). In another example, the power switch S1 945 may include two transistors coupled together in a cascode configuration such that a low voltage transistor, generally a normally-off device, is coupled to a high voltage transistor, generally a normally-on device. The high voltage transistor may be a junction field effect transistor (JFET). In one example, the JFET may comprise of gallium nitride (GaN) or silicon carbide (SiC) material.

The primary controller 933 includes the control circuit 939 and the drive circuit 941. The control circuit 939 is coupled to receive the request signal $U_{REQ}$ 935 from the secondary controller 937 and a current sense signal representative of the switch current $I_D$ 943 of the power switch. The control circuit 939 is configured to generate the clamp drive signal $U_{CD}$ 947 and a control signal $U_{CTRL}$ 942 and in response to the request signal $U_{REQ}$ 935. In one example, the control circuit 939 outputs the clamp drive signal $U_{CD}$ 947 to control the turn on of the clamp switch 908 in response to the request signal $U_{REQ}$ 935. The control signal $U_{CTRL}$ 942 represents a delay time to turn on the power switch S1 945 after a turn on and then turn off of the clamp switch 908. The duration of the delay time of the control signal $U_{CTRL}$ 942 is selected in response to the request signal $U_{REQ}$ 935, which also provides information regarding CCM or DCM operation of the power converter 900. The drive circuit 941 is coupled to receive the control signal $U_{CTRL}$ 942 and generate a drive signal $U_D$ 944 to control the power switch 945. The drive circuit 941 is further coupled to receive a current sense signal representative of a switch current $I_D$ 943 of the power switch 945. The drive circuit 941 is coupled to turn on the power switch S1 945 a delay time after the turn off of the clamp switch 908 in response to the control signal $U_{CTRL}$ 942, and coupled to turn off the power switch S1 945 in response to the switch current $I_D$ 143 reaching the current limit (not shown). However, it should be appreciated that other control schemes could determine the turn-off of the power switch S1 945.

In operation, the primary controller 933 determines a first mode of operation in response to the request signal $U_{REQ}$ 935. The first mode of operation is indicative of CCM operation. In one example, CCM operation may be determined while the output rectifier 928 is conducting. When the power switch S1 945 is turned off, after being turned on, the drain-source voltage of the power switch S1 945 rises. The drain to source voltage will continue to rise until clamped to the clamp voltage $V_{CL}$ 909 of the clamp capacitor $C_{CL}$ 904 through diode 915. Prior to the turn on of the power switch S1 945, the clamp switch 908 is turned on by the clamp driver 906. The leakage inductance $L_{LK}$ 914 and the primary winding 918 is charged by the clamp capacitor voltage across $C_{CL}$ 904 through the clamp switch 908 being in the on state. When the clamp switch 908 is turned on, voltage is applied to the leakage inductance $L_{LK}$ 914 which causes current to flow in the opposite direction of when the power switch S1 945 was on. After a specified time, clamp switch 908 is turned off. The turn off of the clamp switch 908 causes the drain to source voltage of the power switch S1 945 to decrease. After turn off of the clamp switch 908, the leakage energy that had been charged by the clamp switch 908 being on is discharged. After the drain voltage has reached substantially zero volts the power switch S1 945 can be turned on for zero voltage switching (ZVS) operation. For the first mode of operation, the power switch S1 945 is turned on a first delay time $T_{DEL1}$ after the clamp switch 908 is turned off. However, it should be appreciated that if the drain voltage has not reached zero, the power switch S1 945 can still be turned on. Although not necessarily zero-voltage switching, the power converter 900 could still benefit from reduced switching losses.

Further, the primary controller 933 determines a second mode of operation in response to the request signal $U_{REQ}$ 935. The second mode of operation is indicative of DCM operation. During the off-time of the power switch S1 945, the clamp switch 908 is turned on and then turned off. When the clamp switch 908 is turned on voltage is applied to the leakage inductance $L_{LK}$ 914 and the magnetizing inductance $L_{MAG}$ 912 which causes current to flow in the opposite direction as compared to when the power switch S1 945 was on. After a specified time, clamp switch 908 is turned off and during that time the leakage and magnetizing energy that had been charged by the clamp switch 908 being on is discharged. This causes the voltage across drain to source of the power switch S1 945 to decrease and, given enough time, eventually reach zero or a small non-zero value. The second mode of operation (e.g. DCM) typically takes longer to reach zero volts on the drain to source of the power switch S1 945 as compared to the first mode of operation (e.g. CCM). For the second mode of operation, the power switch S1 945 is turned on a second delay time $T_{DEL2}$ after the clamp switch 908 is turned off. The duration of the second delay time $T_{DEL2}$ is longer than the duration of the first delay time $T_{DEL1}$.

Figure 10:
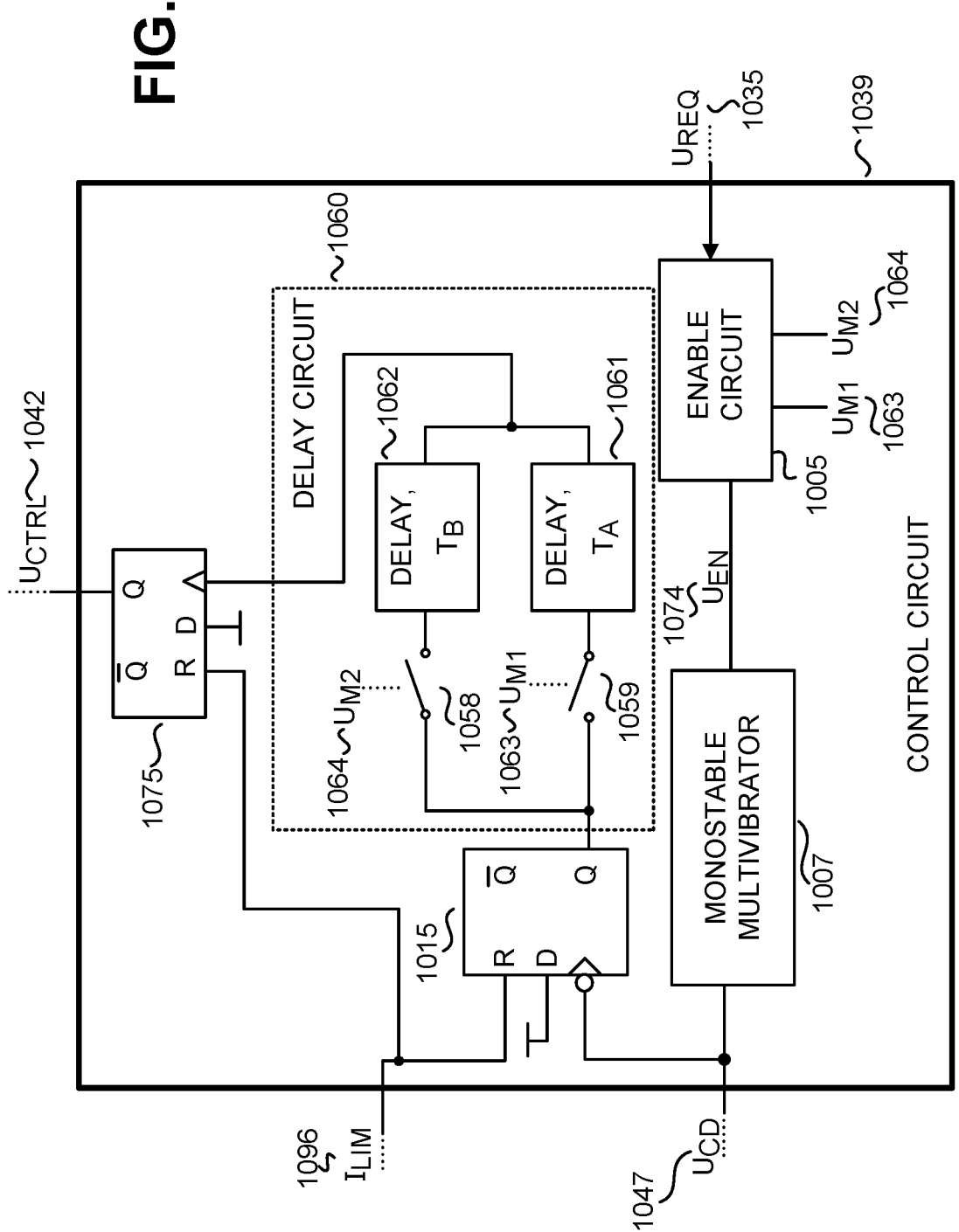
FIG. 10 illustrates one example of a control circuit for the power converter of FIG. 9 which can determine a mode of operation from the request signal $U_{REQ}$, in accordance with embodiments of the present disclosure.

FIG. 10 illustrates one example of a control circuit 1039 for a primary controller. It is appreciated that control circuit 1039 of FIG. 10 may be one example of control circuit 939 of FIG. 9, and that similarly named and numbered elements referenced below are coupled and function similar to as described above. Further, the control circuit 1039 shares many similarities with control circuit 339 shown in FIG. 3, at least one difference however, is the first mode of operation signal $U_{M1}$ 1063 and the second mode of operation signal $U_{M2}$ 1064 are outputted by the enable circuit 1005.

As shown, the control circuit 1039 includes an enable circuit 105, flip-flops 1015, 1075, a delay circuit 1060, and a monostable multivibrator 1007. The delay circuit 1060 comprises a first switch 1058, a second switch 1059, a first delay circuit 1061, and a second delay circuit 1062.

The control circuit 1039 can output the control signal $U_{CTRL}$ 1042, which is representative of the delay time to turn on the power switch. Further, the control circuit 1039 determines the delay time which the control signal $U_{CTRL}$ 1042 is representative of (e.g. first delay time $T_{DEL1}$ or second delay time $T_{DEL2}$). The delay time depends on the mode of operation of the power converter, which in one example is determined in response to the request signal $U_{REQ}$ 1035. Prior to the turn on of the power switch S1 945, control circuit 1039 outputs a clamp drive signal UCD 1047 to indicate the turn on of the clamp switch 908 to discharge the clamp capacitor $C_{CL}$ 904.

The enable circuit 1005 is coupled to receive the request signal $U_{REQ}$ 1035 and configured to generate the enable signal $U_{EN}$ 1074. The request signal $U_{REQ}$ 1037 is representative of a determination to turn on the power switch. Further, the request signal $U_{REQ}$ 1035 is representative of a mode of operation of the power converter 900, such as CCM or DCM operation. The enable circuit 1005 is further configured to output the first mode of operation signal $U_{M1}$ 1063 and the second mode of operation signal $U_{M2}$ 1064 in response to the request signal $U_{REQ}$ 1035. In one example, the first mode of operation signal $U_{M1}$ 1063 is asserted in response to a first pattern in request signal $U_{REQ}$ 1035 while the second mode of operation signal $U_{M2}$ 1064 is asserted in response to a second pattern in request signal $U_{REQ}$ 1035. The first pattern may be representative of CCM operation while the second pattern may be representative of DCM operation. The first pattern may be a single pulse in the request signal $U_{REQ}$ 1035 while the second pattern may be two consecutive received pulses in the request signal $U_{REQ}$ 1035.

The monostable multivibrator 1007 is coupled to the enable circuit 1005. The monostable multivibrator 1007 is configured to the clamp drive signal $U_{CD}$ 1047. Further, monostable multivibrator 1007 outputs a pulse for a first duration in the clamp drive signal $U_{CD}$ 1047 in response to an edge in the enable signal $U_{EN}$ 1074 (e.g. a rising or falling edge). In one example, the pulse is representative of the on-time of the clamp switch 908. The first duration begins near an end of an off-time of the power switch S1 945 in response to a switching request to turn on the power switch S1 945 through the request signal $U_{REQ}$ 1037.

The inverted clamp drive signal $U_{CD}$ 1047 clocks flip-flop 1015. After the pulse ends, the flip-flop 1015 is configured to generate a first logic state in response to the falling edge of the clamp drive signal $U_{CD}$ 1047.

Delay circuit 1060 receives the Q-output of flip flop. Further, the output of delay circuit 1060 clocks flip-flip 1075. As shown, switches 1058, 1059 are coupled to the Q-output of flip-flop 1015. The switch 1059 is controlled by the first mode of operation signal $U_{M1}$ 1059. In operation, if the first mode of operation signal $U_{M1}$ 1059 is asserted, flip-flop 1075 is clocked by the output of the first delay circuit 1061. The first delay circuit 1061 outputs a first delay, representative of first delay time $T_{DEL1}$, which is then outputted as the control signal $U_{CTRL}$ 1042. In the example, the first delay time $T_{DEL1}$ is also shown as $T_A$. The switch 1058 is controlled by the second mode of operation signal $U_{M2}$ 1064. If the second mode of operation signal $U_{M2}$ 1064 is asserted, flip-flop 1075 is clocked by the output of the second delay circuit 1062. The second delay circuit 1062 outputs a second delay, representative of second delay time $T_{DEL2}$, which is then outputted as control signal $U_{CTRL}$ 342. In the example, the second delay time $T_{DEL2}$ is also shown as $T_B$. The second delay time $T_{DEL2}$ is greater than the first delay time $T_{DEL1}$. In one example, the first delay time $T_{DEL1}$ ($T_A$) can be in the range of 50 nanoseconds (ns) and the second delay time $T_{DEL2}$ ($T_B$) can be in the range from 200 ns. When the first mode of operation signal $U_{M1}$ 1059 is asserted, and the primary controller 933 is operating in the first mode of operation, the first delay time $T_{DEL1}$ accounts for the duration of time for the leakage inductance to reduce the drain to source voltage of the power switch S1 945 to substantially zero. When the second mode of operation signal $U_{M2}$ 1064 is asserted and the primary controller 933 is operating in the second mode of operation, the second delay time $T_{DEL2}$ accounts for the duration of time for the leakage inductance and the magnetizing inductance to reduce the drain to source voltage of the power switch S1 945 to substantially zero.

Figure 11A:
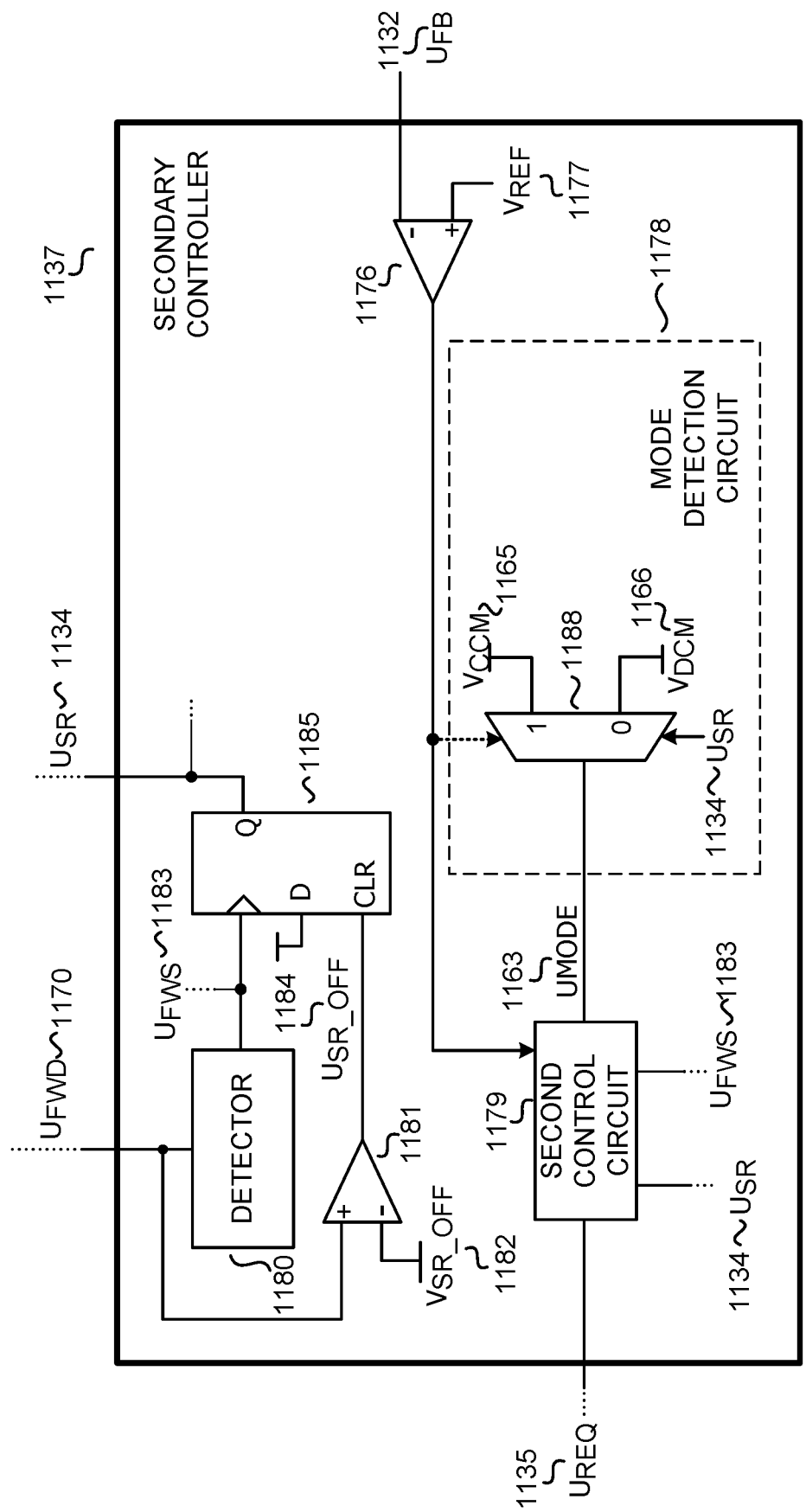
FIG. 11A illustrates one example of a secondary controller for the power converter of FIG. 9, in accordance with embodiments of the present disclosure.

FIG. 11A illustrates one example of a secondary controller 1137 for the power converter. It is appreciated that secondary controller 1137 of FIG. 11A may be one example of secondary controller 937 of FIG. 9, and that similarly named and numbered elements referenced below are coupled and function similar to as described above. The secondary controller 1137 is illustrated as including comparator 1176, mode detection circuit 1178, second control circuit 1179, detector 1180, comparator 1181, and flip-flop 1185. For the example of 11A, the mode detection circuit 1178 is shown as including multiplexer 1188. Further shown in FIG. 11A are feedback signal $U_{FB}$ 1132, secondary drive signal $U_{SR}$ 1134, request signal $U_{REQ}$ 1135, reference $V_{REF}$ 1177, CCM threshold $V_{CCM}$ 1165, DCM threshold $V_{DCM}$ 1166, mode signal UMODE 1163, forward voltage signal UFWD 1170, crossing threshold signal $U_{FWS}$ 1183, turn off threshold $V_{SR\_OFF}$ 1182, and off signal $U_{SR\_OFF}$ 1184.

Detector 1180 is shown as coupled to receive the forward voltage signal $U_{FWD}$ 1170 and configured to generate the crossing threshold signal $U_{FWS}$ 1183 in response to the forward voltage signal $U_{FWD}$ 1170 crossing below a threshold. In general, the power switch S1 945 and the synchronous rectifier 928 are controlled such that these switches are not on at the same time. In one embodiment, detector 1180 may be utilized to determine when the power switch S1 945 stops conducting in response to the forward voltage signal $U_{FWD}$ 1170. If the power switch S1 945 is conducting, the forward voltage signal $U_{FWD}$ 1170 would be substantially equal to the input voltage $V_{IN}$ 901 multiplied by the turns ratio of energy transfer element T1 916 plus the output voltage $V_O$. When the power switch S1 945 turns off, the forward voltage signal $U_{FWD}$ 1170 would decrease. If the forward voltage signal $U_{FWD}$ 1170 decreases below the threshold of the detector 1180, the detector determines that the power switch S1 945 has been turned off. For the example shown, when the forward voltage signal $U_{FWD}$ 1170 crosses below the threshold, the detector 1180 asserts the crossing threshold signal $U_{FWS}$ 1183. The crossing threshold signal $U_{FWS}$ 1183 is received at the clock input of flip-flop 1185. In the example shown, leading edges in the crossing threshold signal $U_{FWS}$ 1183 clock the flip-flop 1185 and result in a logic high output of the secondary drive signal $U_{SR}$ 1134.

Comparator 1181 is configured to receive the forward voltage signal UFWD 1170 and the turn off threshold $V_{SR}$ OFF 1182. As shown, turn off threshold $V_{SR\_OFF}$ 1182 is received at the inverting input while the forward voltage signal UFWD 1170 is received at the non-inverting input of comparator 1181. The output of the comparator is the off signal $U_{SR\_OFF}$ 1184, the off signal $U_{SR\_OFF}$ 1184 is logic high (e.g. first state) when the forward voltage signal $U_{FWD}$ 1170 is greater than the turn off threshold $V_{SR\_OFF}$ 1182 and logic low (e.g. second state) when the forward voltage signal $U_{FWD}$ 1170 is less than the turn off threshold $V_{SR\_OFF}$ 1182. Once the power switch S1 945 turns off, the forward voltage signal $U_{FWD}$ 1170 falls below the turn off threshold $V_{SR\_OFF}$ 1182 and the off signal $U_{SR\_OFF}$ 1184 is logic low (e.g. not asserted). When all the energy from the primary winding is transferred to the secondary winding, the forward voltage signal $U_{FWD}$ 1170 rises above the turn off threshold $V_{SR\_OFF}$ 1182, and the off signal $U_{SR\_OFF}$ 1184 is logic high (e.g. asserted), indicating that the secondary controller 937 can turn off the transistor 930 of the synchronous rectifier. As shown, the off signal $U_{SR\_OFF}$ 1184 is received at the clear-input of flip-flop 1185.

Flip-flop 1185 is shown as receiving the crossing threshold signal $U_{FWS}$ 1183 at its clock input, the off signal $U_{SR\_OFF}$ 1184 at its clear-input, and the d-input of the flip-flop 1185 is shown as tied to a logic high value. In operation, when the power switch S1 945 turns off, the forward voltage signal $U_{FWD}$ 1170 decreases below the threshold of the detector 1180 and the crossing threshold signal $U_{FWS}$ 1183 is asserted. The leading edge of the crossing threshold signal $U_{FWS}$ 1183 results in a logic high output of the secondary drive signal $U_{SR}$ 1134 and turning on the synchronous rectifier 928. When the forward voltage signal $U_{FWD}$ 1170 rises above the turn off threshold $V_{SR\_OFF}$ 1182, and the off signal $U_{SR}$ OFF 1184 is asserted (e.g. logic high) and clears the flip-flop 1185, the secondary drive signal $U_{SR}$ 1134 transitions to a logic low value and the synchronous rectifier 928 is turned off. In another example, the second control circuit 1179 can clear flip-flop 1185. For example, in response to a switching request to turn on the power switch S1 945, the second control circuit 1179 can clear flip-flop 1185 (not shown) and the secondary drive signal $U_{SR}$ 1134 transitions to a logic low value and the synchronous rectifier 928 is turned off.

Comparator 1176 is coupled to receive the feedback signal $U_{FB}$ 1132 and the reference $V_{REF}$ 1177. As shown, the reference $V_{REF}$ 1177 is received at the non-inverting input while the feedback signal $U_{FB}$ 1132 is received at the inverting input of comparator 1176. Reference $V_{REF}$ 1177 is representative of the target value to regulate the output of power converter 100. The feedback signal $U_{FB}$ 1132 falling below the reference $V_{REF}$ 1177 could indicate that the power switch S1 945 should be turned on to transfer energy to the output of the power converter 900.

Second control circuit 1179 is configured to receive the output of comparator 1176, the secondary drive signal $U_{SR}$ 1134, and the crossing threshold signal $U_{FWS}$ 1183 and outputs the request signal $U_{REQ}$ 1135. In one example, the second control circuit 1179 determines whether the request signal $U_{REQ}$ 1135 should indicate a turn on request of the power switch S1 945 in response to the output of comparator 1176. Further, the second control circuit 1179 may determine the timing of the request to turn on the power switch S1 945 in the request signal $U_{REQ}$ 1135 in response to the secondary control signal $U_{SR}$ 1134 or the crossing threshold signal $U_{FWS}$ 1183.

As mentioned above, the request signal $U_{REQ}$ 1135 is representative of a request to turn on the power switch S1 945 and a mode of operation of the power converter 900. As discussed, the mode of operation of the power converter 900 may be utilized to determine the duration of delay time between turning off the clamp switch 908 and turning on the power switch S1 945. The second control circuit 1179 is also configured to receive a mode signal UMODE 1163 from the mode detection circuit 1178. Mode detection circuit 1178 determines whether the power converter 900 is operating in a first mode (e.g. CCM operation) or a second mode (e.g. DCM operation). Mode detection circuit includes a multiplexer 1188. Multiplexer 1188 is configured to receive the CCM threshold $V_{CCM}$ 1165 at its "1" address input (e.g. high input), the DCM threshold $V_{DCM}$ 1166 at its "0" address input (e.g. low input), and the secondary drive signal $U_{SR}$ 1134 at its select input. In response to the value of the secondary drive signal $U_{SR}$ 1134 (e.g. high "1" or low "0"), the output of the multiplexer (e.g. mode signal UMODE 1163) is either the CCM threshold $V_{CCM}$ 1165 or the DCM threshold $V_{DCM}$ 1166. In another example, the multiplexer may receive the off signal $U_{SR}$ OFF 1184 at its select input and the off signal $U_{SR\_OFF}$ 1184 determines whether the mode signal UMODE 1163 is substantially the CCM threshold $V_{CCM}$ 1165 or the DCM threshold $V_{DCM}$ 1166. In one example, the CCM threshold $V_{CCM}$ 1165 may be a logic high value while the DCM threshold $V_{DCM}$ 1166 may be a logic low value. Optionally, the multiplexer 1188 may receive the output of comparator 1176 (as shown by dashed lines). The output of comparator 1176 may be utilized by the multiplexer 1188 to determine the timing which the mode signal UMODE 1163 is outputted to the second control circuit 1179. In one example, the mode signal UMODE 1163 is not outputted to the second control circuit 1179 until the feedback signal $U_{FB}$ 1132 falls below the reference $V_{REF}$ 1177. In another example, the multiplexer 1188 may be controlled by the off signal $U_{SR\_OFF}$ 1184. Additionally, the mode detection circuit 1178 may implement buffering or delays in determining CCM or DCM operation in response to either the off signal $U_{SR\_OFF}$ 1184 or the secondary drive signal $U_{SR}$ 1134.

In response to the mode signal UMODE 1163, the second control circuit 1179 is configured to generate a first pattern for the request signal $U_{REQ}$ 1135 in response to the mode signal UMODE 1163 indicating the first mode of operation (e.g. CCM operation). The second control circuit 1179 is further configured to generate a second pattern for the request signal $U_{REQ}$ 1135 in response to the mode signal UMODE 1163 indicating the second mode of operation (e.g. DCM operation). For example, the first pattern for the request signal $U_{REQ}$ 1135 may be a single pulse to indicate a request to turn the power switch S1 945 and CCM operation of the power converter 900. The second pattern for the $U_{REQ}$ 1135 may be a two consecutive pulses to indicate a request to turn the power switch S1 945 and DCM operation. As such, the request signal $U_{REQ}$ 1135 is representative of a request to turn on the power switch and the mode of operation of the power converter.

Figure 11B:
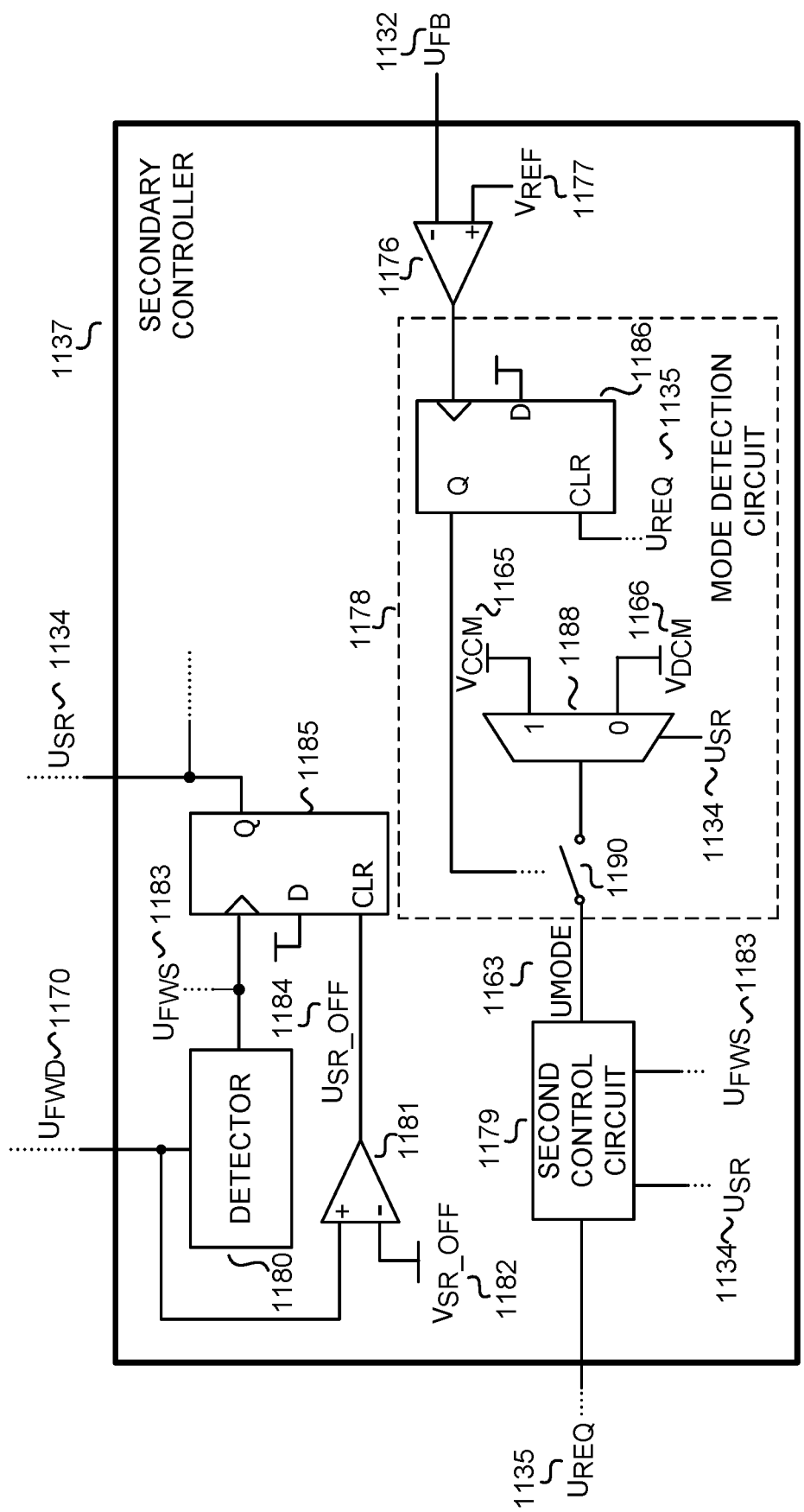
FIG. 11B illustrates another example of a secondary controller for the power converter of FIG. 9, in accordance with embodiments of the present disclosure

FIG. 11B illustrates another example secondary controller 1137 for the power converter. It is appreciated that secondary controller 1137 of FIG. 11B may be one example of secondary controller 937 of FIG. 9, and that similarly named and numbered elements referenced below are coupled and function similar to as described above. Further, the secondary controller 1137 shown in FIG. 11B shares many similarities with secondary controller 1137 shown in FIG. 11A, at least one difference however, is mode detection circuit 1178 shown in FIG. 11B includes the multiplexer 1188, flip-flop 1186, and switch 1190.

As shown, the flip-flop 1186 of the mode detection circuit 1178 is configured to receive the output of comparator 1176. In particular, the output of comparator 1176 is coupled to the clock-input of flip-flip 1186. The D-input is coupled to a logic high value, while the clear input is configured to receive the request signal $U_{REQ}$ 1135. The output of the flip-flop 1186 is configured to control the switch 1190. Similar to what is described above with respect to FIG. 11A, multiplexer 1188 is configured to receive the CCM threshold $V_{CCM}$ 1165 at it's "1" input (e.g. high input) and the DCM threshold $V_{DCM}$ 1166 at its "0" input (e.g. low input).

In operation, the output of the multiplexer 1188 is controlled by the secondary drive signal $U_{SR}$ 1134. In response to the value of the secondary drive signal $U_{SR}$ 1134 (e.g. high "1" or low "0"), the output of the multiplexer (e.g. mode signal UMODE 1163) is either the CCM threshold $V_{CCM}$ 1165 or the DCM threshold $V_{DCM}$ 1166. In one example, the CCM threshold $V_{CCM}$ 1165 may be a logic high value while the DCM threshold $V_{DCM}$ 1166 may be a logic low value. In other words, the mode detection circuit 1178 is configured to output the mode signal UMODE 1163 representative of a first operating mode (e.g. CCM operation) in response to feedback signal $U_{FB}$ 1132 being below reference $V_{REF}$ 1177 and a first state of a secondary drive signal $U_{SR}$ 1134 (e.g. logic high). The mode detection circuit 1178 is further configured to output a second mode signal in response to the feedback signal being below the reference and the mode signal UMODE 1163 representative of a second mode of operation (e.g. DCM operation) in response to the feedback signal $U_{FB}$ 1132 being below reference $V_{REF}$ 1177 and a second state of the secondary drive signal $U_{SR}$ 1134 (e.g. logic low).

The switch 1190 is controlled by the output of flip-flop 1186. When the feedback signal $U_{FB}$ 1132 falls below the reference $V_{REF}$ 1177, the flip-flop 1186 is clocked and the output of flip-flop 1186 is logic high. At that instance, the switch 1190 is closed and the mode signal UMODE 1163 is substantially equal to the output of multiplexer 1188. The output of flip-flop 1186 transitions to a logic low value when the request signal $U_{REQ}$ 1135 indicates a request to turn on the power switch S1 945 and the switch 1190 is open. As such, the mode signal UMODE 1163 provides an indication of the mode of operation of the power converter 900 along with a request to turn on the power switch S1 945.

FIGS. 11A and 11B illustrate a secondary controller 1137 which determines CCM and DCM operation from a forward voltage signal $U_{FWD}$ 1170 and controls a synchronous rectifier. It should be appreciated that embodiments of the present invention may be utilized with a power converter in which the output rectifier is exemplified as a diode rather than a synchronous rectifier. As such, variations in the forward voltage signal $U_{FWD}$ 1170 could determine CCM or DCM operation. For example, a change in slope of the forward signal $U_{FWD}$ 970 could indicate DCM operation or falling below a threshold could indicate DCM operation. In another example, detecting a relaxation ring in the forward voltage signal $U_{FWD}$ 1170 could determine DCM operation.

Figure 12A:
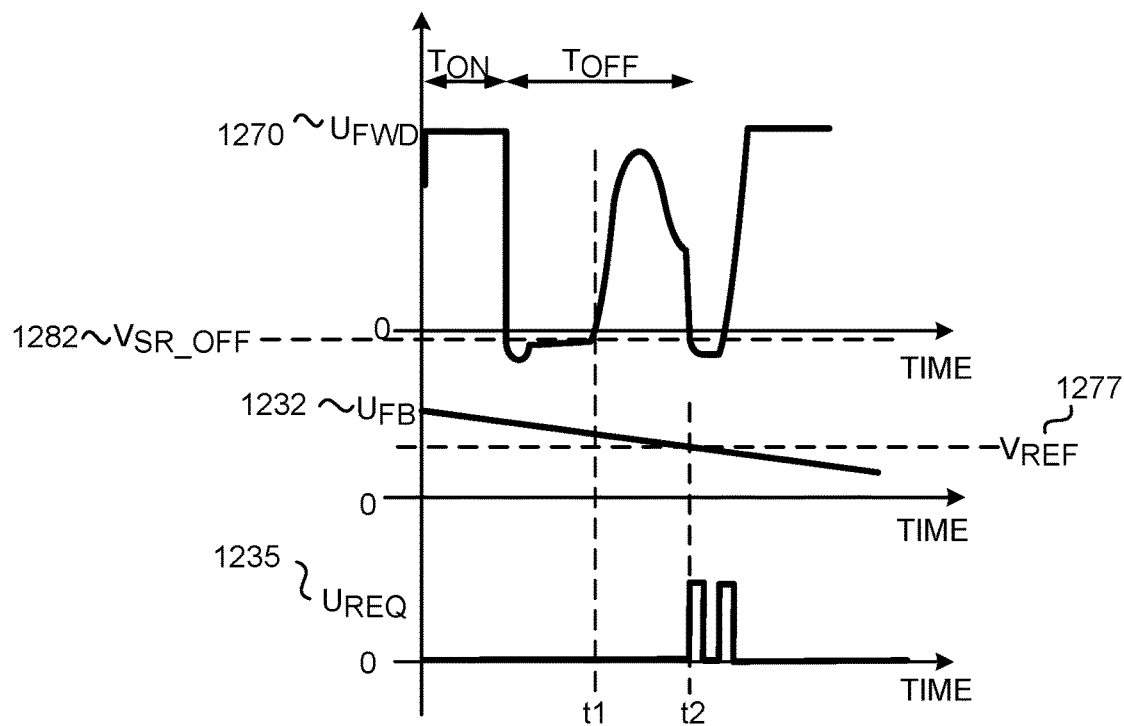
FIG. 12A illustrates one example of a pattern of the request signal $U_{REQ}$ of FIGS. 9, 10, 11A, and 11B, in accordance with embodiments of the present disclosure.

FIG. 12A is a timing diagram illustrating example waveforms of the forward voltage signal $U_{FWD}$ 1270, feedback signal $U_{FB}$ 1232, and request signal $U_{REQ}$ 1235 while the power converter 900 is operating in DCM. It should be appreciated that the forward voltage signal $U_{FWD}$ 1270, feedback signal $U_{FB}$ 1232, and request signal $U_{REQ}$ 1235 are examples of the forward voltage signal $U_{FWD}$, feedback signal $U_{FB}$, and request signal $U_{REQ}$ discussed with respect to FIGS. 9, 10, 11A and 11B.

During the on-time TON of the power switch S1 945, the forward voltage signal $U_{FWD}$ 1270 is substantially equal to the input voltage $V_{IN}$ 901 multiplied by the turns ratio of the energy transfer element T1 916 plus the output voltage $V_O$. When the power switch S1 945 is turned off, forward voltage signal $U_{FWD}$ 1270 decreases. As shown, the forward voltage signal $U_{FWD}$ 1270 is below the turn off threshold $V_{SR\_OFF}$ 1282 at the beginning of the off-time $T_{OFF}$ of the power switch S1 945.

At time t1 shown in FIG. 12A, the forward voltage signal $U_{FWD}$ 1270 rises above the turn off threshold $V_{SR\_OFF}$ 1282 indicating that the energy from the primary side of the power converter 900 has been transferred to the secondary side of the power converter 900. A relaxation ring can be seen in the forward voltage signal $U_{FWD}$ 1270. At time t1 shown in FIG. 12A, the feedback signal $U_{FB}$ 1232 is still above the reference $V_{REF}$ 1277. At time t2 of FIG. 12A, the feedback signal $U_{FB}$ 1232 falls below the reference $V_{REF}$ 1277. Since the feedback signal $U_{FB}$ 1232 fell below the reference $V_{REF}$ 1277 after the forward voltage signal $U_{FWD}$ 1270 increased above the turn off threshold $V_{SR}$ OFF 1282, the power converter 900 is operating in DCM. As shown, the request signal $U_{REQ}$ 1235 includes two consecutive pulses, which is one example of the second pattern. While FIG. 12A illustrates the forward voltage $U_{FWD}$ 1270 crossing the turn off threshold $V_{SR}$ OFF 1282 as an indication of DCM operation, it should be appreciated that a change in the slope of the forward voltage signal $U_{FWD}$ 1270 could be utilized as an indication of DCM operation.

Figure 12B:
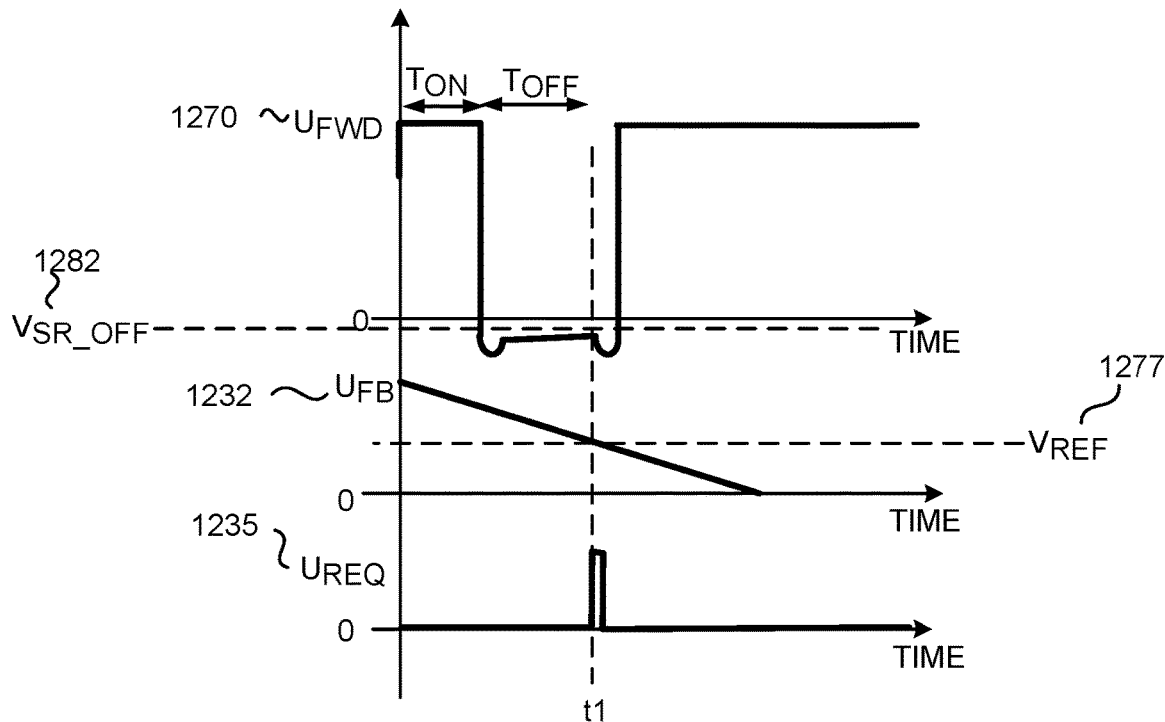
FIG. 12B illustrates another example of a pattern of the request signal $U_{REQ}$ of FIGS. 9, 10, 11A, and 11B, in accordance with embodiments of the present disclosure.

FIG. 12B is a timing diagram illustrating example waveforms of the forward voltage signal $U_{FWD}$ 1270, feedback signal $U_{FB}$ 1232, and request signal $U_{REQ}$ 1235 while the power converter 900 is operating in CCM. It should be appreciated that the forward voltage signal $U_{FWD}$ 1270, feedback signal $U_{FB}$ 1232, and request signal $U_{REQ}$ 1235 are examples of the forward voltage signal $U_{FWD}$, feedback signal $U_{FB}$, and request signal $U_{REQ}$ discussed with respect to FIGS. 9, 10, 11A and 11B.

At time t1 shown in FIG. 12B, the forward voltage signal $U_{FWD}$ 1270 is still below the turn off threshold $V_{SR\_OFF}$ 1282 indicating that the energy from the primary side of the power converter 900 has not been completely transferred to the secondary side of the power converter 900. Further, the feedback signal $U_{FB}$ 1232 falls below the reference $V_{REF}$ 1277 at time t1 of FIG. 12B. Since the feedback signal $U_{FB}$ 1232 fell below the reference $V_{REF}$ 1277 while the forward voltage signal $U_{FWD}$ 1270 is below the turn off threshold $V_{SR\_OFF}$ 1282, the power converter 900 is operating in CCM. As shown, the request signal $U_{REQ}$ 1235 includes a single pulse, which is one example of the first pattern.

Figure 13:
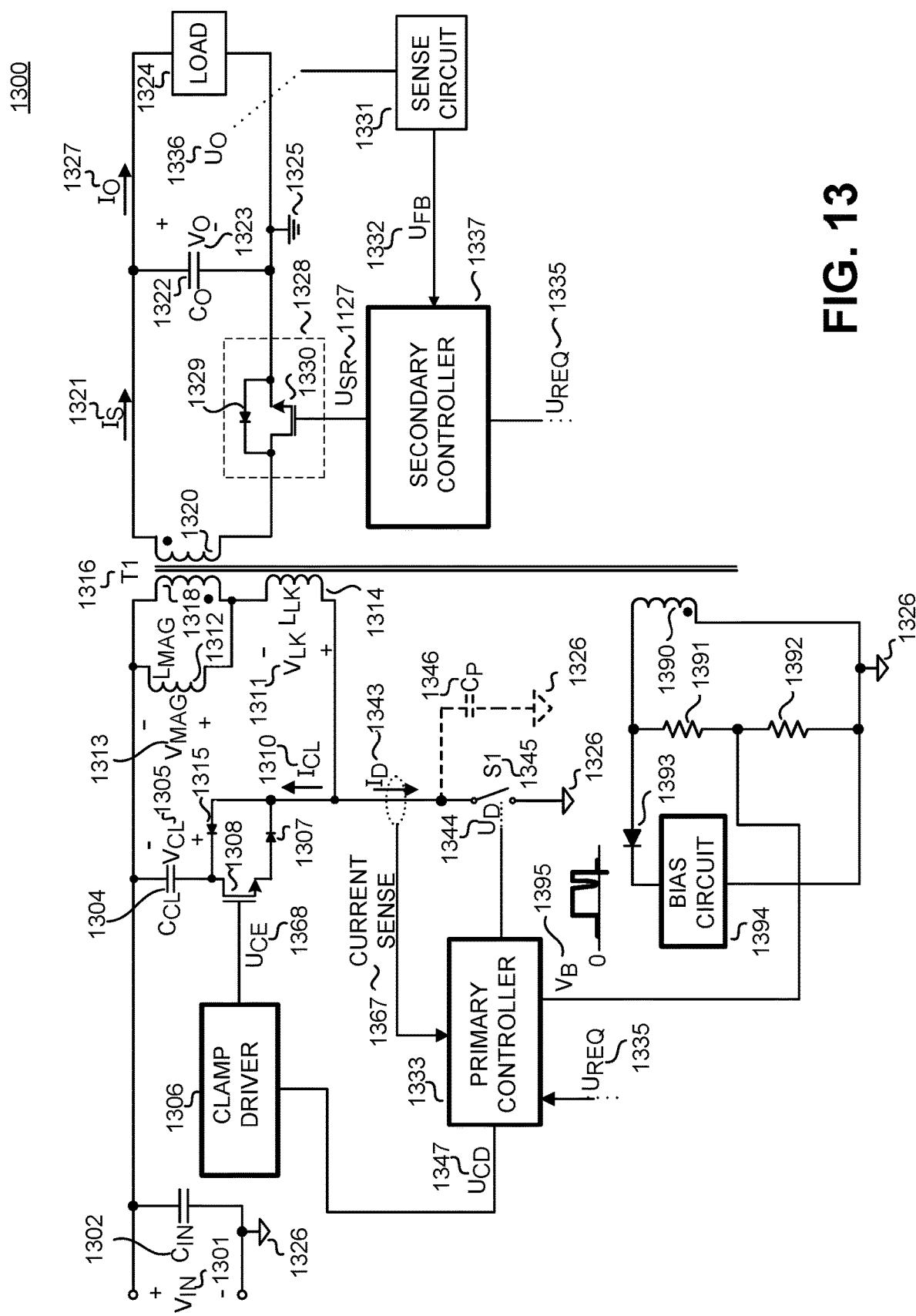
FIG. 13 illustrates a further example of a power converter with a primary controller, a secondary controller, a clamp driver, and a bias winding in accordance with embodiments of the present disclosure.

Referring now to FIG. 13, an example power converter 1300 is illustrated including a clamp driver 1306, a primary controller 1333, and a secondary controller 1337 in accordance with the teachings of the present disclosure. The illustrated example of the power converter 1300 includes an input capacitor $C_{IN}$ 1302, an energy transfer element 1316, a primary winding 1318 of the energy transfer element 316, a secondary winding 1320 of the energy transfer element 1316, a power switch S1 1345, a clamp capacitor $C_{CL}$ 1304, diodes 1307 and 1315, a clamp switch 1308, an output capacitor $C_O$ 1322, an input return 1326, an output return 1325, an output rectifier 1328, and a sense circuit 1331. The output rectifier 1328 is exemplified as a synchronous rectifier including a transistor 1330 and anti-parallel diode 1329, the output rectifier 1328 of the power converter 1300 may also be a diode. For the example shown in FIG. 13, the clamp driver 1306 and primary controller 1333 have been simplified but may include elements such as a high side driver, low side driver, drive circuit and control circuit as discussed above. It should be appreciated that the similarly named and numbered elements couple and function as described above and below. In particular, the power converter 1300 shares many similarities with power converter 100 shown in FIG. 1 and power converter 900 shown in FIG. 9, at least one difference however, is the energy transfer element T1 1306 further includes a third winding 1390 (also referred to as a bias winding) referenced to input return 1326. The third winding 1390 is also galvanically isolated from the secondary winding 1320.

In the example shown, resistors 1391 and 1392 are coupled across the third winding 1390. Further, diode 1393 and bias circuit 1394 are also coupled across the third winding 1390. As shown, the scaled bias voltage $V_B$ 1395 is the voltage at the node between resistors 1391 and 1392, which forms a voltage divider of the voltage across the third winding 1390. As such, the scaled bias voltage $V_B$ 1395 is a scaled version of the voltage across the third winding 1390. Further, the scaled bias voltage $V_B$ 1395 is representative of a voltage of the primary winding 1318 (e.g. input winding).

Figure 14:
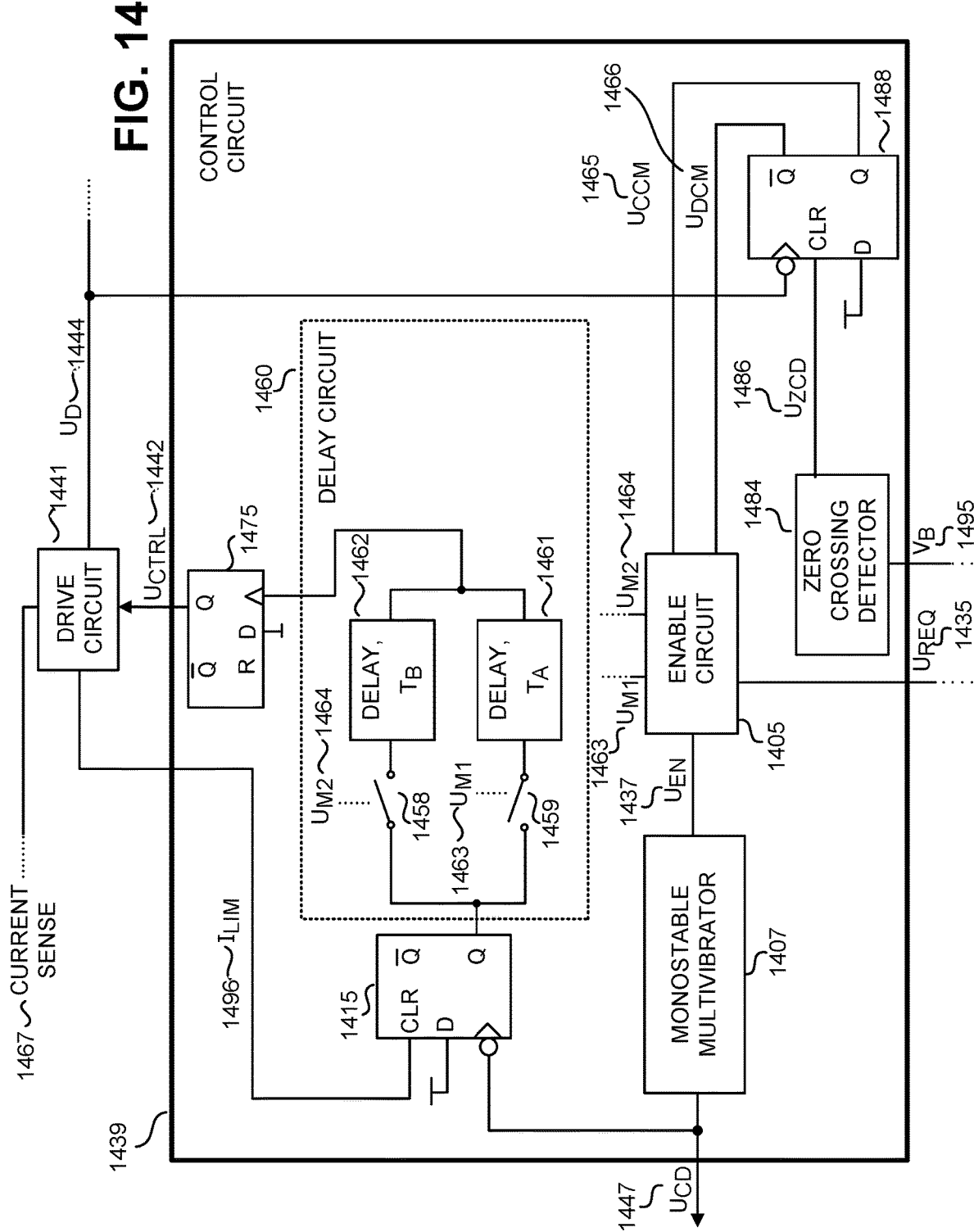
FIG. 14 illustrates of one example of a control circuit for the primary controller of FIG. 13 which can determine the operation of the power converter in response to a bias winding voltage of FIG. 13, in accordance with embodiments of the present disclosure.

FIG. 14 illustrates one example of a control circuit 1439 for a primary controller. It is appreciated that control circuit 1439 of FIG. 14 may be one example of a control circuit for the primary controller 1333 shown with respect to of FIG. 13, however, similarly named and numbered elements couple and function similar to as described above. Further, the control circuit 1439 shares many similarities with control circuit 339 shown in FIG. 3, and control circuit 1039 shown in FIG. 10, at least one difference however, is the control circuit 1439 further includes a zero crossing detector 1484 and flip-flop 1488. The zero crossing detector 1484 is coupled to receive the scaled bias voltage $V_B$ 1495, which is one example of scaled bias voltage $V_B$ 1395 of FIG. 13. Further, similar to FIG. 10, the first mode of operation signal $U_{M1}$ 1463 and the second mode of operation signal $U_{M2}$ 1464 are outputted by the enable circuit 1405.

Zero crossing detector 1484 is coupled to receive the scaled bias voltage $V_B$ 1495 and configured to output a zero crossing signal $U_{ZCD}$ 1486 in response to the scaled bias voltage $V_B$ 1495 crossing a zero crossing reference. In one example, the zero crossing detector 1484 detects the first instance which the scaled bias winding voltage $V_B$ 1595 falls below the zero crossing reference after the turn off the power switch. In another example, the zero crossing detector 1484 could also output a pulse for every instance which the scaled bias winding voltage $V_B$ 1495 crosses the zero crossing reference. In other words, the zero crossing signal $U_{ZCD}$ 1486 is representative of a zero crossing of the scaled bias voltage $V_B$ 1495. In one example, the zero crossing signal $U_{ZCD}$ 1486 is a rectangular pulse waveform, with pulses in the waveform representative of zero crossings of the scaled bias voltage $V_B$ 1495. Flip-flop 1488 is shown as receiving the inverted drive signal $U_D$ 1444 at its clock input, the zero crossing signal $U_{ZCD}$ 1486 at its clear input, and a high value at its D-input. The Q-bar output of flip-flop 1488 is the DCM signal $U_{DCM}$ 1466 (also referred to as a second mode of operation signal) while the Q-output of flip-flop 1488 is the CCM signal $U_{CCM}$ 1465 (also referred to as a first mode of operation signal). The DCM signal $U_{DCM}$ 1466 is representative of a determination of DCM operation of power converter 1300 while the CCM signal $U_{CCM}$ 1465 is representative of a determination of CCM operation of power converter 1300. In one example, both the CCM signal $U_{CCM}$ 1465 and DCM signal $U_{DCM}$ 1466 are rectangular pulse waveforms with varying lengths of logic high and logic low sections with logic high sections indicating an asserted signal.

The enable circuit 1405 is coupled to receive the request signal $U_{REQ}$ 1435, the CCM signal $U_{CCM}$ 1465, and the DCM signal $U_{DCM}$ 1466, and configured to generate the enable signal $U_{EN}$ 1474. As previously discussed, the request signal $U_{REQ}$ 1437 is representative of a determination to turn on the power switch S1 1345. The enable circuit 1305 is further configured to output the first mode of operation signal $U_{M1}$ 1363 and the second mode of operation signal $U_{M2}$ 1464 in response to the CCM signal $U_{CCM}$ 1465 or the DCM signal $U_{DCM}$ 1466, or both along with the request signal $U_{REQ}$ 1435. In one example, the first mode of operation signal $U_{M1}$ 1063 is asserted in response to an asserted CCM signal $U_{CCM}$ 1465 coincident with a received request in request signal $U_{REQ}$ 1435. The second mode of operation signal $U_{M2}$ 1064 is asserted in response to an asserted DCM signal $U_{DCM}$ 1466 coincident with a received request in request signal $U_{REQ}$ 1435.

In operation, the CCM signal $U_{CCM}$ 1465 signal is asserted in response to a trailing edge in drive signal $U_D$ 1444. The DCM signal $U_{DCM}$ 1466 is asserted in response to the zero crossing signal $U_{ZCD}$ 1486 indicating a detected zero crossing in scaled bias voltage $V_B$ 1495. If the CCM signal $U_{CCM}$ 1465 signal is asserted when a request to turn on the power switch S1 1345 is received from request signal $U_{REQ}$ 1435, the first mode of operation signal $U_{M1}$ 1363 is asserted, which closes switch 1459 and control signal $U_{CTRL}$ 1442 outputs the first delay time $T_{DEL1}$ ($T_A$). If the DCM signal $U_{DCM}$ 1466 is asserted when a request to turn on the power switch S1 1345 is received from request signal $U_{REQ}$ 1435, the second mode of operation signal $U_{M2}$ 1464 is asserted, which closes switch 1458 and control signal $U_{CTRL}$ 1442 outputs the second delay time $T_{DEL2}$ ($T_B$). The duration of the first delay time $T_{DEL1}$ is shorter than the duration of the second delay time $T_{DEL2}$.

Figure 15A:
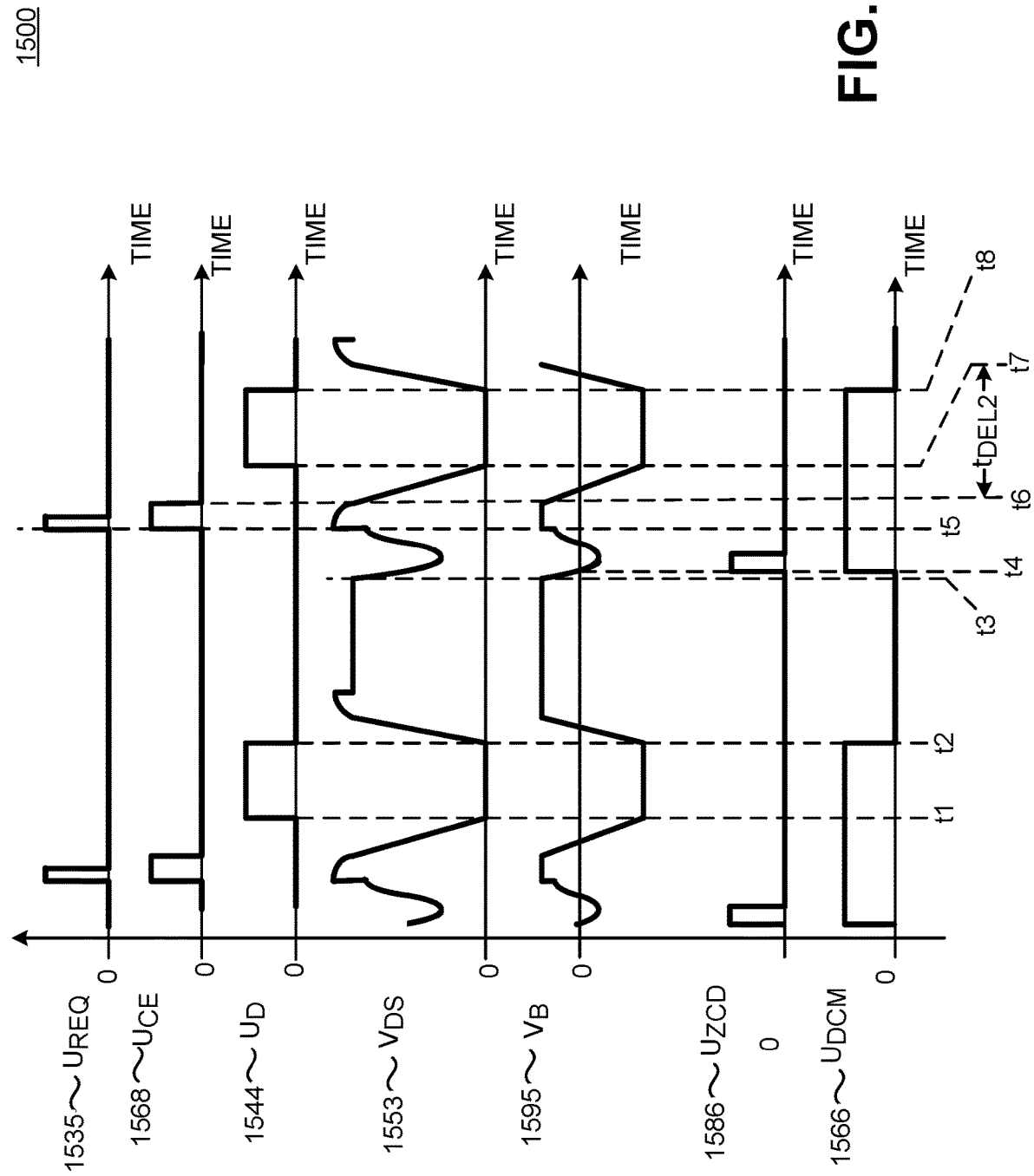
FIG. 15A illustrates a timing diagram of a request signal, a clamp enable signal, a drive signal, a drain-source voltage of the power switch, a bias winding voltage, a zero-crossing signal, and a DCM signal of the power converter of FIG. 13 and the control circuit of FIG. 14, in accordance with embodiments of the present disclosure.

FIG. 15A illustrates a timing diagram 1500 with example waveforms of a request signal $U_{REQ}$ 1535, a clamp enable signal $U_{CE}$ 1568, a drive signal $U_D$ 1544, a drain-source voltage $V_{DS}$ 1553 of the power switch S1 1345, a scaled bias winding voltage $V_B$ 1595, a zero crossing signal $U_{ZCD}$ 1586, and a DCM signal $U_{DCM}$ 1566 for the power converter 1300 of FIG. 13 and the control circuit 1439 of FIG. 14. FIG. 15A illustrates the example waveforms for DCM operation of power converter 1300. It should be appreciated that similarly named and numbered elements couple and function as described above.

After receipt of a request (e.g. pulse) in request signal $U_{REQ}$ 1535, the clamp switch 1308 is controlled on by the clamp enable signal $U_{CE}$ 1568 (e.g. logic high value). After the clamp switch 1308 is controlled off (e.g. logic low value of clamp enable signal $U_{CE}$ 1568), the drive signal $U_D$ 1544 transitions to a logic high value to turn on power switch S1 1345 at time t1 of FIG. 15A. The drain-source voltage $V_{DS}$ 1553 is substantially equal to zero while the power switch S1 1345 is on. Scaled bias winding voltage $V_B$ 1595 is shown as a scaled and level-shifted version of the drain-source voltage $V_{DS}$ 1553, however, there is some clamping of the scaled bias winding voltage $V_B$ 1595.

At time t2 of FIG. 15A, the drive signal $U_D$ 1544 transitions to a logic low value and the power switch S1 1345 is turned off and the drain-source voltage $V_{DS}$ 1553 increases. At the beginning of the off-time of power switch S1 1345, a small hump is illustrated in the drain-source voltage $V_{DS}$ 1553, illustrating the transfer of leakage energy to the clamp capacitor $C_{CL}$ 1304. Once the leakage energy transfer is complete, the drain-source voltage $V_{DS}$ 1553 settles to substantially the input voltage $V_{IN}$ plus the reflected output across the primary winding. At the trailing edge of the drive signal $U_D$ 1544, the DCM signal $U_{DCM}$ 1566 transitions to a logic low value (e.g. not asserted).

At time t3 of FIG. 15A, the output rectifier 1328 of power converter 1300 stops conducting. After which, a relaxation ring can be seen in the drain-source voltage Vis 1553, indicating that the energy from the input of the power converter has been transferred to the output of the power converter. Similarly, a scaled and level-shifted version of the relaxation ring can be observed on the scaled bias winding voltage $V_B$ 1595.

At time t4 of FIG. 15A, the scaled bias winding voltage $V_B$ 1595 crosses zero and a pulse occurs in the zero crossing signal $U_{ZCP}$ 1586. As such, the DCM signal $U_{DCM}$ 1566 transitions to a logic high value and is asserted. For the example shown of the zero crossing signal $U_{ZCP}$ 1586, the zero crossing detector 1484 of FIG. 14 detects the first instance which the scaled bias winding voltage $V_B$ 1595 falls below zero after the turn off the power switch. However, it should be appreciated that the zero crossing detector could also output a pulse for every zero crossing of the scaled bias winding voltage $V_B$ 1595 detected after the turn off of the power switch.

At time t5 of FIG. 15A, a pulse is received in request signal $U_{REQ}$ 1535, indicating a request to turn on power switch S1 1345 and the clamp enable signal $U_{CE}$ 1568 transitions to a logic high value (e.g. asserted) to turn on clamp switch 1308. At time t6 of FIG. the clamp enable signal $U_{CE}$ 1568 transitions to a logic low value (e.g. deasserted) and the clamp switch 1308 is turned off. The drain-source voltage $V_{DS}$ 1553 and the scaled bias winding voltage $V_B$ 1595 decrease. At time t7 of FIG. 15A, the drive signal $U_D$ 1544 transitions to a logic high value (e.g. asserted) and power switch S1 1345 is turned on. A time t8 of FIG. 15A, the drive signal $U_D$ 1544 transitions to a logic low value and the power switch S1 1345 is turned off.

The duration between time t6 and time t7 of FIG. 15A is generally selected to allow the drain-source voltage $V_{DS}$ 1553 to fall to zero to facilitate zero-voltage switching. Since the DCM signal $U_{DCM}$ 1566 is asserted at the time t5 of FIG. 15A when the pulse in the request signal $U_{REQ}$ 1535 is received, the enable circuit 1405 of FIG. 14 asserts the second mode of operation signal $U_{M2}$ 1464 to close switch 1458. As such the duration of time between the turn off of clamp switch 1308 and the turn on of power switch S1 1345 is substantially the second delay time $T_{DEL2}$.

Although the example shown illustrates utilizing the zero crossing of the scaled bias winding voltage $V_B$ 1595 to determine DCM or CCM operation, it should be appreciated that other embodiments may be used to determine the end of secondary power transfer using the scaled bias winding voltage $V_B$ 1595 (also shown as the knee point in the waveform). For example, the change in the slope of the scaled bias winding voltage $V_B$ 1595 may also be utilized to discriminate between DCM and CCM operation.

Figure 15B:
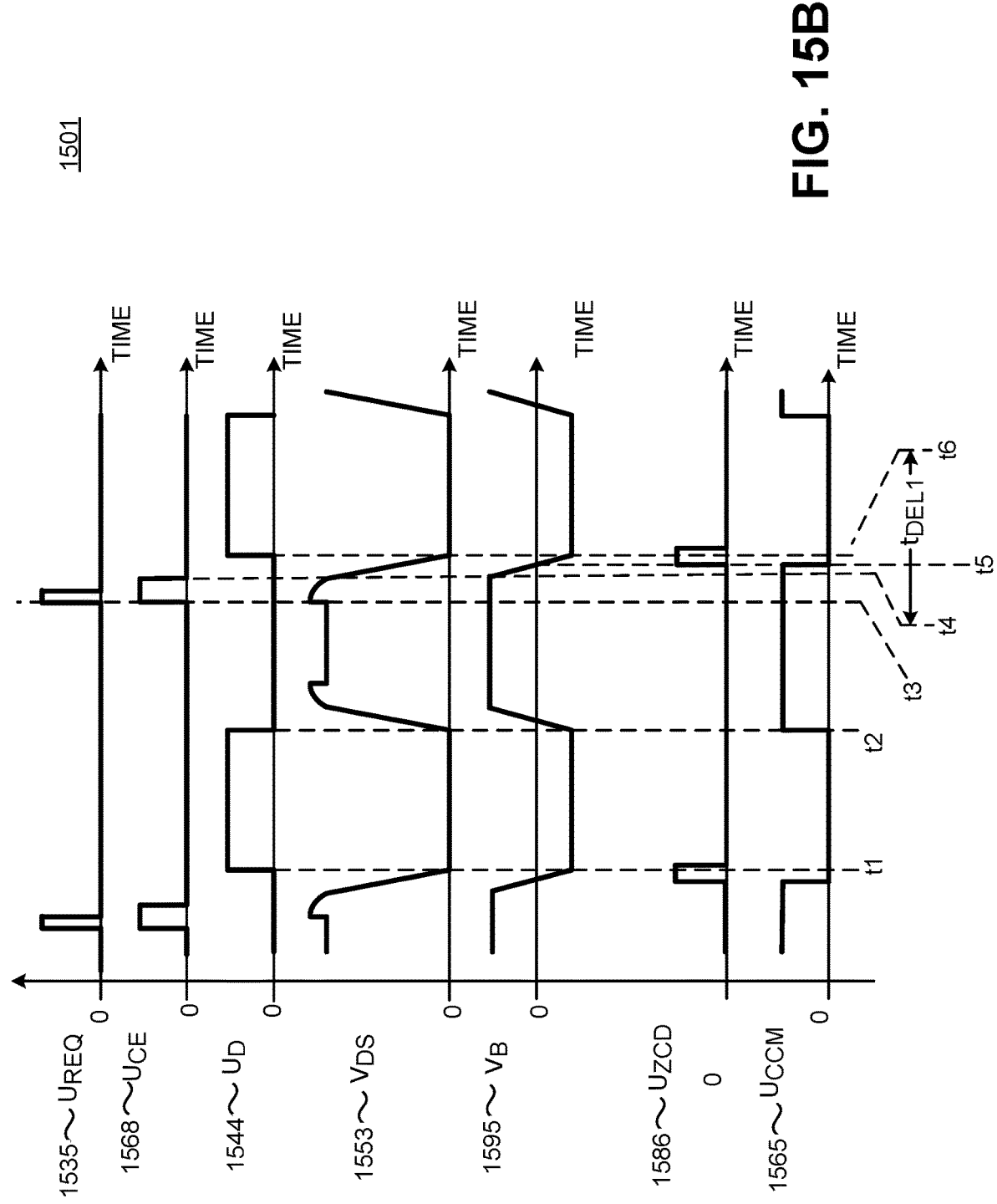
FIG. 15B illustrates a timing diagram of a request signal, a clamp enable signal, a drive signal, a drain-source voltage of the power switch, a bias winding voltage representative of an input winding, a zero-crossing signal, and a CCM signal of the power converter of FIG. 13 and the control circuit of FIG. 14, in accordance with embodiments of the present disclosure.

FIG. 15B illustrates a timing diagram 1501 with example waveforms of a request signal $U_{REQ}$ 1535, clamp enable signal $U_{CE}$ 1568, drive signal $U_D$ 1544, drain-source voltage $V_{DS}$ 1553 of the power switch S1 1345, scaled bias winding voltage $V_B$ 1595, zero crossing signal $U_{ZCD}$ 1586, and CCM signal $U_{CCM}$ 1565 for the power converter 1300 of FIG. 13 and the control circuit 1439 of FIG. 14. FIG. 15B illustrates the example waveforms for CCM operation of power converter 1300. It should be appreciated that similarly named and numbered elements couple and function as described above.

After receipt of a request (e.g. pulse) in request signal $U_{REQ}$ 1535, the clamp switch 1308 is controlled on by the clamp enable signal $U_{CE}$ 1568 (e.g. logic high value). After the clamp switch 1308 is controlled off (e.g. logic low value of clamp enable signal $U_{CE}$ 1568), the drive signal $U_D$ 1544 transitions to a logic high value to turn on power switch S1 1345 at time t1 of FIG. 15B. The drain-source voltage $V_{DS}$ 1553 is substantially equal to zero while the power switch S1 1345 is on. Scaled bias winding voltage $V_B$ 1595 is shown as a scaled and level-shifted version of the drain-source voltage $V_{DS}$ 1553, however, there is some clamping of the scaled bias winding voltage $V_B$ 1595.

At time t2 of FIG. 15B, the drive signal $U_D$ 1544 transitions to a logic low value and the power switch S1 1345 and the drain-source voltage $V_{DS}$ 1553 increases. At the beginning of the off-time of power switch S1 1345, a small hump is illustrated in the drain-source voltage $V_{DS}$ 1553, illustrating the transfer of leakage energy to the clamp capacitor $C_{CL}$ 1304. Once the leakage energy transfer is complete, the drain-source voltage $V_{DS}$ 1553 settles to substantially the input voltage $V_{IN}$ plus the reflected output across the primary winding. At the trailing edge of the drive signal $U_D$ 1544, the DCM signal $U_{DCM}$ 1566 (not shown) transitions to a logic low value (e.g. not asserted). The CCM signal $U_{CCM}$ 1565 transitions to a logic high value (e.g. asserted) in response to the trailing edge of the drive signal $U_D$ 1544.

At time t3 of FIG. 15B, a pulse is received in request signal $U_{REQ}$ 1535, indicating a request to turn on power switch S1 1345 and the clamp enable signal $U_{CE}$ 1568 transitions to a logic high value (e.g. asserted) to turn on clamp switch 1308. The scaled bias winding voltage $V_B$ 1595 has not crossed zero at this time and there is no pulse in the zero crossing signal $U_{ZCD}$ 1586.

At time t4 of FIG. 15B, the clamp enable signal $U_{CE}$ 1568 transitions to a logic low value (e.g. deasserted) and the clamp switch 1308 is turned off. The drain-source voltage $V_{DS}$ 1553 and the scaled bias winding voltage $V_B$ 1595 decrease. The scaled bias winding voltage $V_B$ 1595 is shown as crossing zero at time t5 of FIG. 15B and a pulse is shown in the zero crossing signal $U_{ZCD}$ 1586.

At time t6 of FIG. 15B, the drive signal $U_D$ 1544 transitions to a logic high value (e.g. asserted) and power switch S1 1345 is turned on.

The duration between time t4 and time t6 of FIG. 15B is generally selected to allow the drain-source voltage $V_{DS}$ 1553 to fall to zero to facilitate zero-voltage switching. Since the CCM signal $U_{CCM}$ 1565 is asserted at the time t3 of FIG. 15B when the pulse in the request signal $U_{REQ}$ 1535 is received, the enable circuit 1405 of FIG. 14 asserts the first mode of operation signal $U_{M1}$ 1463 to close switch 1459. As such the duration of time between the turn off of clamp switch 1308 and the turn on of power switch S1 1345 is substantially the first delay time $T_{DEL1}$. The duration of the first delay time $T_{DEL1}$ is shorter than the duration of the second delay time $T_{DEL2}$.

Figure 16:
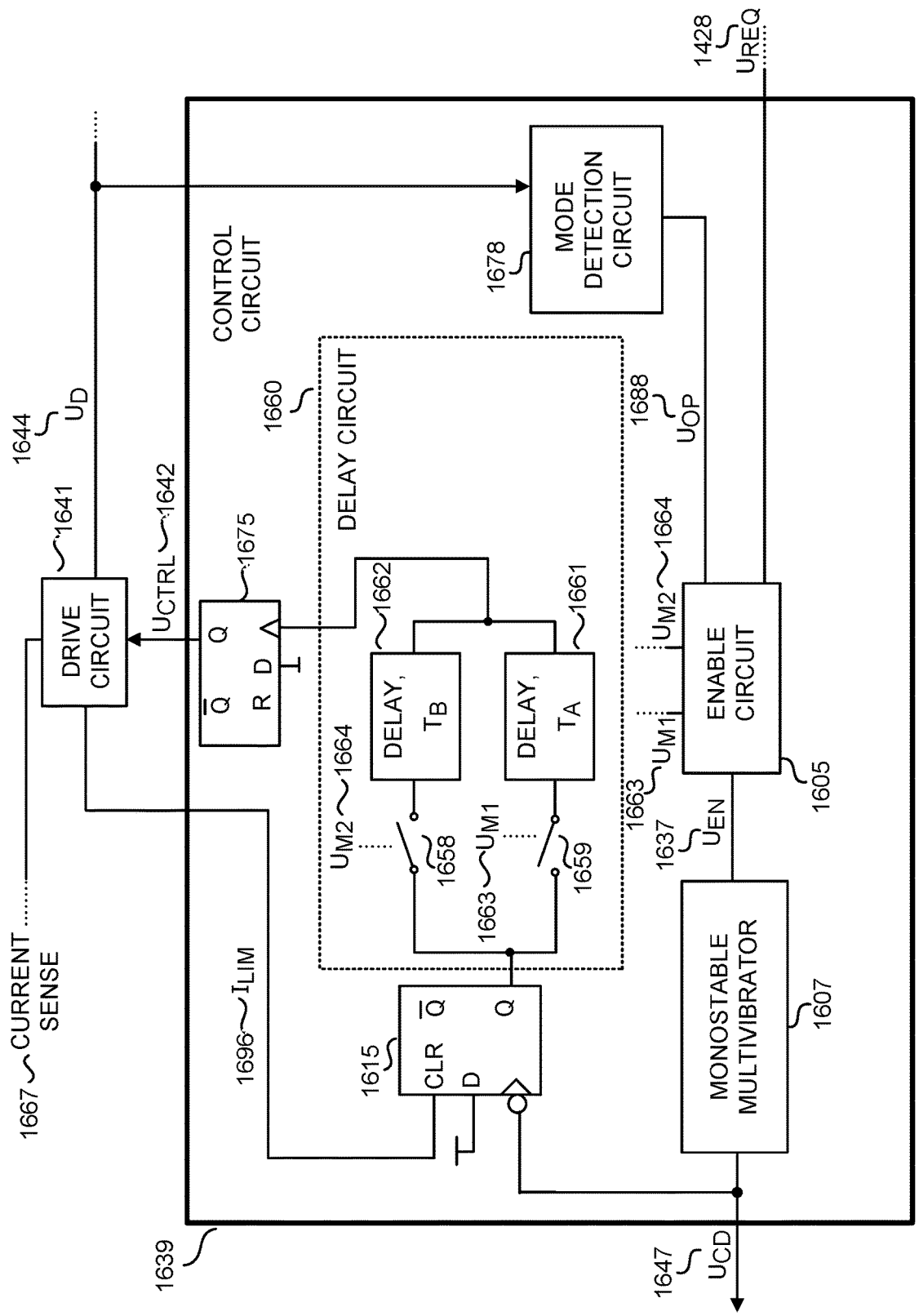
FIG. 16 illustrates of another example of a control circuit in a primary controller which can determine the mode of operation of the power converter in response to a drive signal, in accordance with embodiments of the present disclosure.

FIG. 16 illustrates of another example of a control circuit 1639 for a primary controller. In one example, the control circuit 1639 can determine the mode of operation of a power converter in response to the drive signal UD 1644. Control circuit 1639 of FIG. 16 may be one example of a control circuit for the primary controller shown with respect to any of the above figures and similarly named and numbered elements couple and function similar to as described above. Further, the control circuit 1639 shares many similarities with control circuit 339 shown in FIG. 3, and control circuit 1039 shown in FIG. 10, and control circuit 1439 shown in FIG. 14, at least one difference however, is the control circuit 1639 further includes a mode detection circuit 1678 which is coupled to receive the drive signal $U_D$ 1644 and configured to output an operation signal $U_{OP}$ 1668 to enable circuit 1605. Further, similar to FIGS. 10 and 14, the first mode of operation signal $U_{M1}$ 1663 and the second mode of operation signal $U_{M2}$ 1664 are outputted by the enable circuit 1605.

Mode detection circuit 1678 is configured to generate the operation signal $U_{OP}$ 1663 in response to the drive signal $U_D$ 1644. The operation signal $U_{OP}$ 1663 (also referred to as a mode signal UMODE in FIGS. 11A and 11B) is representative of a mode of operation of the power converter. In one example, operation signal $U_{OP}$ 1668 is a rectangular pulse waveform with varying lengths of logic high and logic low sections, logic high sections are representative of a first mode of operation of the power converter (such as CCM operation) while logic low sections are representative of a second mode of operation of the power converter (such as DCM operation).

Enable circuit 1605 of FIG. 16 asserts the first mode of operation signal $U_{M1}$ 1663 and the second mode of operation signal $U_{M2}$ 1664 in response to the operation signal $U_{OP}$ 1668. If the operation signal $U_{OP}$ 1668 indicates CCM operation, the enable circuit 1605 outputs the first mode of operation signal $U_{M1}$ 1663 to turn on the switch 1659 the control signal $U_{CTRL}$ 1642 outputs the first delay time $T_{DEL1}$. If the operation signal $U_{OP}$ 1668 indicates DCM operation, the enable circuit 1605 outputs the second mode of operation signal $U_{M2}$ 1664 to turn on the switch 1658 and the control signal $U_{CTRL}$ 1642 outputs the second delay time $T_{DEL2}$.

Figure 17:
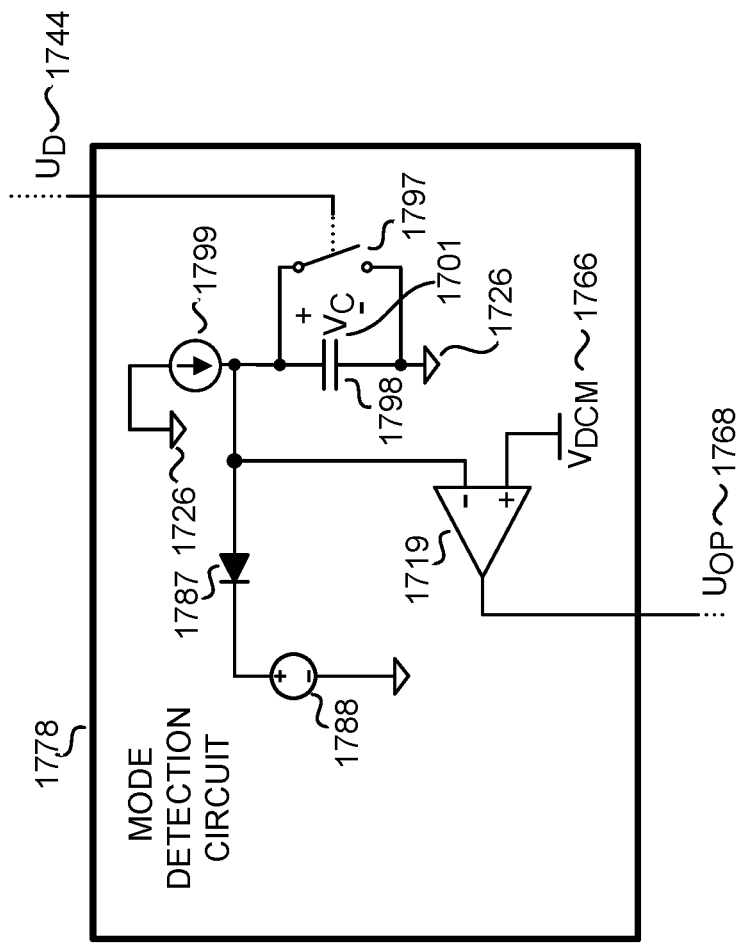
FIG. 17 illustrates one example of mode detection circuit for the control circuit of FIG. 16, in accordance with embodiments of the present disclosure.

FIG. 17 illustrates one example of mode detection circuit 1778, which is one example of mode detection circuit 1678 of FIG. 16. The mode detection circuit 1778 is shown as including switch 1797, capacitor 1798 with voltage VC 1701, current source 1799, diode 1787, voltage source 1788, and comparator 1719. It should be appreciated that similarly named and numbered elements couple and function as described above.

Switch 1797 is coupled across capacitor and configured to be controlled by the drive signal $U_D$ 1744. Comparator is coupled to capacitor 1798. As shown, the comparator 1719 is coupled such that the voltage $V_C$ 1701 is compared to the DCM threshold $V_{DCM}$ (e.g. voltage reference). Comparator 1719 is coupled to receive the voltage $V_C$ 1701 at its inverting input and the DCM threshold $V_{DCM}$ 1766 at its non-inverting input. The output of comparator 1719 is the operation signal $U_{OP}$ 1668.

Diode 1787 and voltage source 1788 are coupled to capacitor 1798 and are configured to provide an upper clamp voltage for capacitor 1798. Current source 1799 is also coupled to capacitor 1798 and configured to charge the capacitor 1798 when switch 1797 is open.

In operation, the drive signal $U_D$ 1744 opens and closes switch 1797. Logic high sections of the drive signal $U_D$ 1744 is representative of the on time of the power switch S1 while logic low sections are representative of the off time of the power switch S1. When the drive signal $U_D$ 1744 is logic high (e.g. power switch S1 is on), the capacitor 1798 is discharged. When the drive signal $U_D$ 1744 is logic low (e.g. the power switch S1 is off), the capacitor 1798 is charged by current source 1799. If the voltage VC 1701 reaches the DCM threshold $V_{DCM}$ 1766 during the off-time of the power switch S1, the mode detection circuit outputs a logic low value for the operation signal $U_{OP}$ 1768 to indicate DCM operation. Logic high values for the operation signal $U_{OP}$ 1768 are representative of CCM operation during tje off time of the power switch S1.

Figure 18:
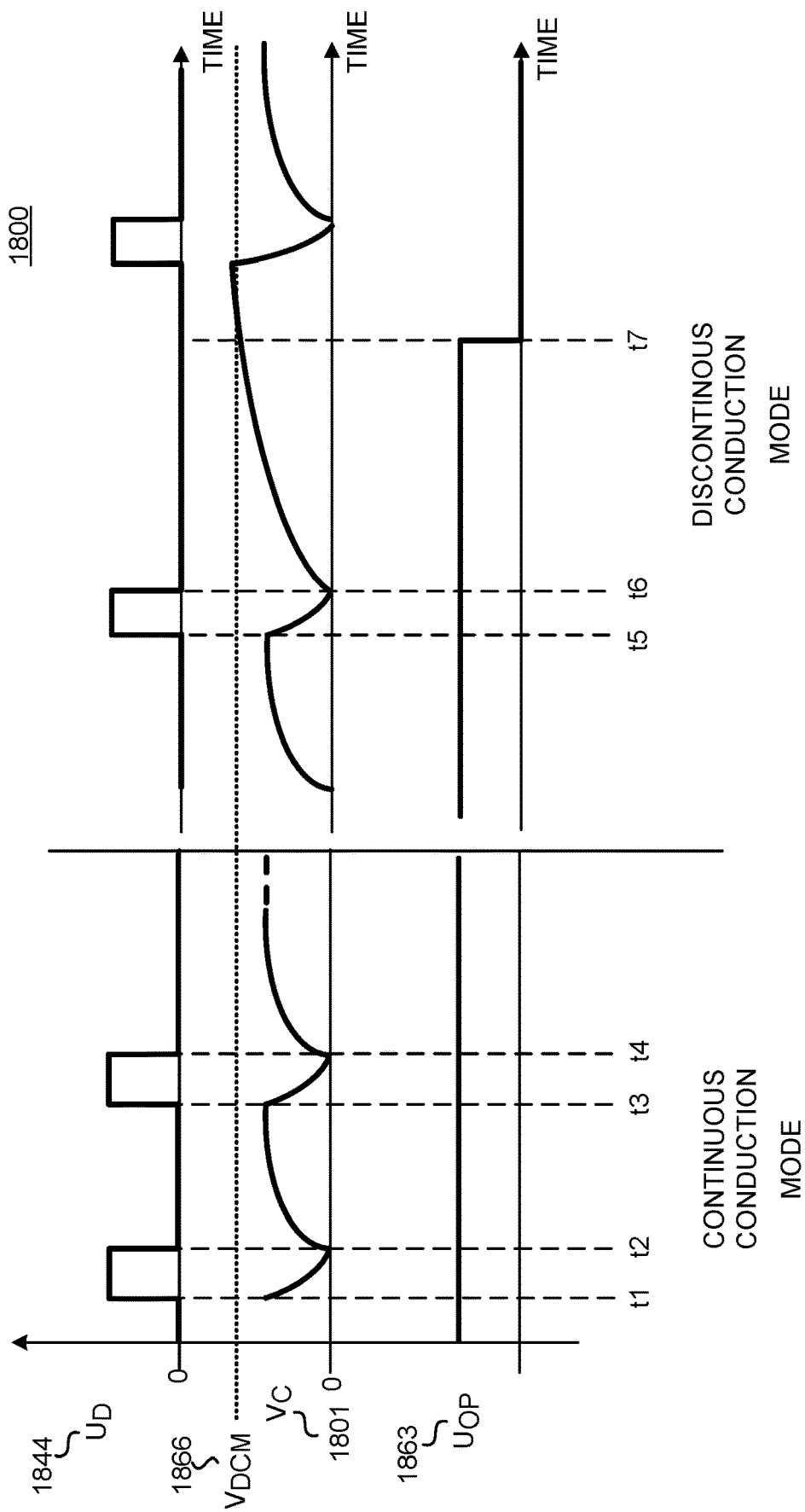
FIG. 18 illustrates an example timing diagram which illustrates a drive signal, a voltage of a mode capacitor, and an operation signal, in accordance with embodiments of the present disclosure.

FIG. 18 illustrates a timing diagram 1800 which illustrates example waveforms of the drive signal $U_D$ 1844, voltage $V_C$ 1801 of a mode capacitor 1798, and operation signal UOP 1863 of the mode detection circuit 1778 of FIG. 17 and mode detection circuit 1678 of FIG. 16. It should be appreciated that similarly named and numbered elements couple and function as described above.

The left hand side of the timing diagram 1800 illustrates CCM operation. At time t1 of FIG. 18, the drive signal $U_D$ 1844 transitions to a logic high value and the power switch S1 is on, the mode capacitor 1798 is discharged and the voltage $V_C$ 1801 decreases. At time t1 of FIG. 18, the drive signal $U_D$ 1844 transitions to the logic low value and the power switch S1 is off, the capacitor 1798 is charged by current source 1799 and the voltage $V_C$ 1801 is shown as increasing. The drive signal $U_D$ 1844 transitions to a logic high value at time t3 of FIG. 18. By time t3 of FIG. 18, the voltage $V_C$ 1801 has not reached the DCM threshold $V_{DCM}$ 1866 and the operation signal $U_{OP}$ 1863 is logic high, indicating CCM operation (e.g. first mode of operation).

The right hand side of the timing diagram 1800 illustrates the detection of DCM operation. At time t5 of FIG. 18, the drive signal $U_D$ 1844 transitions to a logic high value and the power switch S1 is on, the mode capacitor 1798 is discharged and the voltage $V_C$ 1801 decreases. At time t6 of FIG. 18, the drive signal $U_D$ 1844 transitions to the logic low value and the power switch S1 is off, the capacitor 1798 is charged by current source 1799 and the voltage $V_C$ 1801 is shown as increasing. The drive signal $U_D$ 1844 remains logic low (e.g. power switch S1 is off) and the voltage $V_C$ 1801 reaches the DCM threshold $V_{DCM}$ 1866 at time t7 of FIG.

18. As such, the operation signal $U_{OP}$ 1863 transitions to a logic low value, indicating DCM operation (e.g. second mode of operation).

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1: A controller configured for use in a power converter, the controller comprising: a control circuit coupled to receive an input line voltage sense signal representative of an input voltage of the power converter, the control circuit configured to generate a control signal in response to a request signal representative of an output of the power converter, wherein the control signal represents a delay time to turn on a power switch after a turn on of a clamp switch, in response to the input line voltage sense signal, the control circuit further configured to generate a clamp drive signal to control a clamp driver; and a drive circuit configured to generate a drive signal to control the power switch to transfer energy from an input of the power converter to the output of the power converter.

Example 2: The controller of example 1, the control circuit comprising: an enable circuit configured to generate an enable signal in response to the request signal; and a monostable multivibrator configured to generate the clamp drive signal to turn on the clamp switch in response to the enable signal, the monostable multivibrator configured to output a pulse for a first duration, wherein the first duration begins near an end of an off time of the power switch to in response to a determination to turn on the power switch.

Example 3: The controller of any of the previous examples, the control circuit further comprising a flip flop coupled to the monostable multivibrator, the flip flop configured to generate a first logic state in response to the clamp drive signal.

Example 4: The controller of any of the previous examples, wherein the control circuit is further configured to control the clamp driver to inject charge stored in a clamp capacitor into an energy transfer element to discharge a parasitic capacitance of the power switch into the energy transfer element before the power switch is turned on.

Example 5: The controller of any of the previous examples, wherein the control circuit further comprises a delay circuit configured to delay the turn on of the power switch to provide sufficient time for a parasitic capacitance of the power switch to be discharged into an energy transfer element before the power switch is turned on.

Example 6: The controller of any of the previous examples, the delay circuit comprising: a first switch controlled by a first mode of operation signal; a first delay circuit coupled to the first switch, the first delay circuit configured to output the control signal after a first delay time; a second switch controlled by a second mode of operation signal; and a second delay circuit coupled to the second switch, the second delay circuit configured to output the control signal after a second delay time, wherein the second delay time is greater than the first delay time.

Example 7: The controller of any of the previous examples, wherein the control circuit further comprises: a first comparator configured to determine if the input line voltage sense signal is less than a continuous conduction mode (CCM) threshold; a second comparator configured to determine if the input line voltage sense signal is greater than a discontinuous conduction mode (DCM) threshold; and a set-reset (SR) latch having a set input coupled to an output of the first comparator, the SR latch further coupled having a reset input coupled to an output of the second comparator, the SR latch configured to output a first mode of operation signal, the SR latch further configured to output a second mode of operation signal.

Example 8: The controller of any of the previous examples, wherein the first mode of operation signal represents a DCM operation of the power converter.

Example 9: The controller of any of the previous examples, wherein the second mode of operation signal represents a CCM operation of the power converter.

Example 10: A power converter, comprising: an energy transfer element coupled between an input of the power converter and an output of the power converter; a power switch coupled to the energy transfer element; a clamp driver coupled to the energy transfer element and the power switch; and a primary controller coupled to the clamp driver and the power switch, the primary controller comprising: a control circuit configured to generate a control signal in response to a request signal representative of an output of the power converter, wherein the control signal selects one of a plurality of modes of operation to turn on a power switch after a turn on of a clamp switch in response to an input line voltage sense signal, the control circuit further configured to generate a clamp drive signal to control a clamp driver; and a drive circuit configured to generate a drive signal to control the power switch to transfer energy from the input of the power converter to the output of the power converter.

Example 11: The power converter of example 10, the clamp driver comprising a clamp capacitor coupled to the clamp switch, wherein the clamp capacitor is coupled to store a charge that is injected into a primary winding of the energy transfer element through the clamp switch in response to the clamp drive signal.

Example 12: The power converter of any of the previous examples, wherein the energy transfer element further comprises a magnetizing inductance and a leakage inductance between the clamp driver and the primary winding.

Example 13: The power converter of any of the previous examples, wherein the plurality of modes of operation comprises a first mode of operation and a second mode of operation, wherein the first mode of operation is continuous conduction mode (CCM), and wherein the second mode of operation is discontinuous conduction mode (DCM).

Example 14: The power converter of any of the previous examples, wherein the leakage inductance of the energy transfer element reduces a drain to source voltage of the power switch to substantially zero in response to the turn on of the clamp switch.

Example 15: The power converter of any of the previous examples, wherein the leakage inductance and the magnetizing inductance of the energy transfer element reduces a drain to source voltage of the power switch to substantially zero in response to the turn on of the clamp switch.

Example 16: The power converter of any of the previous examples, the clamp driver comprising: a low side driver coupled to receive the clamp drive signal, the low side driver configured to communicate the turn on of the clamp switch; a high side driver coupled to the clamp switch, the high side driver configured to generate a clamp enable signal to control the clamp switch; and a communication link coupled to the low side driver and the high side driver.

Example 17: The power converter of any of the previous examples, the power converter further comprising a secondary controller configured to generate the request signal in response to a feedback signal representative of the output of the power converter.

Example 18: The power converter of any of the previous examples, wherein the secondary controller is galvanically isolated from the primary controller.

Example 19: The power converter of any of the previous examples, an enable circuit configured to generate an enable signal in response to the request signal; and a monostable multivibrator configured to generate the clamp drive signal to turn on the clamp switch in response to the enable signal, the monostable multivibrator further configured to output a pulse for a first duration, wherein the first duration begins near an end of an off time of the power switch in response to a determination to turn on the power switch.

Example 20: The power converter of any of the previous examples, the control circuit further comprising a flip flop coupled to the monostable multivibrator, the flip flop configured to generate a first logic state in response to the clamp drive signal.

Example 21: The power converter of any of the previous examples, wherein the control circuit further comprises a delay circuit configured to delay turning on the power switch to provide sufficient time for a parasitic capacitance of the power switch to be discharged into the energy transfer element before the power switch is turned on.

Example 22: The power converter of any of the previous examples, wherein the delay circuit comprises: a first switch configured to be controlled by a first mode of operation signal; a first delay circuit configured to output the control signal after a first delay time; a second switch coupled to be controlled by a second mode of operation signal; a second delay circuit configured to output the control signal after a second delay time, wherein the second delay time is greater than the first delay time.

Example 23: The power converter of any of the previous examples, the control circuit further comprising: a first comparator configured to determine if the input line voltage sense signal is less than a continuous conduction mode (CCM) threshold; a second comparator configured to determine if the input line voltage sense signal is greater than a discontinuous conduction mode (DCM) threshold; and a set-reset (SR) latch having a set input coupled to an output of the first comparator, the SR latch further coupled having a reset input coupled to an output of the second comparator, the SR latch configured to output a first mode of operation signal, the SR latch further configured to output a second mode of operation signal.

Example 24: A secondary controller configured for use in a power converter, the secondary controller comprising a detector circuit configured to generate a crossing threshold signal in response to a forward voltage signal crossing below a threshold; a comparator coupled to generate a first state of an off signal in response to the forward voltage signal being greater than a turn off threshold, the comparator further coupled to generate a second state of the off signal in response to the forward voltage signal being less than the turn off threshold; a first flip flop coupled to turn on a synchronous rectifier in response to the crossing threshold signal and to turn off the synchronous rectifier in response to the second state of the off signal; a mode detection circuit configured to output a first mode signal in response to a feedback signal being below a reference and a first state of a secondary drive signal, the mode detection circuit further configured to output a second mode signal in response to the feedback signal being below the reference and a second state of the secondary drive signal; and a control circuit configured to generate a first pattern of a request signal in response to the first mode signal, the control circuit further configured to generate a second pattern of the request signal in response to the second mode signal.

Example 25: The secondary controller of example 24, wherein the first pattern of the request signal is representative of a continuous conduction mode (CCM) of the power converter.

Example 26: The secondary controller of example 24 or 25, wherein the second pattern of the request signal is representative of a discontinuous conduction mode (DCM) of the power converter.

Example 27: The secondary controller of any one of examples 24 to 26, wherein the mode detection circuit comprises: a multiplexer configured to select the first mode signal or the second mode signal in response to the turn on or turn off of the synchronous rectifier.

Example 28: The secondary controller of any one of examples 24 to 27, wherein the mode detection circuit further comprises a mode flip-flop coupled to control a switch in response to the feedback signal being below the threshold, wherein the mode detection circuit outputs the first mode signal or the second mode signal when the switch is closed.

Example 29: A power converter, comprising an energy transfer element coupled between an input of the power converter and an output of the power converter; a power switch coupled to the energy transfer element; a clamp driver coupled to a clamp capacitor and a clamp switch; a primary controller coupled to the clamp driver and the power switch; and a secondary controller configured to control switching of the power switch to control a transfer of energy through the energy transfer element from the input of the power converter to the output of the power converter, the secondary controller comprising a detector circuit configured to generate a crossing threshold signal in response to a forward voltage signal crossing below a threshold; a comparator coupled to generate a first state of an off signal in response to the forward voltage signal being greater than a turn off threshold, the comparator further coupled to generate a second state of the off signal in response to the forward voltage signal being less than the turn off threshold; a first flip flop coupled to turn on a synchronous rectifier in response to the crossing threshold signal and to turn off the synchronous rectifier in response to the first state of the off signal; a mode detection circuit configured to output a first mode signal in response to conduction of the synchronous rectifier, the mode detection circuit further configured to output a second mode signal in response to no conduction of the synchronous rectifier; and a secondary control circuit configured to generate a first pattern of a request signal in response to the first mode signal, the secondary control circuit further configured to generate a second pattern of the request signal in response to the second mode signal.

Example 30: The power converter of example 29, the primary controller comprising a primary control circuit configured to generate a control signal in response to the request signal, wherein the control signal represents a delay time to enable the power switch after turn off of the clamp switch, the primary control circuit further configured to generate a clamp drive signal to control the clamp driver to turn on the clamp switch in response to the request signal; and a drive circuit configured to generate a drive signal in response to the control signal to enable the power switch to transfer energy from the input of the power converter to the output of the power converter.

Example 31: The power converter of example 29 or 30, the primary control circuit comprising an enable circuit configured to generate an enable signal in response to the request signal, the enable circuit further configured to generate a first mode of operation signal in response to the first pattern of the request signal, and further configured to generate a second mode of operation signal in response to the second pattern of the request signal; and a monostable multivibrator coupled to generate the clamp drive signal to turn on the clamp switch in response to the enable signal and to output a pulse for a first duration, wherein the first duration is the turn on time for the clamp switch.

Example 32: The power converter of any one of examples 29 to 31, the primary control circuit further comprising a second flip flop coupled to the monostable multivibrator to generate a first logic state in response to the clamp drive signal.

Example 33: The power converter of any one of examples 29 to 32, wherein the primary control circuit is further configured to control the clamp driver to inject charge stored in the clamp capacitor into the energy transfer element to discharge a parasitic capacitance of the power switch into the energy transfer element before the power switch is turned on.

Example 34: The power converter of any one of examples 29 to 33, wherein the primary control circuit further comprises a delay circuit configured to vary the delay time between of the turn off of the clamp switch and the turn on of the power switch in response to the first mode of operation signal or the second mode of operation signal.

Example 35. The power converter of any one of examples 29 to 34, the delay circuit comprising a first switch coupled to be controlled by the first mode of operation signal; a first delay circuit coupled to the first switch, the first delay circuit configured to output the control signal after a first delay time, wherein the delay time is substantially the first delay time; a second switch controlled by the second mode of operation signal; and a second delay circuit coupled to the second switch, the second delay circuit configured to output the control signal after a second delay time, wherein the delay time is substantially the second delay time, wherein the second delay time is greater than the first delay time.

Example 36: A primary controller configured for use in a power converter, the primary controller comprising a control circuit configured to determine a mode of operation of the power converter in response to a bias voltage representative of a voltage of an input winding of an energy transfer element, the control circuit configured to generate a control signal in response to the mode of operation of the power converter, wherein the control signal represents a delay time to enable a turn on of a power switch after a turn off of a clamp switch, the control circuit further configured to generate a clamp drive signal to control a clamp driver in response to a request signal representative of an output of the power converter; and a drive circuit configured to generate a drive signal to control the power switch in response to the control signal to transfer energy from an input of the power converter to an output of the power converter.

Example 37: The primary controller of example 36, the control circuit comprising an enable circuit configured to generate an enable signal in response to a request signal; a monostable multivibrator coupled to generate the clamp drive signal to turn on the clamp switch in response to the enable signal and to output a pulse for a first duration, wherein the first duration is the turn on time for the clamp switch; a zero crossing detector configured to generate a zero crossing signal representative of the bias voltage crossing a zero crossing reference; and a flip flop coupled to assert a first mode of operation signal in response to a drive signal and to assert a second mode of operation signal in response to the zero crossing signal.

Example 38: The primary controller of example 36 or 37, wherein an output of the flip flop is sampled in response to the request signal.

Example 39: The primary controller of any one of examples 36 to 38, wherein the first mode of operation signal represents a continuous conduction mode (CCM) operation of the power converter.

Example 40: The primary controller of any one of examples 36 to 39, wherein the second mode of operation signal represents a discontinuous conduction mode (DCM) operation of the power converter.

Example 41: A power converter, comprising an energy transfer element coupled between an input of the power converter and an output of the power converter; a power switch coupled to the energy transfer element; a clamp switch coupled to the energy transfer element and the power switch, the clamp switch configured to be controlled by a clamp driver; and a primary controller coupled to the power switch, the primary controller comprising a control circuit configured to determine a mode of operation of the power converter in response to a bias voltage representative of a voltage of an input winding of the energy transfer element, the control circuit further configured to generate a control signal in response to the mode of operation, wherein the control signal represents a delay time to enable a turn on of the power switch after a turn off of the clamp switch, the control circuit further configured to generate a clamp drive signal to output to the clamp driver; and a drive circuit configured to generate a drive signal to control the power switch to transfer energy from the input of the power converter to the output of the power converter.

Example 42: The power converter of example 41, wherein the power converter exhibits two modes of operation comprising a first mode of operation, wherein the first mode of operation is representative of continuous conduction mode (CCM); and a second mode of operation, wherein the second mode of operation is representative of discontinuous conduction mode (DCM).

Example 43: The power converter of example 41 or 42, wherein the energy transfer element further comprises a magnetizing inductance and a leakage inductance between the clamp driver and a primary winding of the energy transfer element.

Example 44: The power converter of any one of examples 41 to 43, wherein the leakage inductance of the energy transfer element reduces a drain to source voltage of the power switch to substantially zero in response to the turn off of the clamp switch in CCM.

Example 45: The power converter of any one of examples 41 to 44, wherein the leakage inductance and the magnetizing inductance of the energy transfer element reduces a drain to source voltage of the power switch to substantially zero in response to the turn on of the clamp switch in DCM.

Example 46: The power converter of any one of examples 41 to 45, further comprising a secondary controller configured to generate a request signal representative of a request to turn on the power switch in response to a feedback signal representative of the output of the power converter.

Example 47: The power converter of any one of examples 41 to 46, wherein the secondary controller is galvanically isolated from the primary controller.

Example 48: The power converter of any one of examples 41 to 47, the control circuit comprising a zero crossing detector configured to generate a zero crossing signal representative of the bias voltage crossing a zero crossing reference; a first flip flop coupled to assert a first mode of operation signal in response to the drive signal and to assert a second mode of operation signal in response to the zero crossing signal; an enable circuit configured to generate an enable signal in response to a request signal representative of an output of the power converter, the enable circuit further configured to generate a first mode signal in response to the first mode of operation signal and to generate a second mode signal in response to the second mode of operation signal; and a monostable multivibrator coupled to generate a clamp drive signal to turn on the clamp switch in response to the enable and to output a pulse in the clamp drive signal for a first duration, wherein the first duration is representative of a turn on time of the clamp switch.

Example 49: The power converter of any one of examples 41 to 48, wherein the control circuit further comprises a delay circuit configured to vary the delay time between the turn off of the clamp switch and a turn on the power switch.

Example 50: The power converter of any one of examples 41 to 49, wherein the delay circuit comprises a first switch coupled to be controlled by the first mode signal; a first delay circuit configured to output the control signal after a first delay time, wherein the first delay time is substantially the delay time between the turn off of the clamp switch and the turn on the power switch; a second switch coupled to be controlled by the second mode signal; and a second delay circuit configured to output the control signal after a second delay time, wherein the second delay time is substantially the delay time between the turn off of the clamp switch and the turn on the power switch, wherein the second delay time is greater than the first delay time.

Example 51: A primary controller configured for use in a power converter, the primary controller comprising a control circuit configured to determine a mode of operation of the power converter in response to a drive signal of a power switch, the control circuit further configured to generate a control signal in response to a signal representative of the mode of operation of the power converter, wherein the control signal represents a delay time to enable a turn on of the power switch after a turn off of a clamp switch, the control circuit further configured to generate a clamp drive signal to control the clamp switch; and a drive circuit configured to generate a drive signal to enable the power switch to transfer energy from an input of the power converter to an output of the power converter.

Example 52: The primary controller of example 51, the control circuit comprising a mode detection circuit configured to generate an operation signal in response to the drive signal; an enable circuit configured to generate an enable signal in response to a request signal representative of an output of the power converter, the enable circuit further configured to generate a first mode signal and a second mode signal in response to the operation signal; and a monostable multivibrator coupled to generate the clamp drive signal to turn on the clamp switch in response to the enable signal and to output a pulse in the clamp drive signal for a first duration, wherein the first duration is the turn on time of the clamp switch.

Example 53: The primary controller of example 51 or 52, the mode detection circuit comprising a switch configured to be controlled by the drive signal; a current source coupled to the switch and configured to charge a capacitor, wherein the capacitor is charged and discharged in response to the drive signal that controls the switch; and a comparator coupled to output a first state of the operation signal in response to a voltage reference being greater than a voltage of the capacitor and to output a second state of the operation signal in response to the voltage reference being substantially equal or less than the voltage of the capacitor.

Example 54. The primary controller of any one of examples 51 to 53, wherein the first state of the operation signal is representative of continuous conduction mode of operation (CCM), and wherein the second state of the operation signal is representative of a discontinuous conduction mode of operation (DCM).

Example 55: The primary controller of any one of examples 51 to 54, the mode detection circuit further comprising a diode coupled to a voltage source, the diode and the voltage source configured to clamp the voltage of the capacitor.

Example 56: The primary controller of any one of examples 51 to 55, wherein the control circuit further comprises a delay circuit configured to vary the delay time to turn on the power switch Example 57: The primary controller of any one of examples 51 to 56, wherein the delay circuit comprises a first switch coupled to be controlled by the first mode signal; a first delay circuit configured to output the control signal after a first delay time, wherein the first delay time is substantially the delay time to turn on the power switch; a second switch coupled to be controlled by the second mode signal; and a second delay circuit configured to output the control signal after a second delay time, wherein the second delay time is substantially the s delay time to turn on the power switch, wherein the second delay time is greater than the first delay time.

Example 58: A power converter, comprising an energy transfer element coupled between an input of the power converter and an output of the power converter; a power switch coupled to the energy transfer element; a clamp driver configured to control a clamp switch; and a power converter controller configured to control the power switch to transfer energy from the input of the power converter to the output of the power converter, the power converter controller further configured to generate a control signal in response to a mode of operation signal and to enable a turn on of a power switch after a turn off of the clamp switch, wherein the control signal varies a duration between the turn off of the clamp switch and the turn on of the power switch in response to the mode of operation signal.

Example 59: The power converter of example 58, wherein the power converter controller comprises a primary controller and a secondary controller.

Example 60: The power converter of example 58 or 59, the secondary controller comprising a detector circuit configured to generate a crossing signal in response to a forward voltage signal crossing below a threshold; a comparator coupled to generate a first state of an off signal in response to the forward voltage signal being greater than a turn off threshold, the comparator further coupled to generate a second state of the off signal in response to the forward voltage signal being less than the turn off threshold; a first flip flop coupled to turn on a synchronous rectifier in response to the crossing signal and to turn off the synchronous rectifier in response to the first state of the off signal;

a mode detection circuit configured to output a first mode signal in response to a conduction of the synchronous rectifier when a feedback signal is below a reference, the mode detection circuit further configured to output a second mode signal in response to no conduction of the synchronous rectifier when the feedback signal is below the reference; and a secondary control circuit configured to generate a first pattern of a request signal in response to the first mode signal, the secondary control circuit further configured to generate a second pattern of the request signal in response the second mode signal.

Example 61: The power converter of any one of examples 58 to 60, the primary controller configured to generate the control signal in response to the first pattern of the request signal, the primary controller further configured to generate the control signal in response to the second pattern of the request signal.

Example 62: The power converter of any one of examples 58 to 61, the mode of operation signal comprising a first mode of operation signal, wherein the first mode of operation signal is representative of continuous conduction mode (CCM); and a second mode of operation signal, wherein the second mode of operation signal is representative of discontinuous conduction mode (DCM).

Example 63: The power converter of any one of examples 58 to 62, the power converter controller comprising a zero crossing detector configured to generate a zero crossing signal representative of a bias voltage crossing below a zero reference, wherein the bias voltage is representative of a voltage of the power switch; a flip flop coupled to assert a first mode of an operation signal in response to a drive signal and to assert a second mode of the operation signal in response to the zero crossing signal; and a drive circuit configured to generate the drive signal to control the power switch to transfer energy from the input of the power converter to the output of the power converter.

Example 64: The power converter of any one of examples 58 to 63, the power converter controller further comprising an enable circuit configured to generate an enable signal in response to a request signal representative of an output of the power converter, the enable circuit further configured to generate a first mode signal and a second mode signal in response to the operation signal; and a monostable multivibrator coupled to generate a clamp drive signal to turn on the clamp switch in response to the enable signal, the monostable multivibrator further coupled to output a pulse in the clamp drive signal for a first duration, wherein the first duration represents a turn on time of the clamp switch.

Example 65: The power converter of any one of examples 58 to 60, the power converter controller comprising a control circuit configured to determine the mode of operation signal in response to a drive signal of the power switch; and a drive circuit configured to generate the drive signal to control the power switch to transfer energy from an input of the power converter to an output of the power converter.

Example 66: The power converter of any one of examples 58 to 65, further comprising a communication link between the primary controller and the secondary controller, wherein the communication link provides galvanic isolation between the primary controller and the secondary controller and is formed from a leadframe.

Example 67: A secondary controller configured for use in a power converter, the secondary controller comprising a mode detection circuit configured to determine a mode of operation of the power converter in response to a forward voltage representative of a voltage of a secondary winding of an energy transfer element of a power converter, the mode detection circuit configured to output a first mode signal in response to no detection of a relaxation ring in the forward voltage and to output a second mode signal in response to detection of the relaxation ring; and a control circuit configured to generate a first pattern of a request signal in response to the first mode signal and to generate a second pattern of the request signal in response to the second mode signal, wherein the request signal is representative of a request to turn on a power switch of the power converter and the power switch is turned on after a first delay time in response to the first pattern and turn on after a second delay time in response to the second pattern.

Example 68: The secondary controller of example 67, wherein the mode detection circuit is configured to output the first mode signal in response to a feedback signal representative of an output of the power converter falling below a reference and no detection of the relaxation ring and to output the second mode signal in response to the feedback signal falling below the reference and detection of the relaxation ring.

Example 69: The secondary controller of examples 67 or 68, wherein the first pattern of the request signal is representative of a continuous conduction mode (CCM) of the power converter and the second pattern of the request signal is representative of a discontinuous conduction mode (DCM) of the power converter.

What is claimed is:

1. A controller for use in a power converter, the controller comprising:
   a control circuit coupled to receive an input line voltage sense signal representative of an input voltage of the power converter, the control circuit coupled to generate a control signal in response to the input line voltage sense signal, wherein the control signal represents a delay time between turning OFF a clamp switch and turning ON a power switch of the power converter, the control circuit comprising:
      a first comparator coupled to compare the input line voltage sense signal and a first threshold; and
      a second comparator coupled to compare the input line voltage sense signal and a second threshold,
      wherein the control circuit is coupled to generate a first mode of operation signal in response to the first comparator and is coupled to generate a second mode of operation signal in response to the second comparator,
      wherein the delay time is a delay time in response to the first mode of operation signal or the delay time is a delay time in response to the second mode of operation signal, the delay time in response to the second mode of operation signal is greater than the delay time in response to the first mode of operation signal; and
   a drive circuit coupled to generate a drive signal to control the turn ON and turn OFF of the power switch to transfer energy from an input of the power converter to an output of the power converter in response to the control signal.

2. The controller of claim 1, wherein the control circuit further comprises:
   an enable circuit coupled to receive a request signal representative of a determination to turn ON the power switch and to output an enable signal, wherein the enable circuit enables the control circuit to output a clamp drive signal to control the turn ON and OFF of the clamp switch.

3. The controller of claim 2, wherein the control circuit further comprises:
a monostable multivibrator coupled to receive the enable signal and to output the clamp drive signal and to output the clamp drive signal to turn ON the clamp switch for a first duration in response to the determination to turn ON the power switch.

4. The controller of claim 1, wherein the first mode of operation signal is representative of the power converter operating in continuous conduction mode (CCM) and the second mode of operation signal is representative of the power converter operating in discontinuous conduction mode (DCM).

5. The controller of claim 1, wherein the control circuit is coupled to generate the first mode of operation signal if the input line voltage sense signal is less than the first threshold and further coupled to generate the second mode of operation signal if the input line voltage sense signal is greater than the second threshold.

6. The controller of claim 5, wherein the control circuit further comprises:
a delay circuit coupled to receive the first mode of operation signal and the second mode of operation signal, wherein the delay circuit is further coupled to apply the delay time in response to the first mode of operation signal to the control signal or the delay time in response to the second mode of operation signal to the control signal.

7. The controller of claim 6, wherein the delay circuit comprises:
a first switch coupled to turn ON and OFF in response to the first mode of operation signal;
a first delay circuit coupled to the first switch, the first delay circuit further coupled to apply the delay time in response to the first mode of operation signal to the control signal;
a second switch coupled to turn ON and OFF in response to the second mode of operation signal; and
a second delay circuit coupled to the second switch, the second delay circuit further coupled to apply the delay time in response to the second mode of operation signal to the control signal.

8. A primary controller for use in a power converter, the primary controller comprising:
a control circuit coupled to determine a mode of operation of the power converter and to generate a first mode of operation signal and a second mode of operation signal, the control circuit further coupled to generate a control signal in response to the first mode of operation signal or the second mode of operation signal, wherein the control signal causes a delay time to enable a turn ON of a power switch after a turn OFF of a clamp switch, the control circuit further comprising:
an enable circuit coupled to enable the control circuit to output a clamp drive signal to control the clamp switch in response to a request signal representative of an output of the power converter; and
a delay circuit coupled to receive the first mode of operation signal and the second mode of operation signal, wherein the delay circuit is further coupled to apply a first delay time to the control signal in response to the first mode of operation signal or a second delay time to the control signal in response to the second mode of operation signal, the second delay time being longer than the first delay time; and
a drive circuit coupled to output a drive signal to enable the power switch to transfer energy from an input of the power converter to the output of the power converter in response to the control signal.

9. The primary controller of claim 8, wherein the first mode of operation signal is representative of the power converter operating in continuous conduction mode (CCM) and the second mode of operation signal is representative of the power converter operating in discontinuous conduction mode (DCM).

10. The primary controller of claim 8, wherein the control circuit further comprises:
an enable circuit coupled to receive the request signal and to output an enable signal, wherein the request signal is further representative of a determination to turn ON the power switch, wherein the enable circuit is coupled to enable the control circuit to output a clamp drive signal to control the turn ON and OFF of the clamp switch.

11. The primary controller of claim 10, wherein the control circuit further comprises:
a monostable multivibrator coupled to receive the enable signal and to output the clamp drive signal, wherein the monostable multivibrator is coupled to output the clamp drive signal to turn ON the clamp switch for a first duration in response to the determination to turn ON the power switch.

12. The primary controller of claim 10, wherein the request signal is further representative of the mode of operation of the power converter, wherein the enable circuit is coupled to output the first mode of operation signal and the second mode of operation signal in response to the request signal.

13. The primary controller of claim 12, wherein a first pattern in the request signal is representative of continuous conduction mode (CCM) of the power converter and a second pattern in the request signal is representative of discontinuous conduction mode (DCM) of the power converter.

14. The primary controller of claim 10, wherein the control circuit further comprises:
a zero crossing detector coupled to output a zero crossing signal representative of a bias voltage crossing a reference,
wherein the control circuit is coupled to assert a CCM signal in response to a trailing edge of the drive signal and the control circuit is coupled to assert a DCM signal in response to the zero crossing signal,
wherein the enable circuit is coupled to receive the CCM signal and the DCM signal, the enable circuit being coupled to output the first mode of operation signal in response to the CCM signal and to output the second mode of operation signal in response to the DCM signal.

15. The primary controller of claim 10, wherein the control circuit further comprises:
a mode detection circuit coupled to generate an operation signal in response to the drive signal, wherein the operation signal is representative of the mode of operation of the power converter,
wherein the enable circuit is further coupled to generate the first mode of operation signal and the second mode of operation signal in response to the operation signal.

16. The primary controller of claim 15, wherein the mode detection circuit further comprises:
a capacitor;
a current source coupled to charge the capacitor;
a switch coupled to receive the drive signal, wherein the capacitor is coupled to be charged and discharged in response to the drive signal; and a comparator coupled to compare a voltage across the capacitor and a voltage reference, wherein the mode detection circuit is coupled to output the operation signal in response to the comparator.

17. The primary controller of claim 8, wherein the delay circuit further comprises:
- a first switch coupled to turn ON and OFF in response to the first mode of operation signal;
- a first delay circuit coupled to the first switch, the first delay circuit coupled to apply the first delay time to the control signal;
- a second switch coupled to turn ON and OFF in response to the second mode of operation signal; and
- a second delay circuit coupled to the second switch, the second delay circuit i coupled to apply the second delay time to the control signal.

18. The primary controller of claim 8, wherein the control circuit further comprises:
- a first comparator coupled to receive an input line voltage sense signal representative of an input voltage of the power converter and a first threshold, wherein the control circuit is coupled to generate the first mode of operation signal if the input line voltage sense signal is less than the first threshold; and
- a second comparator coupled to receive the input line voltage sense signal and a second threshold, wherein the control circuit is coupled to generate the second mode of operation signal if the input line voltage sense signal is greater than the second threshold.

* * * * *